(12) United States Patent
Kim et al.

(10) Patent No.: US 8,238,692 B2
(45) Date of Patent: Aug. 7, 2012

(54) DEVICE AND METHOD FOR OUTPUTTING A PRIVATE IMAGE USING A PUBLIC DISPLAY

(75) Inventors: Jun-Sik Kim, Daejon-si (KR); Sang-Bin Yim, Daejon-si (KR); Byung-Sung Kim, Daejon-si (KR)

(73) Assignee: Nexvi Corporation, Daejon-Si (KR)

( * ) Notice: Subject to any disclaimer, the term of this patent is extended or adjusted under 35 U.S.C. 154(b) by 0 days.

(21) Appl. No.: 13/073,108

(22) Filed: Mar. 28, 2011

(65) Prior Publication Data

US 2011/0234629 A1    Sep. 29, 2011

Related U.S. Application Data

(63) Continuation of application No. 10/542,590, filed as application No. PCT/KR2004/000099 on Jan. 20, 2004, now Pat. No. 7,978,929.

(30) Foreign Application Priority Data

| Jan. 20, 2003 | (KR) | 10-2003-0003600 |
| Feb. 14, 2003 | (KR) | 10-2003-0009274 |
| Feb. 14, 2003 | (KR) | 10-2003-0009275 |

(51) Int. Cl.
  *G06K 9/36* (2006.01)
  *H04N 7/16* (2011.01)

(52) U.S. Cl. ............ 382/284; 726/26; 380/207

(58) Field of Classification Search ......... 382/100, 382/284; 345/7, 9; 726/26; 380/205, 207, 380/54

See application file for complete search history.

(56) References Cited

U.S. PATENT DOCUMENTS

| 5,614,920 | A  | 3/1997 | Coteus et al. | 345/7 |
| 5,629,984 | A  | 5/1997 | McManis | 380/54 |
| 6,529,209 | B1 | 3/2003 | Dunn et al. | 345/629 |
| 6,597,328 | B1 | 7/2003 | Stern et al. | 345/9 |
| 6,980,177 | B2 | 12/2005 | Struyk | 345/8 |
| 2003/0128218 | A1 | 7/2003 | Struyk | 345/581 |
| 2003/0133569 | A1 | 7/2003 | Stern et al. | 380/206 |

*Primary Examiner* — Andrew W Johns
(74) *Attorney, Agent, or Firm* — Sughrue Mion, PLLC

(57) ABSTRACT

Disclosed are a device and a method for displaying a private image on a public display device. Image sequence pattern is generated for the private image and the corresponding masking image. The masking image is made from the dynamic inverse image of the private image, based on the refresh rate of the display device and the image sequence pattern. The masking image can screen the private image more effectively. The private image and the masking image is displayed on the display device according to the image sequence pattern.

11 Claims, 56 Drawing Sheets

FIG. 18
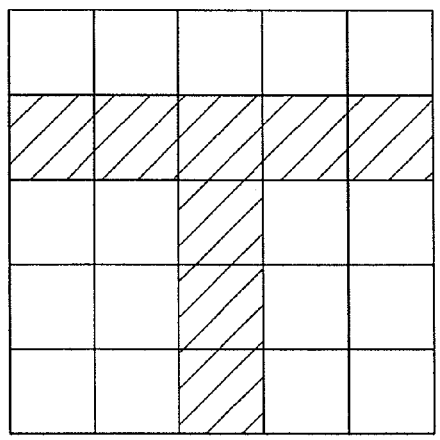
(a)
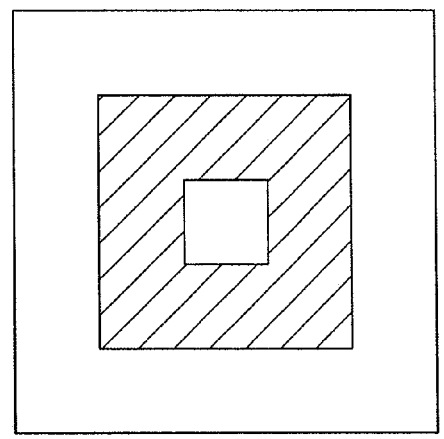
(b)

DEVICE AND METHOD FOR OUTPUTTING A PRIVATE IMAGE USING A PUBLIC DISPLAY

CROSS-REFERENCE TO RELATED APPLICATION

This application is a continuation of U.S. patent application Ser. No. 10/542,590, filed Mar. 13, 2006, now U.S. Pat. No. 7,978,929, which is the national stage of International Application No. PCT/KR04/00099, filed Jan. 20, 2004, the disclosure of which is incorporated herein.

TECHNICAL FIELD

The present invention relates generally to an apparatus and method for outputting a private image and, more particularly, to an apparatus and method for outputting a private image to a public display so as to prevent unauthorized persons from viewing the private image.

BACKGROUND ART

Portable terminals, such as mobile phones, Personal Digital Assistants (PDAs) and notebook computers, and desktop Personal Computers (PCs) are frequently utilized in public places. At this time, contents on display monitors can be viewed by all the persons located within visible distances from the display monitors. Due to such a security problem, when a computer is used for the writing of text, mail, chatting or video watching and a user does not want other persons to view the contents thereof, the use of a computer is limited. A privacy problem may arise not only when computers are privately used but also when confidential documents are written using computers in corporations or government offices. Besides, the security problem exists in various fields. For example, Automatic Teller Machines (hereinafter referred to as "ATMs") are deployed in public places, so that security information, such as the key inputs of passwords of ATM users and transaction details on screens, can be easily exposed. Accordingly, it is useful to develop a display that provides private information to an authorized user on a public monitor and prevents unauthorized persons from viewing the private information on the same public monitor.

Early Liquid Crystal Display (hereinafter referred to as "LCD") monitors have narrow viewing angles, so that screens look dark when viewed from locations offset from locations in front of the screens. Since the above-described feature is inconvenient in terms of general use, technological efforts have been made to widen the viewing angle thereof. However, the above-described feature is somewhat advantageous in terms of security, and a LCD monitor having the above-described feature may be regarded as the earliest private display. A display having micro blocking members developed from such a concept is disclosed in U.S. Pat. No. 5,528,319 (invented by Russel). However, this scheme is defective in that contents on a display are completely exposed to persons located behind a user.

Another product was made by Sceptre Co. in 1998. This product using polarization is constructed so that a polarizing plate is eliminated from the interior of a typical LCD monitor and then a user views the security monitor using polarizing glasses. However, this product is inconvenient for general use because a user can only view the contents when he wears the polarizing glasses, even in circumstances in which privacy is not important. Furthermore, an unauthorized person wearing glasses having simple polarizing characteristics, such as typical sunglasses, can view the contents, so that security is low.

As a result, this product failed in the market, and the manufacture of this product was stopped. MMI Co. (http://www.man-machine.com/invisivw.htm) somewhat improved this technology and commercially sold a product, to and from which a polarizing plate may be selectively attached and detached, in 2001. However, this product is still defective in that an unauthorized person wearing simple polarizing glasses, such as sunglasses, can view contents.

The most perfect private display is a Head-Mounted Display (hereinafter referred to as an "HMD"). However, the HMD is expensive, heavy to wear and power-consuming because both a display and an optical system are accommodated in glasses.

For displays that are not private displays but technologically related displays, multi-screen displays, in which a single display shows two different types of images, and users having shutter glasses view their own images, respectively, are disclosed in Korean Pat. Appl. No. 1991-0000391 (filed by Samsung Electronic Co. and entitled "multiple-screen display device and viewing device for monitors"), Korean Pat. Appl. No. 1997-0044686 (filed by Samsung Electronic Co. and entitled "video apparatus for simultaneous viewing of two screens") and Korean Pat. Appl. No. 1999-0051191 (filed by Hoyseung Choi and entitled "apparatus for simultaneous reproduction of multi-type images"). The technology, in which the multi-screen display is applied to a game, is disclosed in U.S. Pat. No. 5,963,371 (assigned to Intel Corporation). The multi-screen displays cannot be considered to be private displays because persons other than persons wearing the shutter glasses can view some of the contents displayed on the displays. That is, the shutter glasses are used only to block other images, and there is no provision for a means for protecting private images.

In the present specification, a single display screen distinguished by the vertical sync of a monitor is referred to as a monitor frame; and a section of image data is referred to as an image data frame. The size of a single image data frame may be identical with or different from that of a single monitor frame. A private image (hereinafter referred to as a "P image") is the private, non-public image of an authorized user. A masking image (hereinafter referred to as an "M image") is an image that blocks the P image of an authorized user.

A private display for protecting private information using shutter glasses is currently being implemented. Since this private display is inexpensive, is light to wear and can be developed further, this scheme is regarded as the most competitive method currently. The private display should fulfill all three performance conditions, including 'user visual perception performance,' 'naked eye security performance' and 'anti-peeper security performance.' The 'user visual perception performance' is the performance that allows an authorized user to clearly view an image without visual inconvenience or strain, the 'naked eye security performance' is the performance that prevents unauthorized persons having no shutter from clearly viewing an image, and the 'anti-peeper security performance' is the performance that prevents unauthorized persons or intentional peepers with a shutter from clearly viewing an image.

In the present specification, a shutter opening/closing sequence state value (state information) is the value indicating the extent of opening/closing, and a shutter opening/closing sequence is the sequence of state values corresponding to an image sequence and represented like [0, 1, 0, 1, 0, . . . ]. A shutter opening/closing signal is the signal that is transmitted to control the opening/closing operations of a shutter in accordance with the shutter opening/closing sequence, and generally includes one or more of shutter opening/closing sequence state values.

A P/M image sequence scheme (hereinafter referred to as a "Sun Microsystems' scheme") disclosed in U.S. Pat. No. 5,629,984 by Sun Microsystems, Inc. is illustrated in FIGS. 1a and 1b. This scheme is one of synchronous schemes, which opens/closes shutter glasses while alternately displaying a private image data frame P and a masking image data frame M in accordance with vertical sync Vsync that is the frame sync of a monitor, thus allowing only a user possessing the shutter glasses to view private images. The basic alternation of the P and M image frames is that the P and M image frames are displayed one after another, as shown in FIG. 1a. Alternately, as shown in FIG. 1b, alternation having a ratio of 1:m (m=1, 2, . . . ), in which, whenever the P image frame is displayed one time, the M image frame is displayed m times, has been proposed. The sequence of U.S. Pat. No. 5,629,984, in which P and M images are alternated with each other at a ratio of 1:1, has weak 'anti-peeper security performance' because the sequence can be easily interpreted when a peeper learns a refresh rate and conforms to vertical sync. Furthermore, since only a white flash image is generated as a masking image, it is difficult to conceal a private image. Meanwhile, the sequence, in which P and M images are alternated with each other at a ratio of 1:m (when m is larger than 2), fulfills 'naked eye security performance.' However, as m becomes larger, the number of private images becomes smaller and the difference between an opening duration and a closing duration becomes greater, so that 'user visual perception performance' is degraded. Furthermore, since the alternation sequence of 1:m is a periodic sequence, a peeper can learn m by learning a refresh rate, conforming to a vertical sync and performing scanning, the sequence can be learned without difficulty, so that the alternation sequence of 1:m has weak 'anti-peeper security performance.' Additionally, in the patent, a shutter opening/closing signal is transmitted without being encrypted at every time of opening/closing, so that it is easy for a peeper to intercept the shutter opening/closing signal.

A P/M image sequence scheme (hereinafter referred to as a "IBM's scheme") disclosed in GB Unexamined Pat. Publication No. 2360414 A is illustrated in FIG. 1c. This scheme is one of asynchronous schemes, which transmits a private image data frame P and a masking image data frame M to a monitor in accordance with Data sync Dsync. The data sync Dsync is not in accordance with monitor frame sync Vsync, image data frames are asynchronously displayed, and data sync Dsync is synchronized with shutter glasses. In this scheme, the display periods Dcycle of the P and M image frames are varied and thus encrypted, so that 'anti-peeper security performance' is improved. The shutter opening/closing signal is encrypted by binding a plurality of shutter opening/closing sequences for a certain period and a plurality of image frame display periods, and the encrypted shutter opening/closing signal is transmitted to a shutter. The shutter decodes the encrypted shutter opening/closing signal, and then synchronizes the decrypted shutter opening/closing sequences and image frame display periods with the data sync of image frames using the timer of the shutter. Accordingly, 'anti-peeper security performance' is increased for a peeper to intercept the shutter opening/closing signal. The density of light intensity varies with the regions of the monitor due to the asynchronization between an image frame and a monitor frame, so that it is inconvenient for a user to view images. The non-uniformity of an image occurs in a boundary region where the P image frame is alternated with the M image frame due to the combination of an asynchronization with the finite response time of the shutter, so it is inconvenient for a user to view images. Furthermore, the probability that a P image frame is displayed on a specific region (upper end portion) of a monitor is increased, so that 'naked eye security performance' and 'anti-peeper security performance' are decreased. Even in an asynchronous scheme, an image frame repeatedly alternates between a P image frame and an M image frame, so that the probability that a peeper views a private image through tuning becomes higher. The manufacturing costs of the shutter and power consumption are increased in that the timer is required at a receiving side for the transmission of the encrypted shutter opening/closing signal and synchronization. The masking image data of an M image frame is generated as a simple random pattern image, so that the present scheme is not effective in concealing a private image.

The private display of Mitsubishi Electric Research Laboratory (MERL) disclosed in February of 2002 at a website (http://www.merl.com/papers/TR2002-11/) is based on a synchronous scheme. The private display of MERL generates the inverse image of private image data as masking image data using the time integration of the eye and displays the inverse image, so that unauthorized person is made to view a uniform gray image, which is the mean image of the private image and the inverse image, thereby improving 'naked eye security performance.' In order to improve 'anti-peeper security performance,' a P/M image frame sequence is randomly generated and provided. In particular, using a high-price fast shutter such as Ferroelectric Liquid Crystal (FLC), shuttering based on frames rather than pixels has been proposed. In the MERL's scheme, when a reverse image is generated, the gamma of a monitor is taken into consideration. However, the understanding of human visual perception is insufficient, so that an incomplete reverse image is generated. Furthermore, a long time is required to calculate a reverse image per frame, so that a real-time system cannot be implemented with the MERL's scheme.

In the MERL's scheme, when a reverse image is generated, the gamma of a monitor is taken into consideration. Furthermore, since a long period is required to calculate a reverse image per frame, a real-time system cannot be implemented with the MERL's scheme, so that the MERL's scheme is applied only to a private display for still images. Furthermore, in the private display of MERL, a disturbing image having a cognitive meaning is used as a masking image. In this case, by reducing the dynamic range of a private image compared to a masking image, a disturbing image is made to be more clearly viewed. In this case, the dynamic range is the concept identical with the difference between the maximum and minimum values of a color space, the range of monitor brightness, and the range of voltage applied to a monitor. However in the MERL's scheme, a particular photo image, which is effective in concealing a particular still private image, is used as a disturbing image, so that the MERL's scheme cannot be a systematic and strategic disturbing image generating method and does not take human visual perception characteristics into consideration. Furthermore, the MERL's scheme does not present a method of providing a disturbing image per frame in real time, so that the MERL's scheme can be applied only to a private display for still images.

DISCLOSURE OF THE INVENTION

Accordingly, the present invention has been made keeping in mind the above problems occurring in the prior art, and an object of the present invention is to generate a masking image that is more effective in concealing a private image in view of human visual characteristics.

Another object of the present invention is to generate a masking image that conceals a private image in real time.

A further object of the present invention is to provide a method of combining a private image and a masking image capable of improving both user visual perception performance and security performance in a private image output apparatus.

Yet another object of the present invention is to provide a private image output method that displays two or more different image frames for a single monitor frame period while fulfilling user visual perception performance, thus improving 'anti-peeper security performance.'

In order to accomplish the above object, the present invention provides an apparatus for outputting a private image using a public display, comprising means for generating at least one private image; means for generating at least one masking image that masks the private image; means for generating an image sequence of the private image and the masking image; and means for outputting the private image and the masking image to the display according to the image sequence; wherein the masking image generating means generates a dynamic inverse image of the private image as the masking image according to a refresh rate of the display and the image sequence.

Additionally, the present invention provides an apparatus for outputting a private image using a public display, comprising means for generating at least one private image; means for generating at least one masking image that masks the private image; means for generating an image sequence of the private image and the masking image; and means for outputting the private image and the masking image to the display according to the image sequence; wherein the masking image generates a disturbing image based on human visual perception characteristics as the masking image.

Additionally, the present invention provides an apparatus for outputting a private image using a public display, comprising means for receiving at least one private image from an external server or generating a private image by itself; means for receiving at least one masking image from an external server; means for generating an image sequence of the private image and the masking image; and means for outputting the private image and the masking image to the display according to the image sequence.

Additionally, the present invention provides an apparatus for outputting a private image using a public display, comprising means for receiving at least one private image from an outside of the apparatus; means for generating at least one masking image that masks the private image; means for generating an image sequence of the private image and the masking image; and means for outputting the private image and the masking image to the display according to the image sequence.

Additionally, the present invention provides an apparatus for outputting a private image using a public display, comprising means for receiving at least one private image from an outside of the apparatus; means for generating at least one masking image that masks the private image; means for receiving an image sequence of the private image and the masking image; and means for outputting the private image and the masking image to the display according to the image sequence.

Additionally, the present invention provides an apparatus for outputting a private image using a public display, comprising means for generating at least one private image; means for generating at least one masking image that masks the private image; means for generating an image sequence of the private image and the masking image; and means for outputting the private image and the masking image to the display according to the image sequence; wherein the masking image generating means comprises a color table storage unit having a color table for generation of the masking image and an image conversion unit generating the masking image with reference to the color table for generation of the masking image.

Additionally, the present invention provides a method of outputting a private image using a public display and a shutter, comprising selecting a rule for mixing private at least one image and at least masking image to fulfill security performance and user visual perception performance; generating an image sequence of the private image and the masking image according the mixing rule; generating a shutter opening/closing signal corresponding to the image sequence to fulfill the user visual perception; outputting the private image and the masking image to the display according to the image sequence; and opening/closing the shutter according to the shutter opening/closing signal.

Additionally, the present invention provides a method of outputting a private image using a public display and a shutter, comprising generating an image sequence of at least one private image and at least one masking image using a method of inserting phase change aperiodicity by limiting a maximum allowable repetitive number of unit repetitive periods each composed of at least one private image and at least one masking image; generating an image sequence of at least one private image and at least one masking image to fulfill user visual perception performance; outputting the private image and the masking image to the display according to the image sequence; and opening/closing the shutter according to the shutter opening/closing signal.

Additionally, the present invention provides a method of outputting a private image using a public display and a shutter, comprising generating an image sequence of at least one private image and at least one masking image using a method of limiting a maximum allowable repetitive number of images having a same characteristic; generating a shutter opening/closing signal corresponding to the image sequence to fulfill user visual perception performance; outputting the private image and the masking image to the display according to the image sequence; and opening/closing the shutter according to the shutter opening/closing signal.

Additionally, the present invention provides a method of outputting a private image using a public display and a shutter, comprising generating an image sequence of at least one private image and at least one masking image using a method of inserting phase change aperiodicity by limiting a maximum allowable repetitive number of unit repetitive periods each composed of at least one private image and at least masking image while limiting a maximum allowable consecutive number of images having a same characteristic; generating a shutter opening/closing signal corresponding to the image sequence to fulfill user visual perception performance; outputting the private image and the masking image to the display according to the image sequence; and opening/closing the shutter according to the shutter opening/closing signal.

Additionally, the present invention provides a method of outputting a private image using a public display and a shutter, comprising generating an image sequence of at least one private image and at least one masking image using a method of inserting phase change aperiodicity by limiting a maximum allowable repetitive number of unit repetitive periods each composed of at least one private image and at least masking image; generating a shutter opening/closing signal corresponding to the image sequence to fulfill user visual perception performance; outputting the private image and the masking image to the display according to the image sequence; and opening/closing the shutter according to the shutter opening/closing signal; wherein the generation of the shutter opening/closing signal is performed in such a way that the shutter is opened/closed at an intermediate state in a vicinity of a location where the phase change aperiodicity is inserted.

Additionally, the present invention provides a method of outputting a private image using a public display and a monitor, comprising selecting a rule of arrangement of at least one private image and at least one masking image to mask a specific region of the monitor; generating an image sequence of the private image and the masking image according the arrangement rule; generating a shutter opening/closing signal corresponding to the image sequence to mask a specific region of the monitor; outputting the private image and the masking image to the monitor according to the image sequence; and opening/closing the shutter according to the shutter opening/closing signal.

Additionally, the present invention provides a method of outputting a private image using a public display and a monitor, comprising selecting a rule for arranging private images and masking images to be alternated with each other at least two times for a single monitor frame; generating an image sequence of private images and masking images according the arrangement rule; generating a shutter opening/closing signal to correspond to the image sequence; outputting the private image and the masking image to the monitor according to the image sequence; and opening/closing the shutter according to the shutter opening/closing signal.

Additionally, the present invention provides a method of outputting a private image using a public display and a monitor, comprising selecting a rule for arranging private images and masking images to be alternated with each other at least two times for a single monitor frame; generating an image sequence of private images and masking images according the arrangement rule; generating a shutter opening/closing signal to correspond to the image sequence; outputting the private image and the masking image to the monitor according to the image sequence; and opening/closing the shutter according to the shutter opening/closing signal; wherein masking images having different characteristics are output to regions of the monitor.

Additionally, the present invention provides a method of outputting a private image using a public display and a monitor, comprising selecting a rule for arranging private images and masking images to be alternated with each other at least two times for a single monitor frame; generating an image sequence of private images and masking images according the arrangement rule; generating a shutter opening/closing signal to correspond to the image sequence; outputting the private image and the masking image to the monitor according to the image sequence; and opening/closing the shutter according to the shutter opening/closing signal; wherein a private image or connecting image is output for a response time of the shutter.

BRIEF DESCRIPTION OF THE DRAWINGS

Hereinafter, with reference to the attached drawings, the embodiments of the present invention are described in detail. For ease of description, in the drawings, the same reference numerals are used to designate the same or similar components.

FIG. 18 is a view showing an example of a pattern used to generate a dynamic inverse image through a dynamic pattern test method according to the present invention;

BEST MODE FOR CARRYING OUT THE INVENTION

[System Configuration]

A private display can be widely used for a variety of monitor display devices, such as a desktop PC, a notebook computer, a PDA, a mobile phone, a Television (TV), a Digital Versatile Disk (DVD), an ATM/Cash Dispenser (CD), and a door lock information input device. The present invention is described below on the basis of an embodiment of a PC monitor that is a typical one of the above-described devices. Those skilled in the art can easily modify the embodiment and apply the modification to other display devices. Generally, other display devices have structures simpler than that of the PC monitor, so that a private display device can be implemented with some of the indispensable elements of the PC monitor embodiment excluded.

Figure 2:
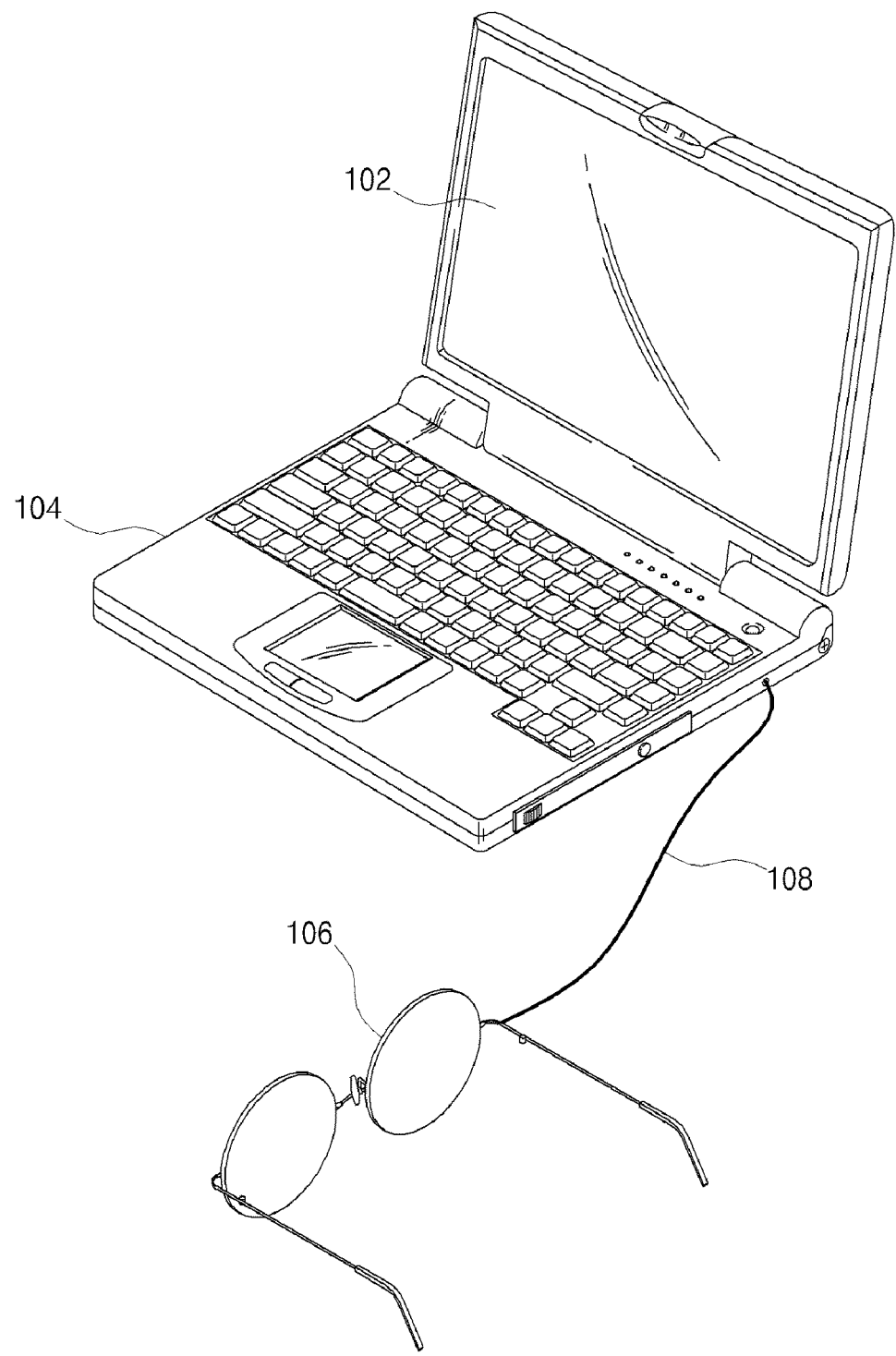
FIG. 2 is a system configuration diagram of a notebook computer embodiment to which the present invention is applied.

FIG. 2 is a basic configuration diagram of an embodiment applied to a notebook computer. As shown in this drawing, the embodiment includes a computer 104 equipped with a monitor 102, a shutter opening/closing means 106 performing optical filtering, a wired/wireless communication means 108 connecting the computer 104 with the shutter opening/closing means 106, and private display software (not shown). The computer 104 may include the private display software by storing the private display software in computer-readable memory. The computer 104 allows only authorized persons to view a private image in such a way as to display the private image and a masking image for masking the private image on the monitor 102 in response to a user's request or spontaneously, and to transmit a shutter opening/closing signal to the shutter opening/closing means 106, and thus operate the shutter opening/closing means 106. In this case, the computer 104 collectively refers to a variety of information devices that display images on monitors, such as a desktop monitor, a notebook computer, an PDA, a mobile phone, a TV, a DVD, an ATM/CD, and a door lock information input device.

The shutter opening/shutting means 106 may be a mechanical means, or a photoelectric means, such as a liquid crystal shutter. The shutter opening/closing means 106 may be fabricated in various forms, such as glasses having one or more shutter lenses, a shutter structure having a support, or a shutter cap. FIG. 2 illustrates a shutter opening/closing means in a shutter glasses form.

In the case where the computer 104 is used in bright circumstances, a problem may arise in that ambient light reflected from the monitor 104 is incident on the user's eye and the contrast of a monitor image is lowered. In the present embodiment, an ambient light blocking filter (not shown), such as "3M™ Privacy Computer Filter" sold by 3M Company, is attached on the front of the monitor 102. The ambient light blocking filter is an optical filter, the transmittance of which depends on an incident angle and which blocks light having an incident angle greater than a certain angle. The ambient light blocking filter consists of a film having microlouvers functioning like a window shade, and blocks light incident at an angle greater than a certain angle. In another embodiment, the brightness of a monitor is improved by attaching a brightness enhancement film, such as "Vikuiti™ Display Enhancement Film" sold by 3M Company, to the front of the monitor. When such a filter is attached to the front of the monitor, ambient light incident on and reflected from the monitor 102 can be effectively blocked, but ambient light directly incident on the shutter opening/closing means 106 cannot be blocked. To block ambient light directly incident on the shutter opening/closing means 106, the ambient light blocking filter is attached to the shutter opening/closing means 106. When the ambient light blocking filter is attached, the contrast of an image that the user perceives is increased, but the entire brightness of the monitor is somewhat decreased. It is designed that the ambient light is attached in a bright place and detached in a dark place.

Figure 3:
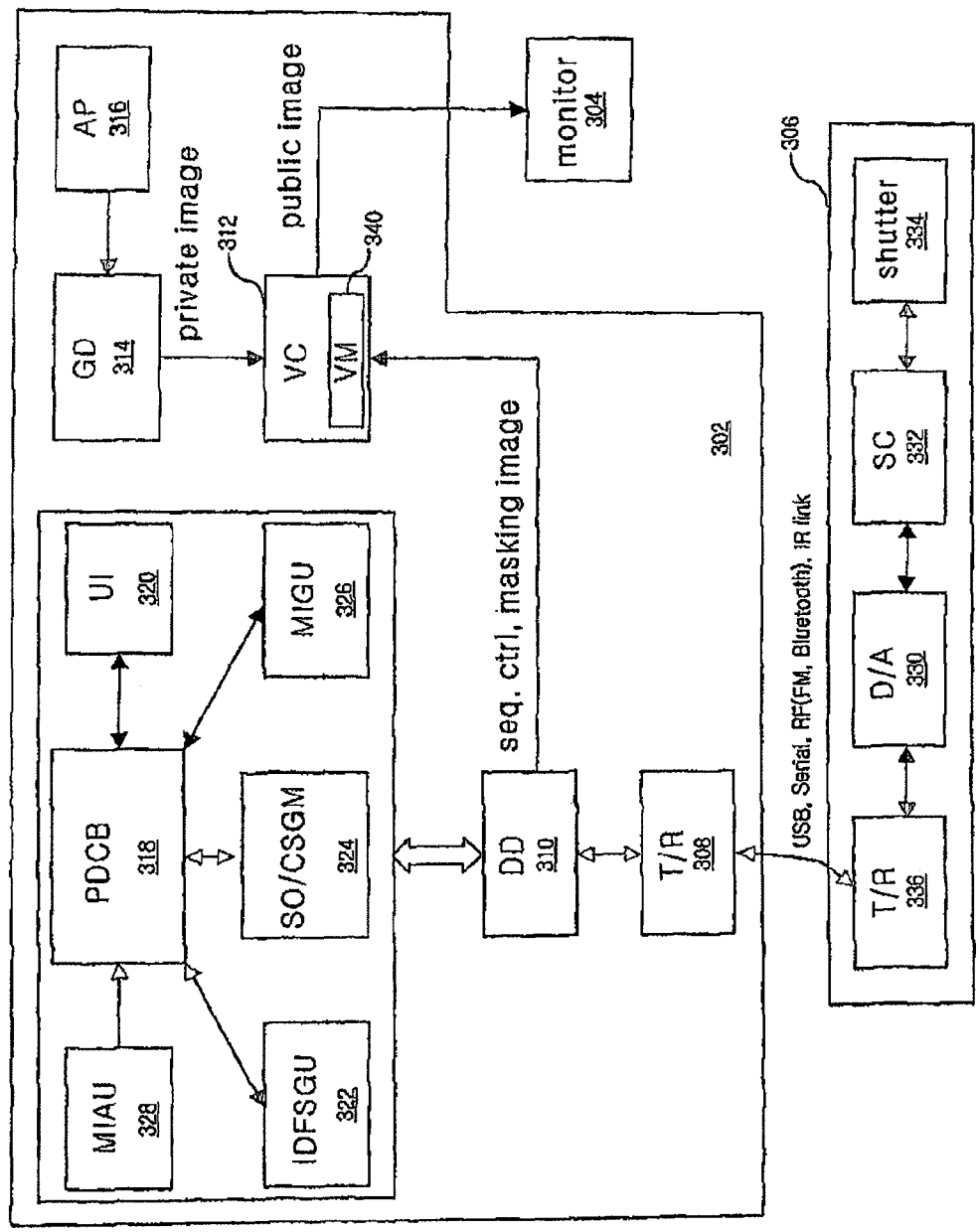
FIG. 3 is a system configuration diagram showing an embodiment of a software method-dedicated driver in accordance with the present invention.

FIG. 3 is a system configuration diagram showing an embodiment of a software method-dedicated driver according to the present invention. The software method imports that all functions, except the functions of a shutter unit 306 and a transmission/reception interface 308, are implemented using software. A dedicated driver 310 refers to a driver that accesses a video controller 312, such as a graphic card, and implements private display in real time, independent of a graphic driver 314 in a PC 302.

A private display control block 318 is composed of a security performance control means, an encryption means, a user authentication means and a management means. The private display control block 318 authenticates a user accessed through a user interface 320, and sets and manages a security level depending on a user's authentication level and a user's input. A method of authenticating the user may be implemented in such a way that the user is authenticated based on the input identification number and password of the user. In another embodiment, the user authentication may be implemented in such a way as to connect an authorized shutter opening/closing means without an identification number (hereinafter referred to as an "ID") and a password. In still another embodiment, the user authentication may be implemented in such a way as to connect an authorized shutter opening/closing means and receive an authorized ID and a password. The authentication of an authorized shutter opening/closing means and a genuine product is performed using the serial numbers of products stored in the Read Only Memory (ROM) of the shutter unit 306. The private display control block 318 receives monitor information on the basis of a user's authentication level and a display's security level, and controls an image data frame sequence generating means 322, a shutter sequence and shutter opening/closing signal generating unit 324, and a masking image generating means 326. A monitor information acquiring means 328 reads information about the resolution of a monitor, refresh cycle time, vertical sync and horizontal sync.

The image data frame sequence generating means 322, the shutter sequence and shutter opening/closing signal generating unit 324 and the masking image generating means 326 generate an image data sequence, a shutter opening/closing sequence and a shutter opening/closing signal, and a masking image according to the user's authentication level, the display's security level and a user's additional selection, respectively. The shutter sequence and shutter opening/closing signal generating unit 324 generates a shutter opening/closing sequence in synchronization with the image data frame sequence, and generates a shutter opening/closing signal at current time according to the shutter opening/closing sequence.

The dedicated driver 310 provides a masking image generated in the masking image generating means 326 to video memory 328 according to the generated image data frame sequence, spontaneously generates a masking image according to the instruction of the masking image generating means 326, and controls the change of a color table in real time. The dedicated driver 310 controls image transmission to the monitor 304 by making the video controller 312 switch the private image memory block and the masking image memory block.

The transmission/reception unit 308 transmits a shutter opening/closing signal to the shutter opening/closing means 306. The transmission/reception unit 308 can transmit an encrypted shutter opening/closing signal to an authorized user using the encryption means (not shown). The transmission/reception units 308 and 336 can be implemented through a wired link, such as a Universal Serial Bus (USB) and a serial link, or a wireless link, such as an InfraRed (IR) link and a Radio Frequency (RF: Frequency Modulation (FM), Amplitude Modulation (AM) or Bluetooth) link. The video controller 312, such as a graphic card, is provided with video memory, and displays an original video image, which is received from the graphic driver 314, and a masking image, which is received from the dedicated driver 310, on the monitor 304 according the image data frame sequence.

As illustrated in the drawing, the shutter opening/closing means 306 includes a transmission/reception unit 310, a decoder/authentication means 330, a shutter controller 332 and a shutter 334. The transmission/reception unit 310 receives the encrypted shutter opening/closing signal transmitted from the transmission/reception unit 308, and transmits the encrypted shutter opening/closing signal to the decoder/authentication means 330. The decoder/authentication means 330 acquires a shutter opening/closing sequence state value by decrypting the encrypted shutter opening/closing signal, and the shutter controller 332 fully opens/closes or half opens/closes the shutter 334 according to the shutter opening/closing sequence state value.

The display security level is set to 'naked eye security performance' for an unauthorized person, and to 'anti-peeper security performance' for an unauthorized person having another shutter. In general, as the display security performance becomes higher, 'user visual perception performance,' such as the visual comfort and clarity of the user, becomes lower. Such display security level can be defined in various ways. In an embodiment, at a first level, an unauthorized person cannot perceive even the approximate type of user private images even though the unauthorized person views a monitor for a period longer than a certain period. This level is the strictest security level, in which, for example, it cannot be found out whether the user uses a word processor or views moving images. At a second level, the approximate type of user images can be perceived when an authorized person views a monitor for a period longer than a certain period. However, the unauthorized person cannot perceive a part of the content of user private images. For example, the unauthorized person can perceive that the user are viewing moving images, but cannot find out whether the user is viewing a movie or engaging in chatting. At a fourth level, an unauthorized person can accurately perceive a part of the content of user private images when the unauthorized person views a monitor for a period longer than a certain period. However, the authorized person cannot learn most of the contents of the user private images. For example, the unauthorized person can somewhat perceive the content of a document word-processed by the user, or the content of a motion picture. At a fifth step, an unauthorized person can perceive a considerable part of the contents of the user private images. However, the unauthorized person feels uncomfortable in viewing the user private images. In another embodiment, an additional performance index indicating the extent, to which user private images and a masking image are perceived by unauthorized person, may be added to the performance level. In this case, more various display security levels can be set.

Figure 4:
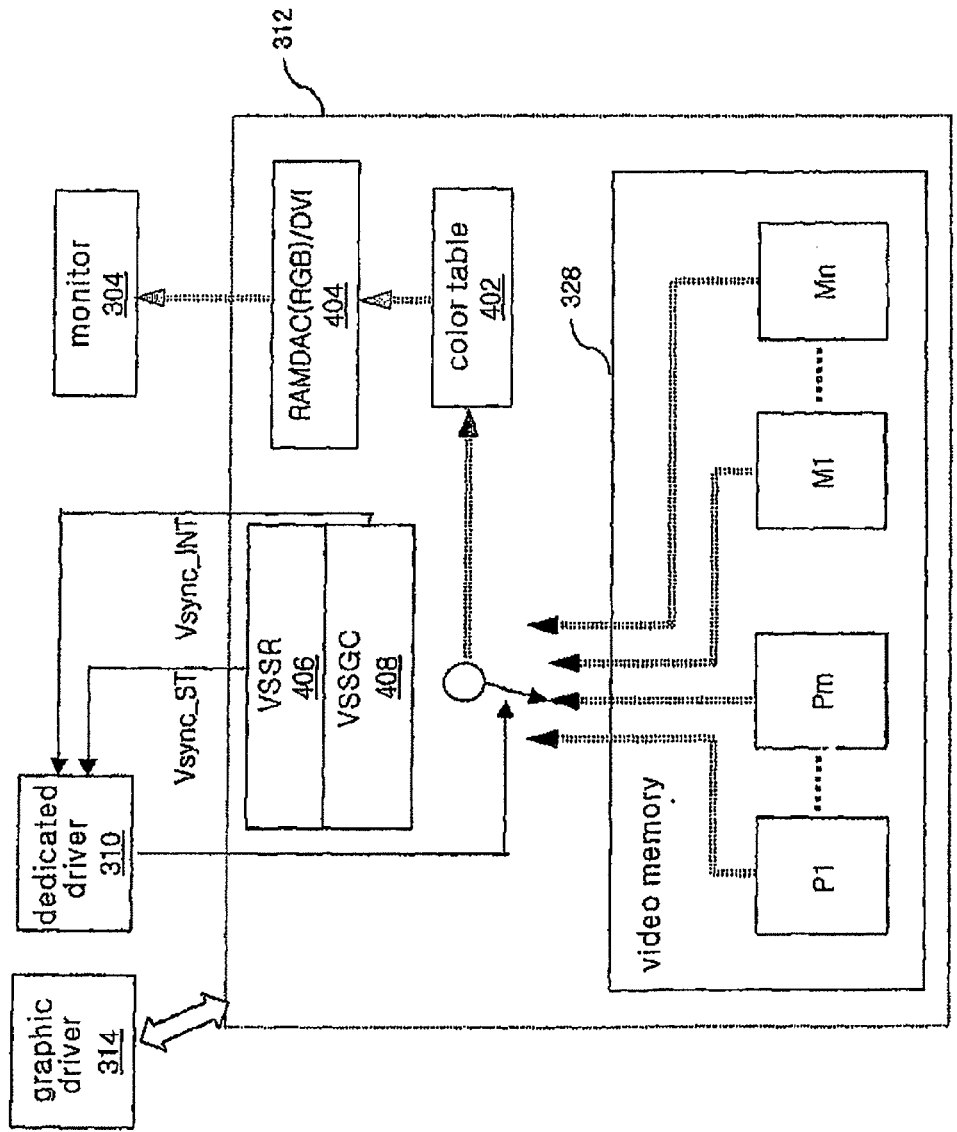
FIG. 4 is a block diagram showing an example of a video controller shown in FIG. 3.

FIG. 4 is a view showing the video controller 312 and the video memory 328 using functional blocks. As illustrated in the drawing, according to the position of the image memory, private image memory blocks are indicated with P1~Pm, and masking image memory blocks are indicated with M1~Mn. P1~Pm are blocks managed by the system, and M1~Mn are masking frames generated for masking by the dedicated driver 310 that is a kernel driver. Each of the memory blocks is selected by a method, such as flipping, and transmitted to the monitor 304 through a color table 402 functioning as an image value (RGB value) converter and RAMDAC (RFG)/DVI monitor connection unit 404. In an embodiment, each of the memory blocks P1~Pm and M1~Mm corresponds to the size of a single monitor frame. The dedicated driver 310 generates a thread, and updates image data in the masking image memory blocks M1~Mn randomly set in the video controller 312 whenever a spare period occurs in the Central Processing Unit (CPU). The dedicated driver 310 checks the vertical sync status register 406 of the video controller 312 in a polling method, or causes a selected image frame to be displayed in such a way as to hook a vertical sync interrupt Vsync_INT generated in the vertical sync generating circuit 408 and applied to the system, to select one of the image frames P1~Pm and M1~Mn in synchronization with the vertical sync signal, and to record the starting address of the selected frame in the frame starting address register of the video controller 312.

In another embodiment, an image frame selected in synchronization with a certain horizontal sync signal may be made to be displayed. In a color table changing method to be described below, there can be obtained the effect of converting a private image into a masking image in such a way as to perform random image value conversion by randomly changing the color table using the dedicated driver while a private image block is transmitted to the monitor. In still another embodiment, a filter driver can be inserted instead of the dedicated driver of FIG. 3. The filter driver functions like the dedicated driver 310, and is involved and operated like a filter when the graphic driver 314 accesses the video memory 328. In still another embodiment, an alternative driver method may be employed. This method integrates the function of a dedicated driver with the function of an existing graphic driver and performs control using a single driver.

Masking images may be classified according to masking characteristics. The masking characteristics are represented using a superscript notation as follows. An original image-derived image is represented using $M^t$, an intentionally disturbing image is represented using $M^d$, and a connecting image frame for smooth shutter opening/closing or a smooth image change is represented using $M^b$. For a masking image in which an original image-derived image and a disturbing image are mixed with each other, the type in which the original image-derived-image is main- and the disturbing image is added to the original image-derived image is represented using $M^t$, the type in which the disturbing image is principal and the original image-derived image is added to the disturbing image is represented using $M^d$, the type in which and the original image-derived image and the disturbing image have the same importance or the importance of the two images is not clear is represented using either $M^t$ or $M^d$.

The original image-derived image is a masking image derived from a private image that is an original image, which includes an inverse image, the differential or integral image of the original or inverse image, the filtered image of the original or inverse image, and the shifted image of the original image. The disturbing image collectively refers to masking images except for an original image-derived image. The connecting image frame for smooth shutter opening/closing or a smooth image frame change is an image frame that is inserted so as to enable smooth shutter opening/closing or a smooth image frame change. The connecting image frame refers to a blank image frame, a uniform gray image frame or a uniform color image frame.

Figure 5:
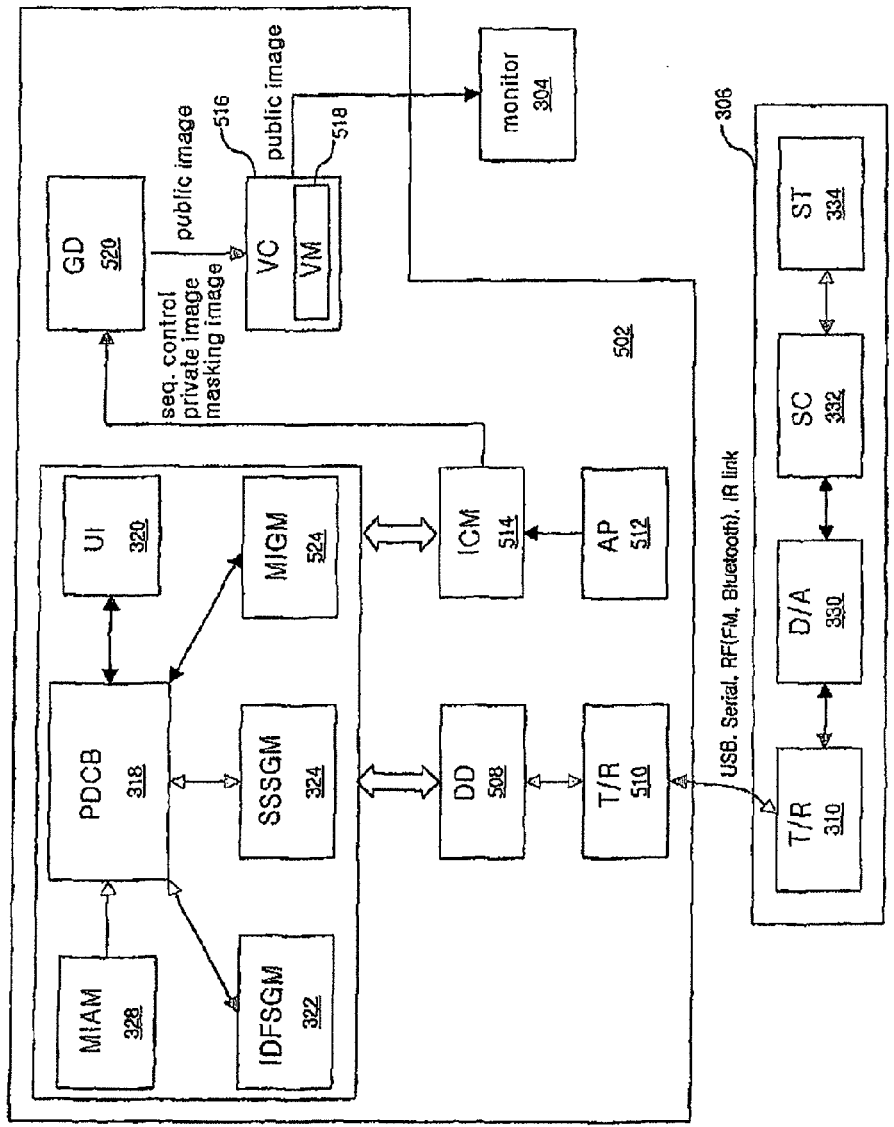
FIG. 5 is a system configuration diagram of software type application level embodiment in accordance with the present invention.

In another embodiment, the principal functions of the dedicated driver may be implemented at an application level, as shown in FIG. 5. In this case, the dedicated driver 508 is in charge of transmitting a shutter opening/closing sequence through the transmission/reception unit 510 and controlling the real-time change of the color table. An image control means 514 at an application level provides a masking image to video memory 518 according to the generated image data frame sequence, and spontaneously generates the masking image according to the instruction of the masking image generating means 524 and provides the masking image to the video memory 518. The image control means 514 at the application level makes the video controller 516 control the transmission of an image to the monitor 504 by switching a private image to a masking image and vice versa according to the generated image sequence. In an embodiment, the image control means at the application level may be implemented by a flipping method using DirectX. In another embodiment, the image control means 514 produces a virtual desktop and displays the virtual desktop to the user. In still another embodiment, the image control means 514 can expand a desktop and control the movement of the original point of the desktop.

Figure 6A:
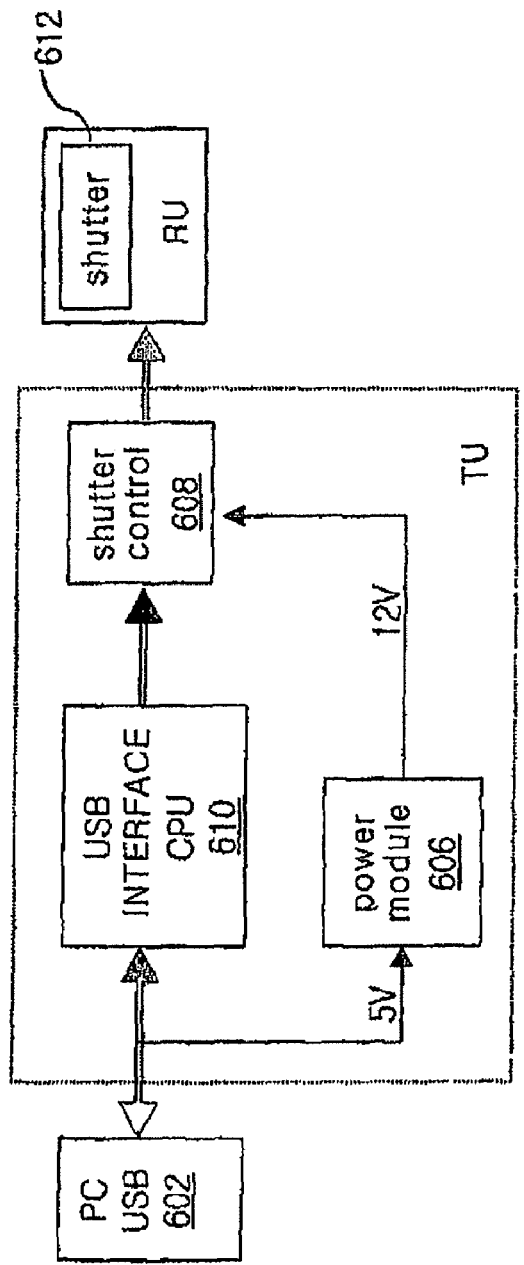
FIGS. 6a to 6c are configuration diagrams showing examples of wired/wireless communication interfaces located between computer bodies and shutter opening/closing means.
Figure 6B:
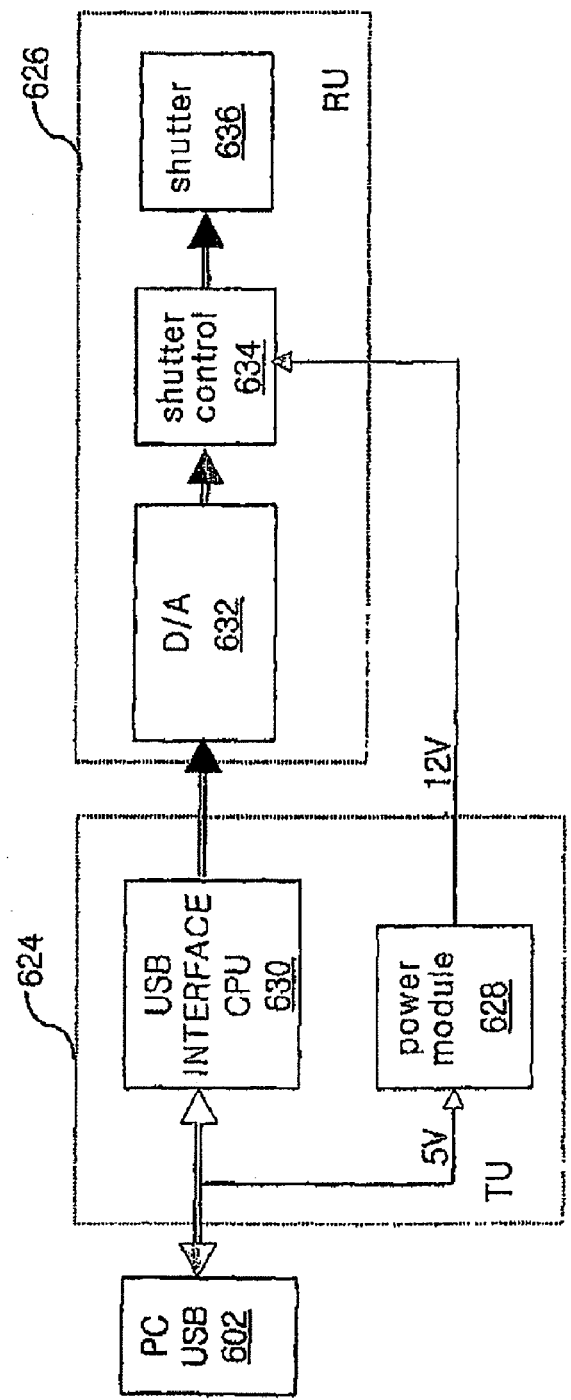
Figure 6C:
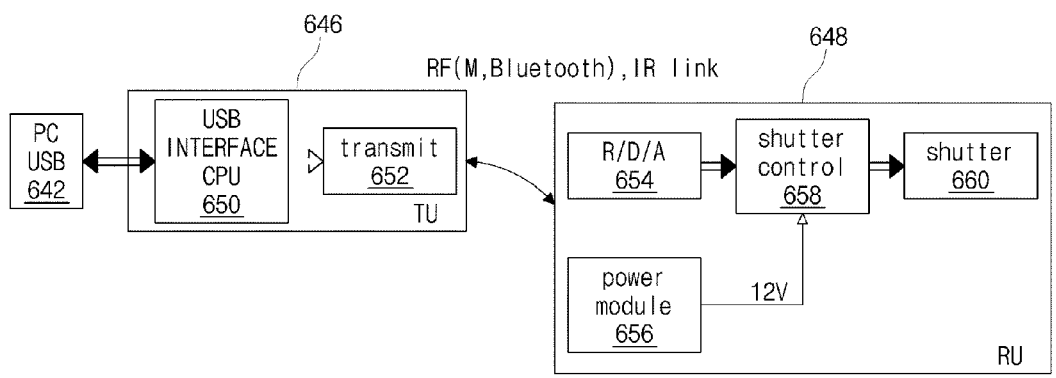

FIG. 6 is block diagrams showing the wired/wireless communication interface located between a body 502 and the shutter opening/closing means 306 shown in FIGS. 3 and 5. The communication interface can be implemented with a wired link, such as a USB, IEEE 1394 or a serial link, or a wireless link, such as IR or RF (FM, AM or Bluetooth). In an embodiment, in the USB wired link shown in FIG. 5, a USB system receives a signal indicating the opening/closing of a shutter and the extent of the opening/closing thereof from the USB port 602 of a PC. The USB system obtains voltages required for the control of the shutter in such a way as to receive a power of +5V from the USB port 602 of the PC and boosts the power of +5V to powers of +12V and +15V using a power module 606. The shutter controller 608 receives a control signal from a USB CPU 610, and applies a voltage to the shutter 612 in the glasses. The control signal can be implemented using modulation, such as a Pulse Width Modulation (PWM), or with a Direct Current (DC) voltage. The embodiment of the wired link, in which a decoder/authentication means 632 is additionally included in a shutter unit 626 is constructed, as shown in FIG. 6b. In the embodiment of FIG. 6a, the shutter controller 608 is included in the transmission unit 604. In contrast, in the embodiment of FIG. 6b in which a private image can be viewed using an authorized shutter, a shutter controller 634, along with a decoder/authentication means 632, is included in a reception unit 626 and an encrypted shutter opening/closing signal is transmitted to the reception unit 626. In another embodiment of the wireless link shown in FIG. 6c, a transmission unit 646 including a transmitter 652 is connected to the USB system of a computer, and a computer, and a reception unit 648 includes a shutter 660, a receiver/decoder/authentication means 654, a power module 656 and a shutter controller 658.

Figure 7:
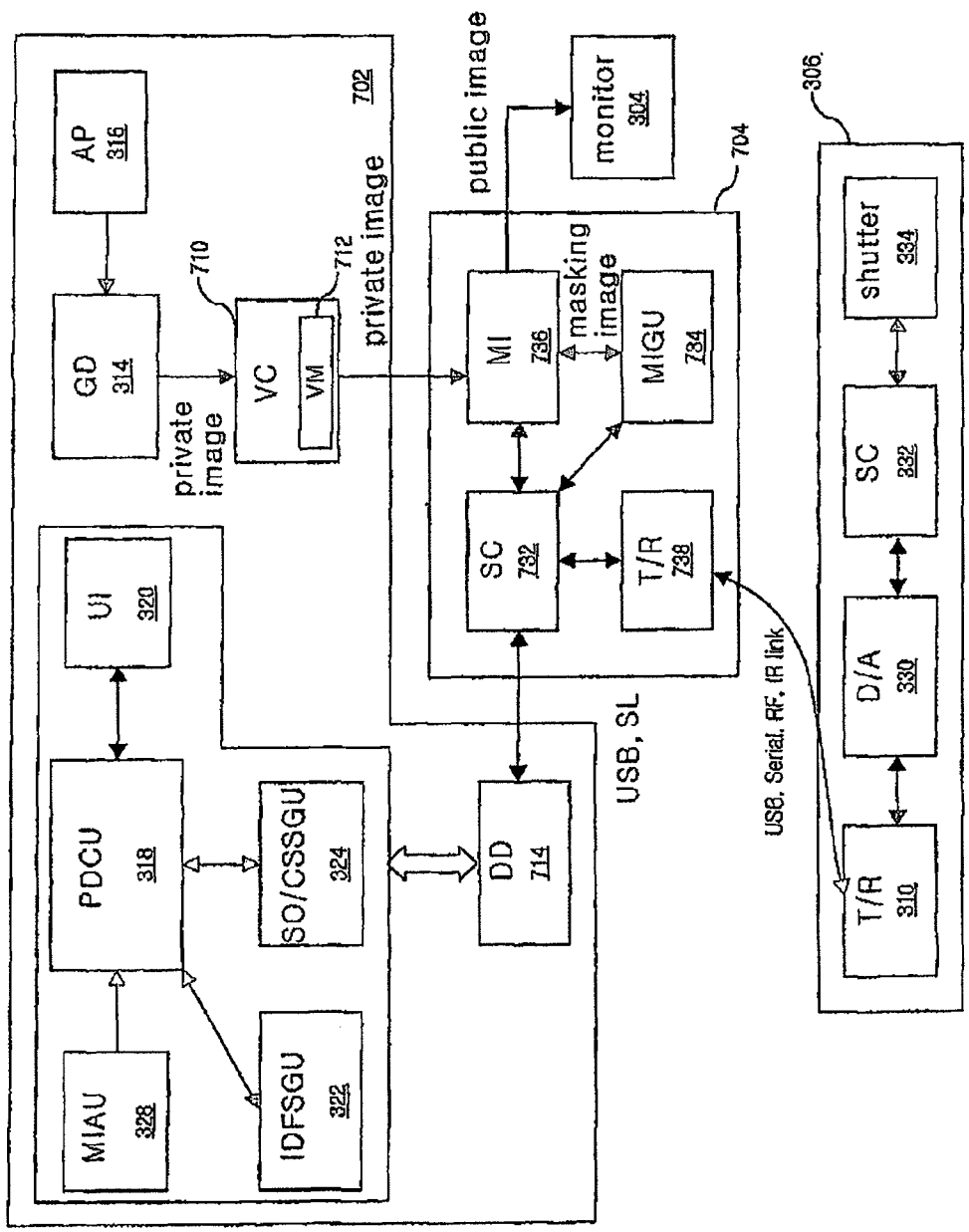
FIG. 7 is a system configuration diagram showing an embodiment of a hardware type external controller in accordance with the present invention.

FIG. 7 is a system configuration diagram showing an embodiment of a hardware type external controller in accordance with the present invention. In comparison with a software type controller in which all the functions, except the functions of a shutter and a transmission and reception interface, are implemented with software, a hardware (hereinafter referred to as "HW") type controller refers to the controller in which core functions, such as sequence control, the generation of a masking image and the combination of a private image with a masking image, are implemented with hardware. For the hardware type controller, there are various embodiments, including an internal type controller, an independent card type controller, a graphic card incorporating type controller, a graphic chip incorporating type controller and a monitor incorporating type controller. These embodiments have common features in which core functions, including sequence control, the generation of a masking image and the combination of a private image with a masking image, are implemented with circuits. These embodiments can be changed to each other by a simple change in circuits according to the location of a core function circuit relative to the monitor 304 and the computer 702. The external type controller is the type of controller in which the core function circuit is implemented outside the monitor 304 and the computer 702, the independent type controller is the type of controller in which the core function circuit is implemented in the form of a card to be inserted into the computer, and the graphic card incorporating type controller is the type of controller in which the core function circuit is added to a graphic chip. The graphic chip incorporating type controller is the type of controller in which the core function circuit is added to a graphic chip, and the monitor incorporating type controller is the type of controller in which the core functions are added to a drive circuit in a monitor. Of these various type controllers, the HW and external type embodiment shown in FIG. 7 is described below as a representative.

The HW type controller connects a video controller 710 to a monitor 304 through a core function circuit 704 rather than directly connecting the video controller 710 to the monitor 304. In the SW type controller, a dedicated driver performs the functions of sequence control, masking image generation and transmission, and shutter opening/closing means connection, while in the HW type controller, the dedicated driver 714 simply performs the functions of software and hardware connections. In the HW type controller, sequence control, the generation of a masking image, and the combination of a private image with a masking image is implemented with a single external circuit 704. That is, the core function circuit 704 includes a sequence controller 732 performing control according to the image sequence of private images and a masking image and a shutter opening/closing signal, a transmission/reception unit 738 transmitting the shutter opening/closing signal to a shutter opening/closing means 306, a masking image generating means 734 generating the masking image, and a monitor interface 736 transmitting the private images transmitted from the video controller 736 according to the image sequence and the masking image transmitted from the image generating means 734 to the monitor 304.

Figure 8:
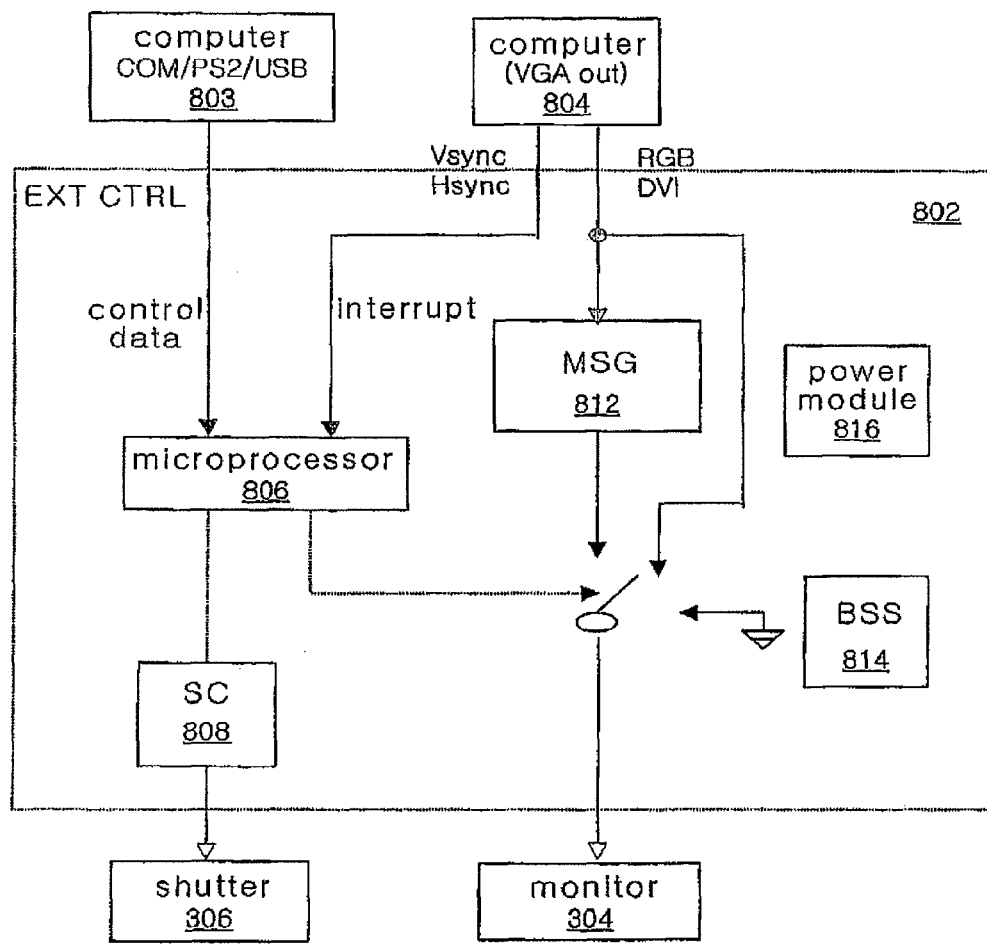
FIG. 8 is a block diagram showing an example of the external controller of FIG. 7.

FIG. 8 is a block diagram of an HW type external controller. The external controller 802, in which a core function circuit is implemented, is provided with control information (drive or stop information) or sequence information from the COM, PS2 or USB port of the computer and notifies the computer of the state of the external controller 802. Furthermore, the external controller 802 receives a RGB signal, a DV1 signal, a vertical sync signal Vsync and a horizontal sync signal Hsync from the VGA output terminal 804 of the computer. The vertical sync signal Vsync or horizontal sync signal Hsync causes an interrupt to the microprocessor 806 of the external controller 802, and the microprocessor 806 set a signal to be output by applying a sequence provided by the computer or generated therein. At this time, the external controller 802 determines opening/closing or the extent of opening/closing by applying an appropriate DC voltage or a PWM signal having a duty corresponding to the DC voltage using a shutter controller 808.

A masking image signal generator 812 manipulates the RGB or DV1 signal of a private image obtained from the VGA output terminal 804 and generates a random disturbing signal by itself. In the HW type controller, the generation of the masking image is implemented with the generation of an inverse image using an inverting circuit with respect to the RGB or DV1 signal of a private image, the generation of an original image-derived image using a differentiator circuit, an integrator circuit or one of various filters, the generation of a random noise masking image, the generation of a disturbing image using a self image storage module, or the generation of an image using the appropriate combination thereof. The masking image signal generator 812 functions as a converter for converting a RGB value. A method of generating an inverse image is implemented in such a way as to invert a signal on the basis of a random reference value between the maximum and minimum values of a RGB signal, and thus generate an analog signal. The reference value is randomly regulated in view of human visual characteristics, and thus can have a bias from an average value. A blank signal source 814 can generate a gray frame by applying a constant voltage to the monitor 304 irrespective of the RGB signal, and can be used for the purpose of a smooth screen change. Furthermore, there is used a method of making a masking image brighter than a private image by allowing the masking image to be transmitted to the monitor 304 through a boosting circuit. The HW type controller can implement boosting and the generation of random noise without the burden of calculating time.

Figure 9:
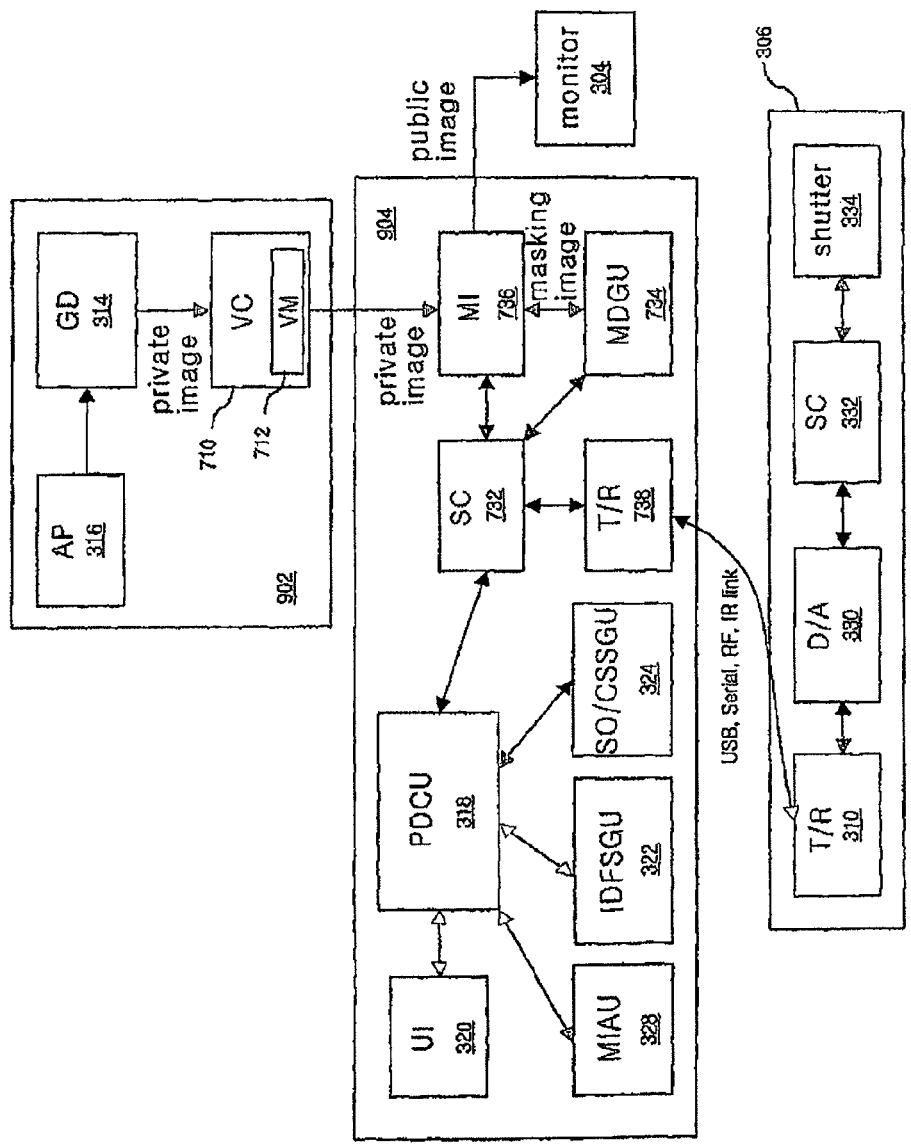
FIG. 9 is a system configuration diagram showing an embodiment of a fully independent hardware type external controller in accordance with the present invention.

FIG. 9 is a system configuration diagram showing an embodiment of a fully independent HW type external embodiment according to the present invention. The fully independent HW type controller is the type of controller in which most of the functions of private display are implemented with independent hardware. In this type controller, the video controller 710 of a computer system 902 is not directly connected to a monitor 304, but the video controller 710 is connected to the monitor 304 through independent hardware 904. Since most or all of the functions of a private display are implemented with the independent hardware 904, there is an advantage in that a need to change a software part for implementing the private display to correspond to the computer system 902 is reduced.

Figure 10:
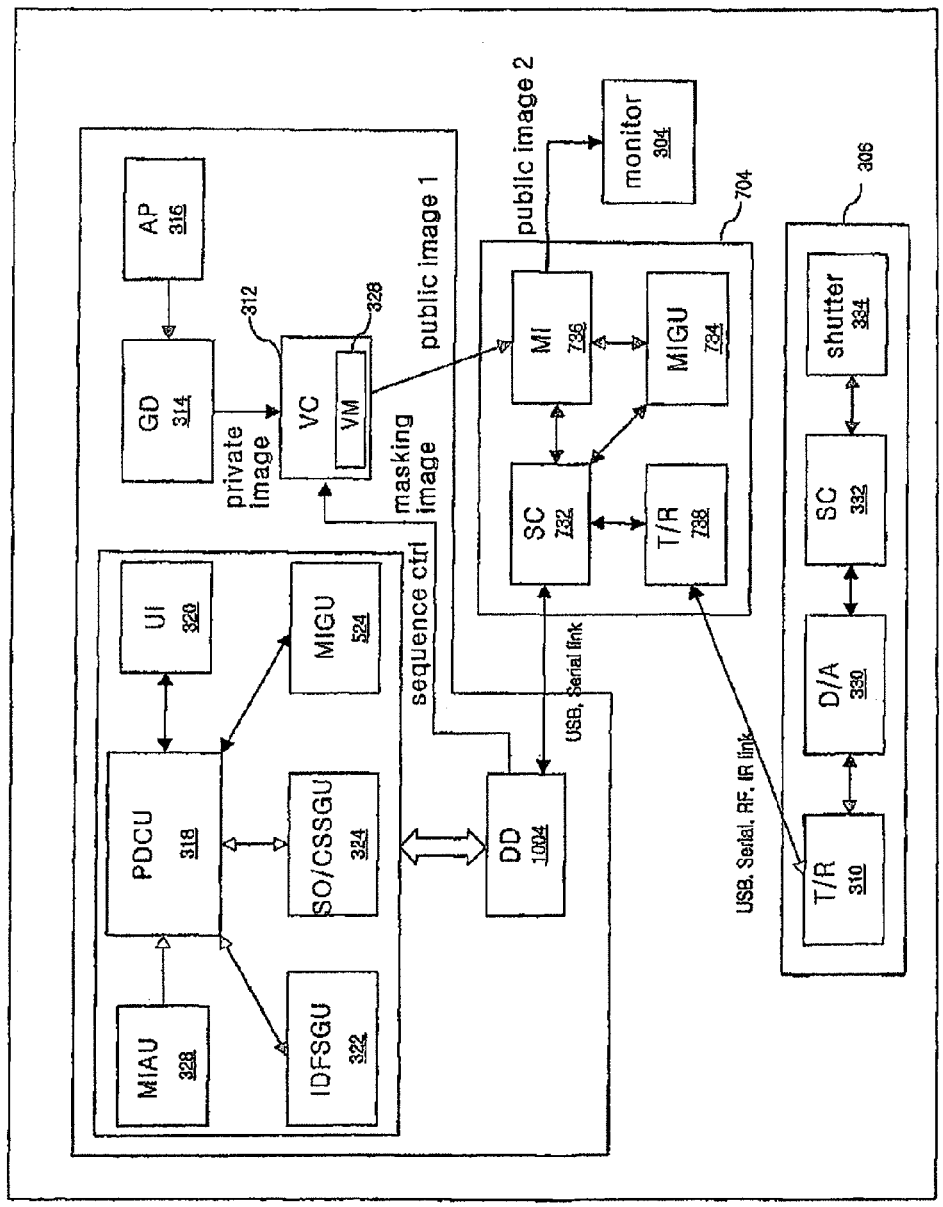
FIG. 10 is a system configuration diagram showing an embodiment of a combined SW/HW type external controller in accordance with the present invention.

FIG. 10 is a system configuration diagram showing an embodiment of a combined SW/HW type external controller. This system combines the SW type with the HW type, and thus implements a private display. In particular, the principal point of the system is that a dedicated driver 1004 generates a masking image using a masking image generating means 524 in a hardware fashion, generates a masking image using a masking image generating means 734 in a software fashion, and integrally provides the masking images. In an embodiment, a basic masking image is generated in a software fashion, and random noise, a differential or integral effect or a filtering effect is applied to the basic masking image in a hardware fashion.

Figure 11:
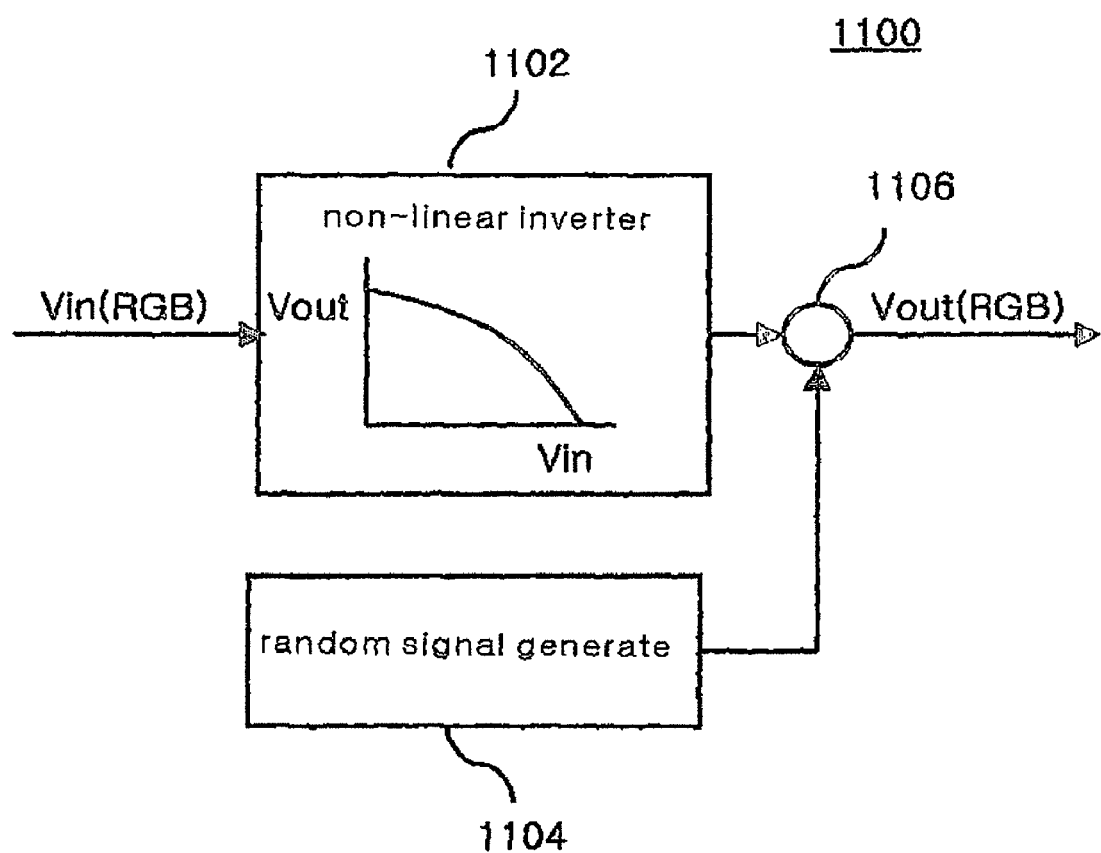
FIG. 11 is a block diagram of a circuit for generating a masking image using a non-linear inverter in accordance with the present invention.

A method of generating an inverse image using a nonlinear inverter and adding random noise to the inverse image is illustrated in FIG. 11. In FIG. 11, reference numeral 1102 designates a non-linear inverter, reference numeral 1104 designates a random signal generator, and reference numeral 1106 designates a signal combiner. As shown in this drawing, when a masking image is generated, required time can be considerably reduced compared to the case where the masking image is generated using software, so that the masking image can be generated in real time.

[Human Visual Characteristics Related to Private Display]

Figure 12A:
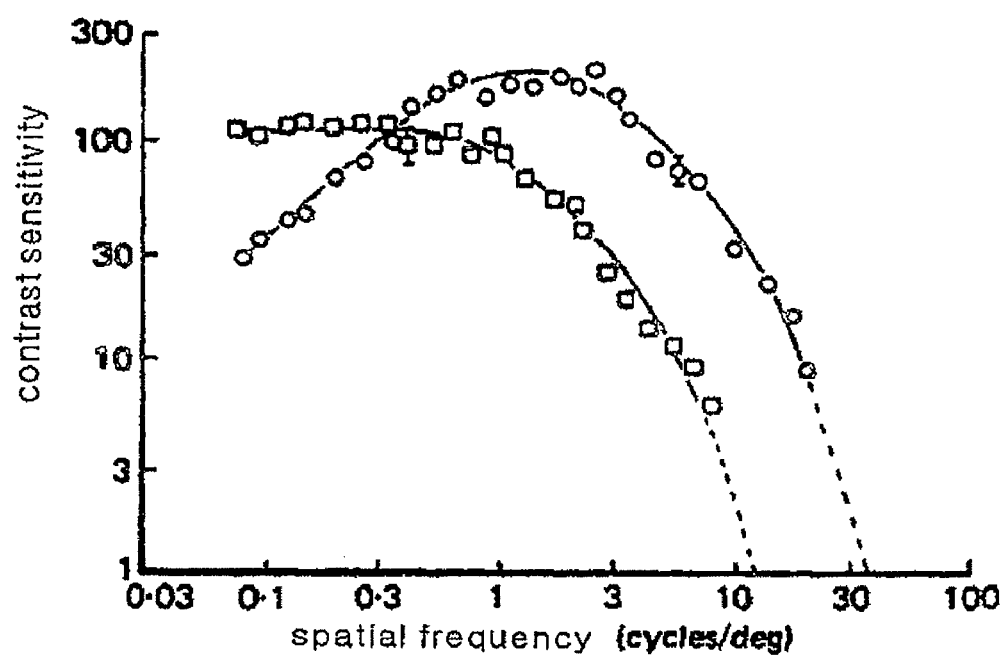
FIG. 12a illustrates the spatial contrast sensitivity function of human visual perception for luminance and color.
Figure 12B:
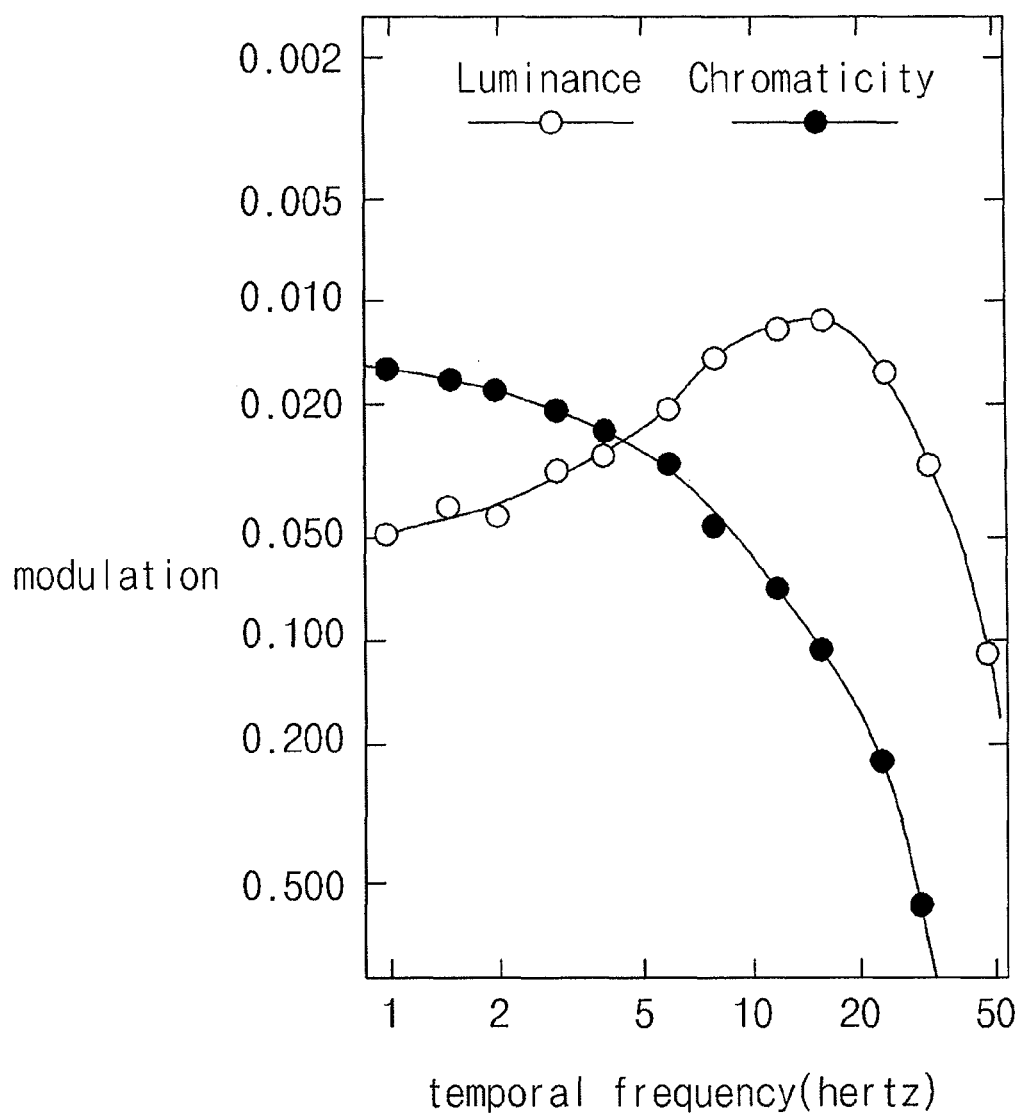
FIG. 12b illustrates the temporal contrast sensitivity function of human visual perception for luminance and color.

In the private display in which the frame of a private image and the frame of a masking image are continuously changed, the temporal and spatial frequency characteristics, temporal integration and temporal inhibition out of human visual characteristics should be taken seriously. Of the human visual characteristics, the temporal and spatial characteristics are presented by a Spatial Contrast Sensitivity Function (hereinafter referred to as "SCSF") shown in FIG. 12*b* and a Temporal Contrast Sensitivity Function (hereinafter referred to as "TCSF") shown in FIG. 12*b*. FIG. 12*a* illustrates the SCSF for luminance (○) and color (□), and FIG. 12*b* illustrates the TCSF for luminance (○) and color (●). As shown in the drawings, in a low spatial frequency and low temporal frequency region, visual perception is sensitive to both luminance and color, particularly to color. In a low spatial frequency and intermediate temporal frequency region, an intermediate spatial frequency and low temporal frequency region, and an intermediate spatial frequency and intermediate temporal frequency region, visual perception is sensitive to both luminance and color. In a high spatial frequency and high temporal frequency region, visual perception is sensitive to luminance, but insensitive to color. A Critical Flicker Frequency (hereinafter referred to as. "CFF") is the highest temporal frequency possible to respond, and is about 55 Hz.

In the meantime, according to eye physiology, between retinas and brains exist visual nerve signal pathways, including a magnocellular pathway (hereinafter referred to as "M pathway"), a parvocellular pathway (hereinafter referred to as "p pathway") and a K pathway. The characteristics of the M and P pathways that correspond most of the visual nerve signal pathways are represented in Table 1. Temporal resolution is best in a cone cell located immediately around a fovea and connected to the M pathway.

The temporal resolution of a cone cell connected to the P pathway of the fovea is intermediate, and the temporal resolution of a rod farthest from the fovea is worst. The rod has the best temporal sensitivity.

TABLE 1

|  | M pathway (M-cell) | P pathway (P-cell) |
| --- | --- | --- |
| Color discrimination | none | exist |
| Neuron response | temporal | continuous |
| Axon diameter | large | small |
| Temporal resolution | high frequency | low frequency |
| Spatial resolution | low | high |
| Retinal input | region around fovea | fovea |
| Specialization | movement | detailed pattern, color |

A human eye performs a visual perception using time-integration sampling. General mechanical signal sampling picks up signals at sampling points, whereas time-integration sampling samples values obtained by integrating signals within time-integral intervals. The time-integral intervals adaptively vary with stimulus intensity, stimulus size, background intensity, phase coherence and contrast. Basically, time integration is primarily performed at a photoreceptor. Visual nerve pathways extending from the photoreceptor to brains have different integral intervals, and information integration is finally performed in the brains. That is, time integrations are performed for adaptively variable time-integral intervals on the basis of a collection of such multiple time integrations.

Figure 13:
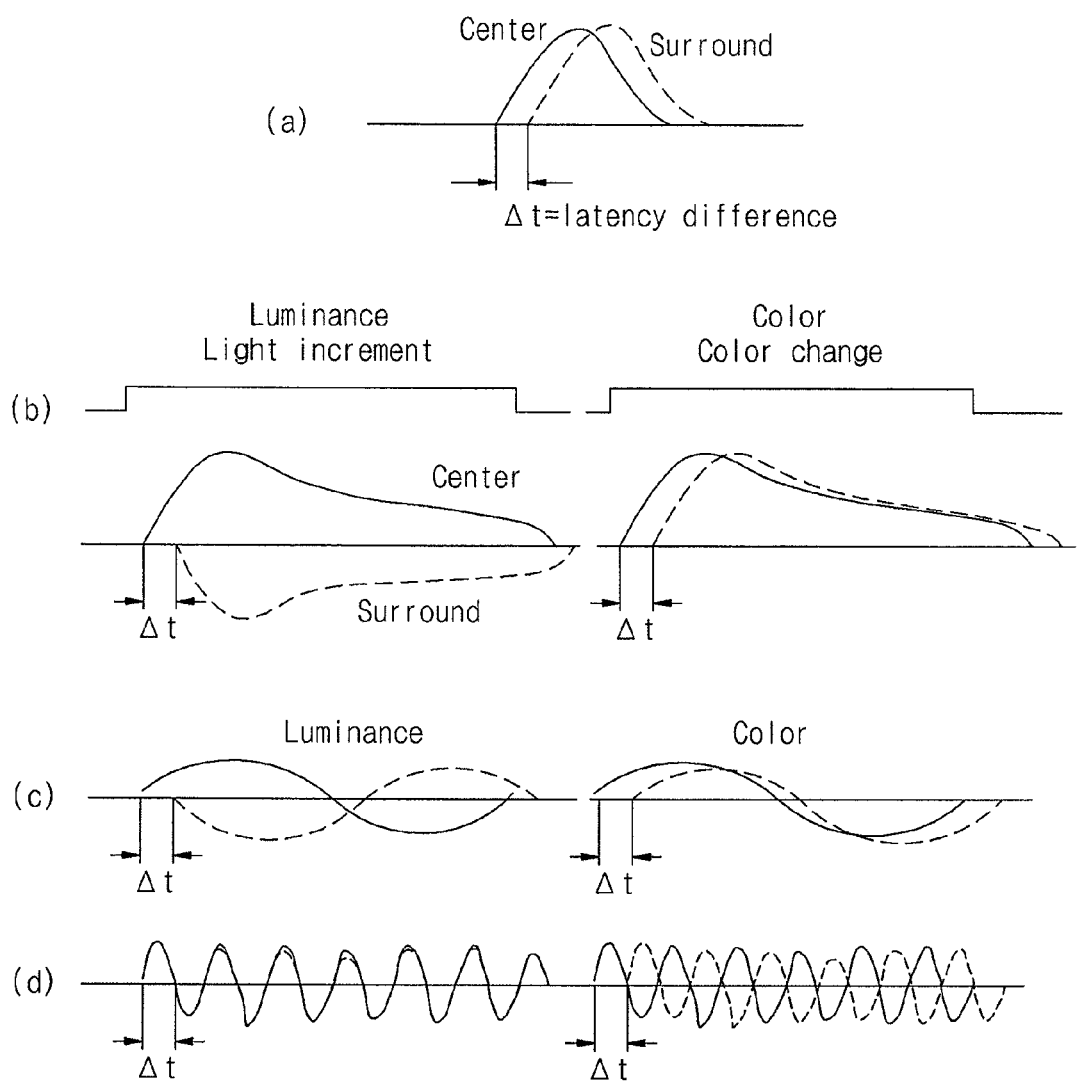
FIG. 13 is a view illustrating a time delay between the center and surround mechanisms of a human visual nerve.

The receptive field of a visual nerve cell is composed of receptors that receive stimulus inputs. The center-surround receptive field of a ganglion cell or LGN cell receives an excitatory input from a center receptive field and an inhibitory input from a surround receptive field. The center-surround receptive fields of the cells have center-surround antagonism with respect to luminance, but do not have it with respect to color (refer to FIG. 13$b$). Table 2 shows the structure of the P pathway of a P cell. In this case, a somewhat time delay exists between a center response and a surround response (refer to FIG. 13$a$). At a low temporal frequency, a time delay is shorter than the period of a response signal, so that it generates synergism with respect to luminance and antagonism with respect to color (refer to FIG. 13$c$). If the period of a response signal is continuously decreased by the increase of a temporal frequency, 180 degree phase shift occurs between the center response and the surround response, so that synergism is generated with respect to luminance and antagonism is generated with respect to color (refer to FIG. 13$d$). Due to such physiological time suppression structure, the visual nerve is insensitive to the luminance variation of a low temporal frequency, sensitive to the luminance variation of 5~20 Hz, insensitive to the color variation of a low temporal frequency and insensitive to the color variation of 20 or more Hz.

TABLE 2

|  | Color opponency | Antagonism |
| --- | --- | --- |
| Red and green cell | L − M cone cell | none (center + surround) |
| Blue and yellow cell | S − (L + M) cone cell | none (center + surround) |
| Luminance (B-W) cell | L + M cone cell | exist (center + surround) |

[Generation of Inverse Image]

An inverse image can be generated using time integration as a masking image for concealing a private image. If a private image and an inverse image are provided within a time integral interval, a human integrates images for the time integral interval, so that the mean image of the private image and the inverse image is perceived.

The simplest inverse image that can be thought of is a static image. In a luminance-color domain, a pixel image value of a static inverse value is a value that is obtained by subtracting a pixel image value of an original image (here, the original image indicates a private image) from the maximum pixel image value. For example, in a RGB domain, one pixel image value of the original image is (R', G', B') and the maximum pixel image value is (R'm, G'm, B'm), the pixel image value of the static inverse image is (R'i, G'i, B'i)=(R'm-R', G'm-G', B'm-B'). However, in the static situation in which original image and inverse image frames are continuously alternated with each other, as in the private display, a static inverse image does not form a genuine inverse image due to the complicated visual perception characteristics of the eye, so that a dynamic inverse image should be pursued.

Figure 14:
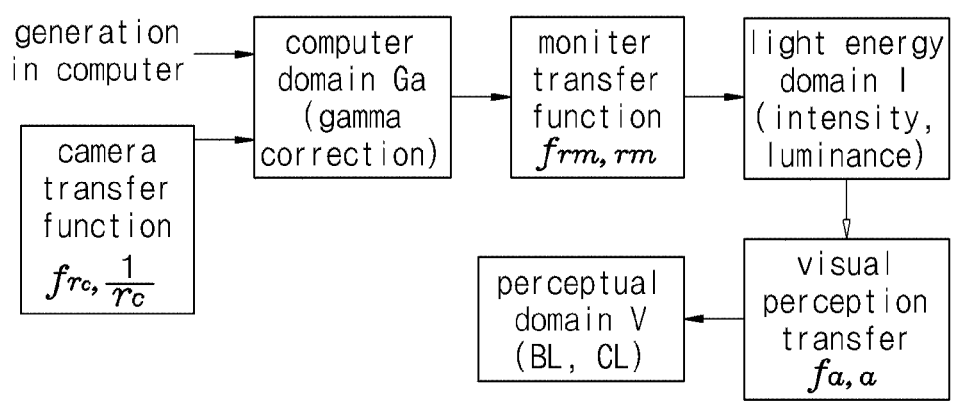
FIG. 14 is a diagram illustrating a general process of the generation and perception of an image.
Figure 15:
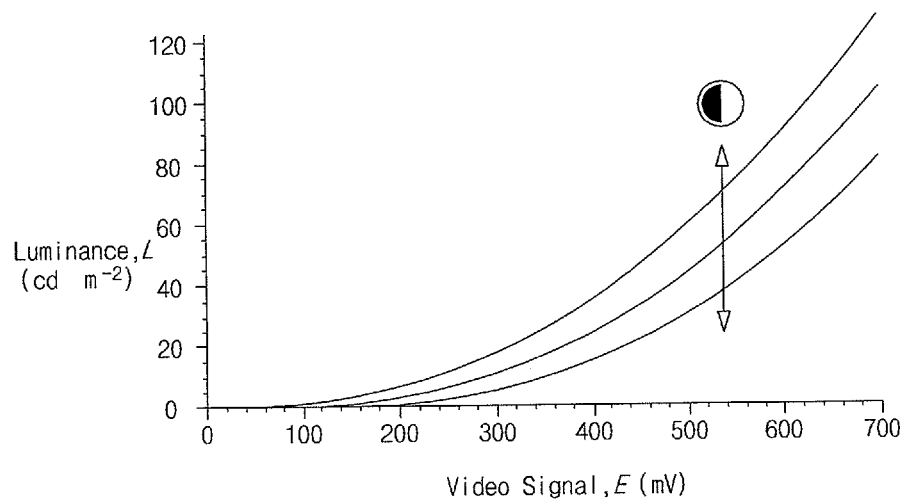
FIG. 15 is a view illustrating a typical monitor transfer function.
Figure 16:
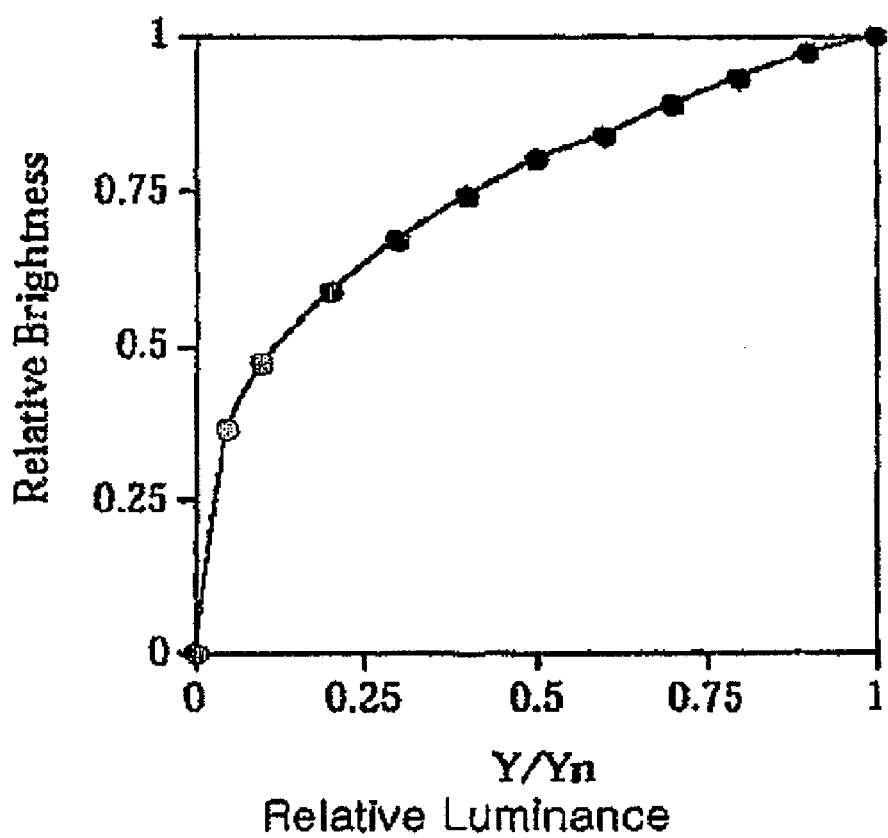
FIG. 16 is a view illustrating a typical human visual perception function.

The dynamic inverse image is calculated based on a perceptual domain. The general structure of the generation and visual perception of an image is as illustrated in FIG. 14. An image is generated in a computer through an image editing program or the input of a user, or the object of a light energy domain is photographed by a camera, and thus has the value Ga of a computer domain. In general, the value Ga is the value gamma-corrected with respect to the intensity and luminance of the light energy domain. The values of the luminance and color of the light energy domain are expressed by tristimulus values, as in a CIE XYZ or RGB domain. The image value of the computer domain corresponding to the RGB domain is gamma-corrected Ga=(R', G', B'). The image value Ga of the computer domain is output while being converted into a monitor input voltage, and is displayed through a monitor. The process is expressed as being converted into the value I of the light energy domain. The transfer function of this process is called a monitor transfer function $f_{rm}$, and relation I=$f_{rm}$(G$_a$) is established. The monitor transfer function $f_{rm}$ assumes the form of FIG. 15. In general, the monitor transfer function $f_{rm}$ is relatively correctly modeled with a power function such as I=G$_a^{\gamma m}$. The intensity and luminance of the light energy domain are perceived by the visual perception function f$_a$ between the luminance of a human and perceived brightness, and relation V=f$_a$ (I) is established. The visual perception function f$_a$ assumes the form of FIG. 16. In general, the visual perception transfer function f$_a$ is relatively correctly modeled with a power function such as V=I$^\alpha$. When the monitor transfer function and the visual perception function are modeled with the power functions, multipliers $\gamma_m$ and $\alpha$ are in approximately reciprocal relation. Accordingly, G$_a$ and V are in approximately linear relation.

However, the relation is a result obtained in a static situation. In a dynamic situation in which a pixel image value varies with time, G$_a$ and V deviate from linear relation. Since the sensitivity of human visual perception varies with the temporal and spatial frequencies of a pixel image value, G$_a$ and V deviate from linear relation. When an inverse image is given as a masking image in a private display, a pixel image value has the temporal frequency of a specific region and is changed to that of high contrast, so that the non-linearity of $G_a$ and V increases in importance. In this case, the temporal frequency is considerably influenced by a refresh rate and the frame sequence of private images and masking images. As a result, to obtain an inverse image in a private display, a dynamic inverse image should be obtained with the temporal frequency of an image taken into consideration, together with time integration.

As known from the luminance TCSF curve (FIG. 12b) of visual perception, a sensitive drop-off at a low frequency and a sensitive rise at a high frequency are largely attributable to a visual perception information processing mechanism related to time suppression. According to the curve and related experimental results, a flash of 5~30 Hz is perceived as the brightest (Bruke-Barey effect). When the luminance variation frequency of a flash exceeds CFF (about 55 Hz), time suppression has no influence, so that a mean image based on time integration is perceived.

Figure 17:
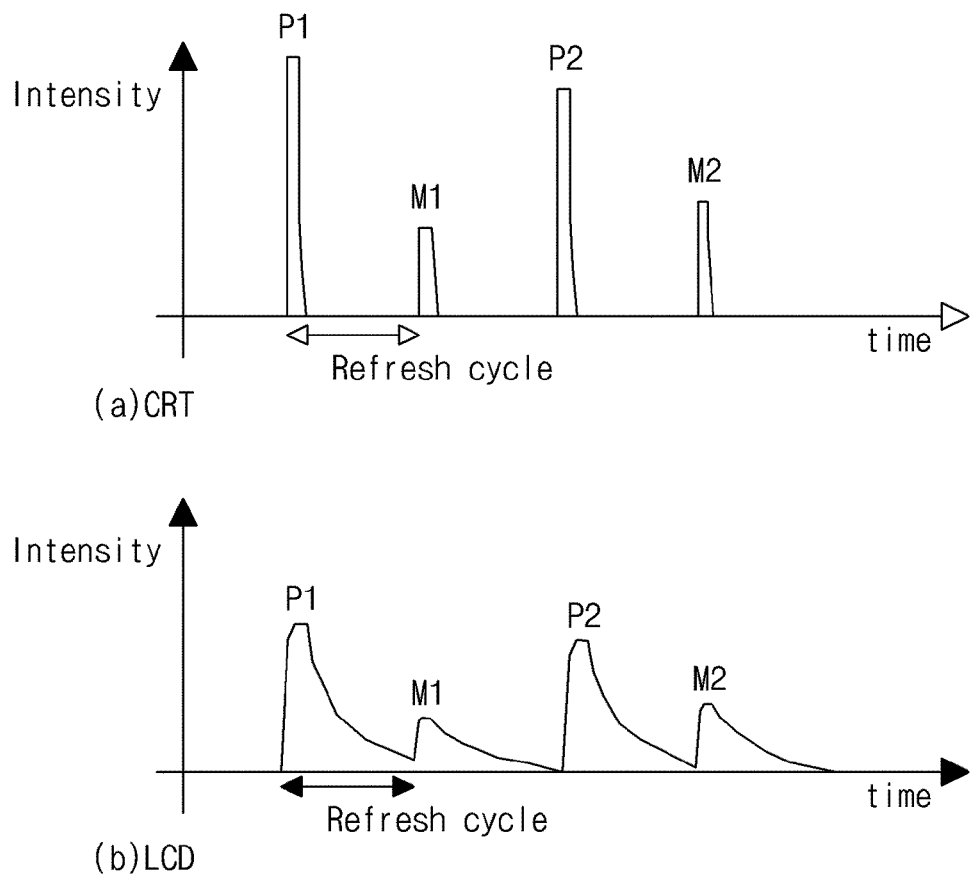
FIG. 17 is a view illustrating a typical monitor pixel response.

An optimum dynamic inverse image varies with the refresh rate. When the refresh rate is higher than 2 CFF (about 110 Hz) and private and inverse images are alternated with each other at a ratio of 1:1, the private and inverse images exist at a ratio of 1:1 in an adaptive variable time integral interval, so that a mean image (sum image) is perceived by the naked eye. When an inverse image is provided, the bright portion of a private image become dark and vice versa, so that a frequency around a refresh rate and a refresh rate/2 becomes the principal frequency of an image. Accordingly, when the refresh rate is 120 Hz, P/M image alternation of approximately 60 Hz occurs, so that the frequency of P/M image alternation is higher than CFF, that is, the refresh rate/2 is higher than CFF, and thus time suppression has no influence. Accordingly, a mean image based on time integration is perceived. As a result, when the refresh rate is higher than 2CFF (about 110 Hz), there is no great difference between a dynamic inverse image calculated based on a perceptual domain and a dynamic inverse image calculated based on a light energy domain. It is assumed that, when a time integral interval is $\Delta t_s$, a single pixel displays a private image at an intensity of $I_p(t)$ for $\Delta t_p$, and a masking image, which is an inverse image, at an intensity of $I_i(t)$ for $\Delta t_i$. In this case, $\Delta t_s = \Delta t_p + \Delta t_i$, and $\Delta t_p = \Delta t_i$. In general, the intensity response of a pixel of a Cathode Ray Tube (CRT) or LCD monitor is as illustrated in FIG. 17, $I_p(t)$ and $I_i(t)$ are variables. For convenience, an ideal monitor being energy-equivalent to that of an actual monitor and following the characteristics of time integration is considered. The ideal monitor displays the intensity corresponding to an image value Ga in the form of a rectangular waveform. $\Delta \hat{t}_p$ and $\Delta \hat{t}_i$ are calculated with representative intensity values set to the intensities of the ideal monitor $\hat{I}_p$ and $\hat{I}_i$. In this case, $\hat{I}_p \Delta \hat{t}_p = I_p(t) \Delta t_p$ and $\hat{I}_i \Delta \hat{t}_i = I_i(t) \Delta t_i$. With the above manipulation, the ideal monitor being energy-equivalent to that of the actual monitor is obtained. It is approximated that a single pixel displays a private image at an intensity of $\hat{I}_p$ for $\Delta t_p$, and a masking image, which is an inverse image, at an intensity of $\hat{I}_i$ for $\Delta t_i$. The approximation is correct because, in practice, within a time integral interval, the same image is perceived without regard to waveforms when the products of intensities and times are same.

The intensity of the mean image of a private image and an inverse image $\hat{I}_d$ can be simply obtained as expressed by Equation 1. When this is represented in the image value of a computer domain, it is expressed by the following Equation 2. When it is represented in a general power function, it is expressed by the following Equation 3. In this case, d designates a mean image, p designates a private image, and I designates an inverse image.

$$\hat{I}_d = \frac{\hat{I}_p + \hat{I}_i}{2} \quad (1)$$

$$\hat{f}_{\gamma_m d} = \frac{\hat{f}_{\gamma_m p} + \hat{f}_{\gamma_m i}}{2} \quad (2)$$

$$G_{ad}^{\gamma_m} = \frac{G_{ap}^{\gamma_m} + G_{ai}^{\gamma_m}}{2} \quad (3)$$

First of all, a mean image is obtained. If the maximum values of a current computer domain are set to $G_{amax}$ and $G_{amin}$, the mean image value $G_{ad}$ is calculated from the following Equation 4. Thereafter, with respect to the private image value $G_{ap}$, an inverse image value is simply obtained from the following Equation 5 or 6.

$$G_{ad}^{\gamma_m} = \frac{G_{amax}^{\gamma_m} + G_{amin}^{\gamma_m}}{2} \quad (4)$$

$$G_{ai}^{\gamma_m} = 2G_{ad}^{\gamma_m} - G_{ap}^{\gamma_m} \quad (5)$$

$$G_{ai}^{\gamma_m} = G_{amax}^{\gamma_m} + G_{amin}^{\gamma_m} - G_{ap}^{\gamma_m} \quad (6)$$

On the contrary, since a static inverse image is obtained as expressed in the following Equation 1, it is not suitable for dynamic display circumstances. For example, if a RGB space and 24 bit color are used in a computer domain, $G_{amax}=225$ and $G_{amin}=0$. If the gamma $\gamma_m$ of a monitor is 2.2, a mean image value is $G_{ad} \approx 186$ and an inverse image value for $G_{ap}=170$ is $G_{ai}=201$. In the case of a static inverse image, a mean image value is $G_{ad} \approx 128$ and an inverse value for $G_{ap}=170$ is $G_{ai}=85$. In a RGB space, respective RGB components are calculated in such a manner.

$$G_{ad} = \frac{G_{ap} + G_{ai}}{2} \quad (7)$$

When a refresh rate is lower than 2CFF (approximately 110 Hz) and private images and inverse images are alternated approximately half-and-half, the frequency of the alternation of P and M images is lower than CFF, so that time integration is not complete and time suppression exerts an influence. Accordingly, the calculation of a dynamic inverse image is not accurate. The inverse image should be calculated with the influence of incomplete time integration and time suppression and the uncertainty of the modeling of a monitor transfer function and a visual transfer function taken into consideration. However, since the process of human visual perception is not accurately known, there is no limitation in calculating an inverse image analytically.

Accordingly, under such circumstances, a dynamic image is calculated using the below dynamic pattern test method. If the maximum and minimum values of a current computer domain are set to $G_{amax}$ and $G_{amin}$ respectively, a hatched portion is allocated $G_{amax}$ and a blank portion is allocated $G_{amin}$ in the pattern of FIG. 18a, and the pattern and the reverse image of the pattern (the hatched portion is allocated $G_{amin}$ and the blank portion is allocated $G_{amax}$) are displayed while being alternated half-and-half with the pattern being set to an original image. When the image is viewed, the high clarity of letter T indicates that time integration is being incompletely performed, and time integration is complete when letter T is not perceived. With this image, the extent of time integration at a current refresh rate is learned. Thereafter, a rough mean image value is calculated using the following Equation 8.

$$G_{ad}^{\gamma m} = \frac{G_{amax}^{\gamma m} + G_{amin}^{\gamma m}}{2} \quad (8)$$

Thereafter, the hatched portion of FIG. 18a is allocated the above-calculated mean image value $G_{ad}$, the blank portion thereof is allocated $G_{amin}$ and the pattern and the reverse image of the pattern (the hatched portion is allocated $G_{ad}$ and a blank portion is allocated $G_{amax}$) are displayed while being alternated half-and-half with the pattern set to an original image. When display is performed while changing the mean image value $G_{ad}$, an image value, at which the clarity of letter T is lowest, is closest to the mean image value. The value is found out and selected as the mean image value. Thereafter, the step of obtaining dynamic inverse values $G_{ai}$ for respective original values $G_{ap}$ is performed. A rough dynamic inverse value $G_{ai}$ is calculated from the following Equation 9 using the mean image value $G_{ad}$ obtained through the above-described step.

$$G_{ai}^{\gamma m} = 2 G_{ad}^{\gamma m} - G_{ap}^{\gamma m} \quad (9)$$

The hatched portion of FIG. 18a is allocated a rough mean image value $G_{ad}$, the blank portion thereof is allocated $G_{ap}$, and the pattern and the reverse image of the pattern (the hatched portion is allocated $G_{ad}$ and a blank portion is allocated $G_{ai}$) are displayed while being alternated half-and-half with the pattern set to an original image. When display is performed while changing the dynamic inverse image value $G_{ai}$, an image value, at which the clarity of letter T is lowest, is closest to the true dynamic inverse image value $G_{ai}$. The value is selected as the dynamic inverse image value for a given value $G_{ap}$. In this manner, dynamic inverse values are selected and stored for all $G_{ap}$ values (in the case of an RGB space, all R, G, B). Although in the above description, the dynamic pattern test method using the pattern of FIG. 18a was taken as an example, the above-described procedure can be tested using various patterns, including the pattern of FIG. 18b.

The above-described dynamic pattern test method is particularly effective when the provision ratio of private image to inverse images deviates from 1:1, a refresh rate is lower than 2 CFF (approximately 110 Hz), the fluorescence material of a monitor is degraded or the actual transfer function of the monitor deviates from a modeled monitor transfer function. Furthermore, if the effect of time suppression somewhat remains even though a refresh rate is higher than 2 CFF (approximately 110 Hz) and private images and inverse images are alternated approximately half-and-half, the actual transfer function of a monitor may deviate from a modeled monitor transfer function, so that a further accurate dynamic inverse image can be obtained when such a dynamic pattern test method.

The private display software previously stores calculation methods according to refresh rates, the display ratios of private images and inverse images and the types of monitors (CRT and LCD), and dynamic inverse values calculated using the dynamic pattern test method. Using these, the user uses a dynamic inverse value suitable for the environment of use and user's selection. Meanwhile, characteristics are somewhat different according to monitors, so that the private display software may be provided with dynamic pattern test method software included therein.

[Color Table Changing Method]

When an inverse image is generated as a masking image, an inverse image can be generated by calculating inverse image values corresponding to pixel image values for the respective pixels of a private image and storing the inverse image values in a video memory. This method takes a lot of calculation time because software calculation must be performed for respective pixels and the calculated pixel inverse image values must be stored in the memory. This method can be applied only to the private display of a still image because it is difficult to generate an inverse image in real time. In order to generate an original image-derived image, such as an inverse image, in real time, the present invention employs an image value conversion method using an image value (RGB value) converter. For a preferable embodiment of the present invention, an original image-derived image is generated in real time by randomly converting a color table according to a conversion rule using a color table, which is included in a video controller, such as a graphic card, as an image value converter. When transmitting the image values of respective pixels stored in the video memory to a monitor, a general computer system converts image values with reference to a color table when transmitting the image value Ga of a computer domain to the monitor, D/A converts the converted image values, and then transmits the values in an analog fashion as for RGB voltage or in a digital fashion as for DVI.

Figure 19:
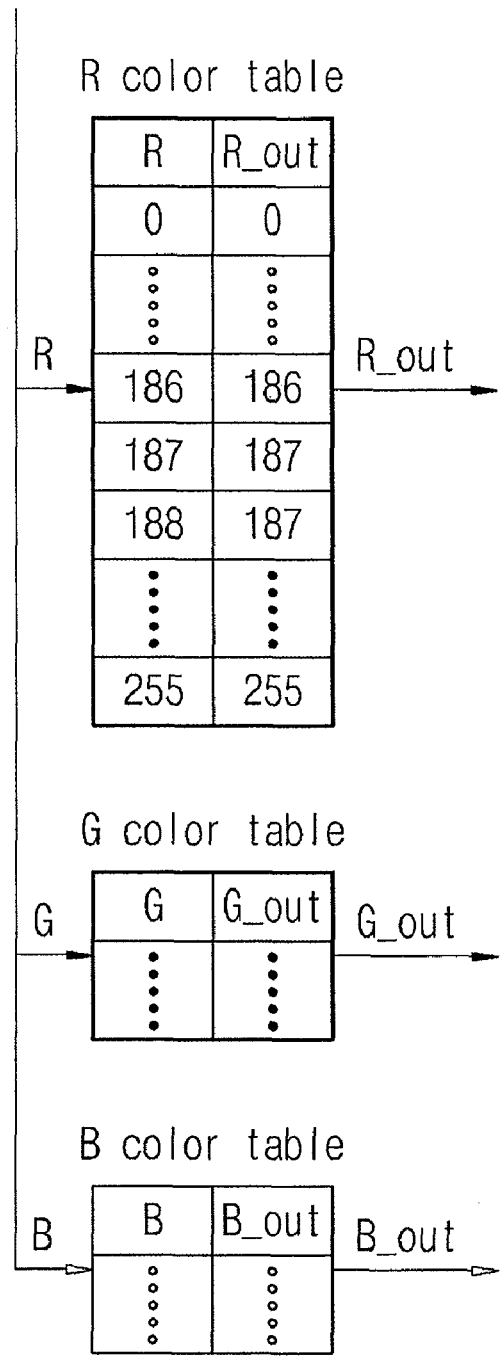
FIG. 19 is a view showing the status of a general color table.

Originally, the color table is used for the minute correction of an image. Generally, an image value is scarcely different from its converted image value. For an embodiment, as shown in FIG. 19, when an image value Ga is (R, G, B), the image value Ga is output as its converted image value (R_out, G_out, B_out) without big change, with a spot (in FIG. 19, when R=188, R_out=187) in need of minute correction being slightly changed.

Figure 20:
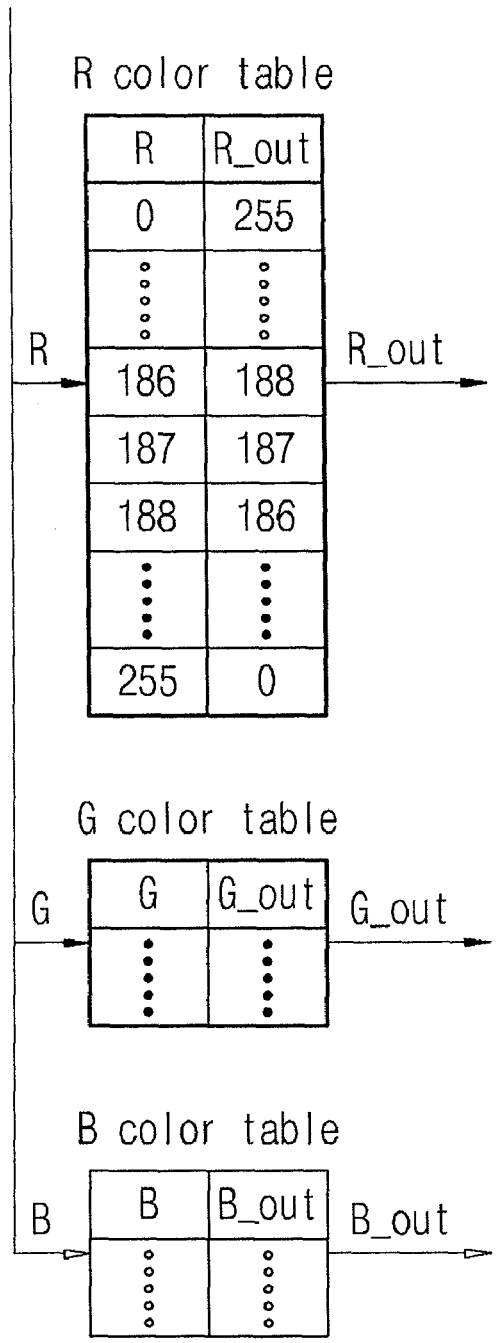
FIG. 20 is a diagram showing a color table changing method according to the present invention.

In the present invention, the conversion values of a color table are changed according to a random conversion rule. A first color table for a private image and a second color table for a masking image are prepared, and the actual color table of a video controller is changed to the values of the first or second color table when each of the images is displayed. In this case, depending on the conversion values of the changed color table, different images are generated, the difference between the image value Ga and the converted image value may be large, and the converted image may have opposite characteristics. For an embodiment, when Ga-correspondent conversion image values corresponding to a dynamic inverse image is entered in a color table, instead of an original color table, the dynamic inverse image is displayed even though an original image is displayed without change. FIG. 20 illustrates an embodiment in which a dynamic inverse image is implemented using the color table changing method, with R=187 being used as a mean image value. In this case, pixel image value Ga (R, G, B) is output as a converted image value according to a changed conversion rule in which R=0->R_out=255, R=255->R_out=0, R=186->R_out=188, R=187->R_out=187, and R=188->R_out=186. The color table changing method generates an inverse image by changing only the few values of the color table without calculating inverse values for respective pixel image values, so that the time required for the generation of an inverse image is short. Accordingly, the color table changing method is effective in the real-time generation of an inverse image.

In the color table changing method, when a color table is changed according to a random rule, dynamic inverse values cannot only be obtained, but a random converted image also can be obtained according to the changed color table. For an embodiment, when Ga-correspondent conversion image values are set to constant values for respective Ga values, an image irrelevant to the input image of the color table can be obtained. With this method, a uniform gray image, a uniform colored gray image and a uniform colored image irrelevant to an input image can be obtained.

In the original image-derived image calculation method in which inverse image values are calculated for the respective pixels of a private image and an inverse image is generated based on the calculated inverse image values, for example, an original image-derived image calculated from the private image of the P1 memory of FIG. 4 is stored in a M1 memory and a M1 image is output to a monitor. In contrast, in the color table changing method, an original image-derived masking image is displayed by converting a color table according to an original image-derived image calculation rule and outputting the private image of the P1 memory to the monitor, without the direct manipulation of a video memory. In another embodiment, an original image-derived image is displayed by storing the private image of the P1 memory in the M1 memory, converting a color table and outputting the image of the M1 memory.

The conversion values of the color table are changed in synchronization with the vertical sync or a specific horizontal sync of a graphic card, or in a non-synchronous fashion on a driver program. In an embodiment in which the values of a color table are changed in accordance with a vertical sync, the vertical sync is learned in a driver in a polling or interrupt fashion, and the values of the color table are replaced with new values immediately after the vertical sync is generated. In the interrupt fashion, the interrupt of an existing graphic driver is hooked and the values of a color table are changed whenever an interrupt is applied. Since several-ten or less microseconds are required to change the values of the color table, the effect of the changed color table is immediately exhibited. In another embodiment of the present invention, the real-time conversion of image values is implemented using a HW type inverter, or a differentiating or integrating circuit as an image value converter.

[Generation of Intentional Disturbing Masking Image]

A disturbing image in the present invention is defined as the generic term of masking images except for an original image-derived image, which has no dependence on a private image. Heretofore, a white flash image, a random image, a still photo image, or a screen saver image has been used as a disturbing image. However, these images are effective only in masking specific private images, are not systematic and strategic disturbing images capable of being used for general private images, and does not take human visual perception characteristics into consideration.

Since the white flash masking image disclosed in U.S. Pat. No. 5,629,984 has a low spatial frequency and a low temporal frequency, it is difficult for the white flash masking image to mask a private image having different temporal and spatial frequencies or a cognitive meaning perceptually grouped. To effectively perform masking using a flash masking image, a plurality of flash masking images must be displayed with respect to a single private image, so that the 'user visual perception performance' at which the user views a private image, is degraded. The random masking image disclosed in GB Pat. No. 2360414 has wide temporal and spatial frequency bands with respect to each of luminance and color, so that the random masking image is superior to the flash masking image in masking performance. The random masking image does not differentiate temporal and spatial frequency bands, to which the human eye is sensitive, from temporal and spatial frequency bands, to which the human eye is not sensitive, so that it is difficult for the random masking image to mask a general private image having many signals of a specific frequency band. Furthermore, it is difficult to mask a private image having a cognitive means perceptually grouped using the random masking image having no cognitive meaning.

Figure 21:
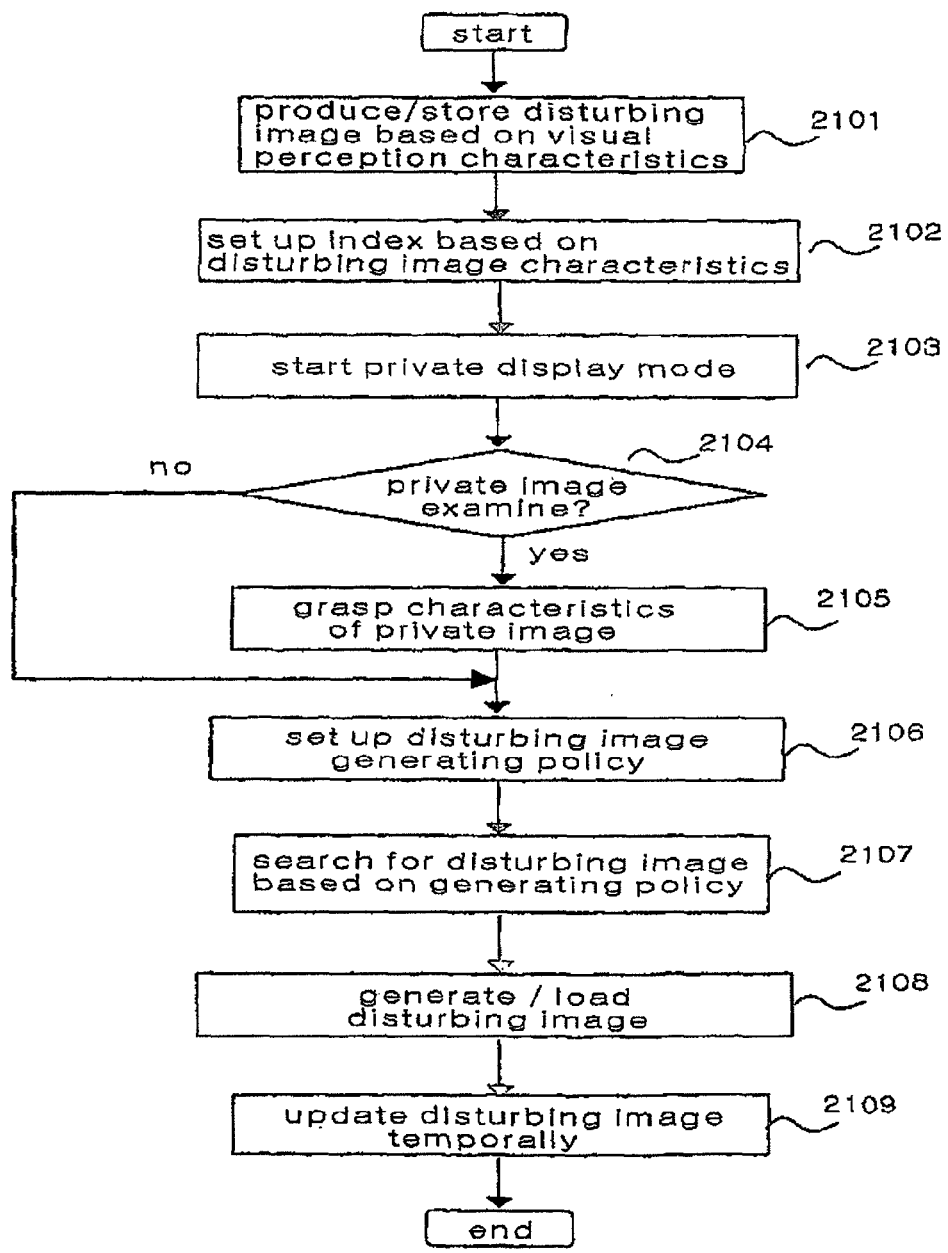
FIG. 21 is a flowchart illustrating a disturbing image generating and managing method according to the present invention.

In the present invention, a systematic and strategic method of producing and managing a disturbing image in view of human visual perception characteristics is presented. FIG. 21 is a process of producing and managing a disturbing image in accordance with an embodiment of the present invention. First, a disturbing image with human visual perception characteristics taken into consideration is produced and stored at step 2101. The disturbing image is produced using the characteristic of frequencies to which visual perception is sensitive, a luminance contrast characteristic, a color contrast characteristic and a cognitive content characteristic. In an embodiment, a disturbing image capable of effectively masking a random occurable private image is produced. In another embodiment, a disturbing image in which a specific characteristic is emphasized to effectively mask a specific private image is produced. The file of the disturbing image may have a size corresponding to that of a monitor frame, or an image block unit larger or smaller than a monitor frame. In an embodiment, a plurality of disturbing images are produced. In another embodiment, a plurality of disturbing images used for respective security levels are produced.

Thereafter, if a plurality of disturbing images have been produced, an index based on the characteristics of the disturbing images is set up or file names are determined at step 2102 so as to allow a search required for the generation of an appropriate disturbing image to be carried out. Thereafter, a private display mode is started by the user or system at step 2103. At this step 2103, it is determined whether a disturbing image will be used as a masking image. If it is determined that the disturbing image will be used, it is determined whether the characteristics of a currently displayed private image will be examined at step 2104. If it is determined that the characteristics will not be examined, the process proceeds to the step 2106. If it is determined that the characteristics will not be examined, the temporal frequency, contrast and cognitive content characteristics of the private image are examined and learned at step 2105. In an embodiment of the present invention, a content-based examination method is employed to examine the characteristics of the private image. For an example, the cognitive content characteristics of the private image are examined based on the characteristics of a window or an active window currently used (whether a word processor, web browser or moving image player has been used). For another example, application software currently being executed is examined, and the cognitive content characteristics of the private image are learned based on the typical characteristics of the private image. For still another example, the user may input the expected characteristic information of the private image to the system or select an expected mode based on an application to be used. For still another example, a frequency characteristic is learned in real time through the frequency conversion of the private image and the disturbing image suitable for the learned frequency characteristic is produced at the later step. To reduce the burden of computing, a part of the private image may be frequency-converted.

At step 2106, a disturbing image generation policy is set up. The policy for determining the level of the frequency, brightness contrast, color contrast and cognitive content characteristics of a disturbing image according to a set display security level if the display security level has been set, or a random display security level if the display security level has not been set, and generating a disturbing image is set up. The policy includes the frequency, luminance contrast, color contrast and cognitive content characteristics of a disturbing image to be generated, and is determined based on systematized methodology. Furthermore, the policy includes conditions about whether a disturbing image including text will 'be generated, and what color contrast will be used. The systematized methodology for determining the policy is programmed and the programmed systematized methodology is included in the private display control block 318 or masking image generating means 326. At this step, a disturbing image generation policy suitable for the characteristics of a private image is set up if the characteristics of the private image have been learned at step 2105, or a disturbing image generation policy effective on the average is set up if the characteristics of the private image have not been learned at step 2105.

Thereafter, the private display control block 318 and the masking image generating means 326 search for a disturbing image fulfilling the conditions of the generation policy at step 2107. For another example, the user may search for the disturbing image through the user interface 320. If the suitable disturbing image has been searched for, the selected disturbing image is generated and loaded on the memory at step 2108. If disturbing image files exist by, the image block unit smaller than a monitor frame, a plurality of disturbing image blocks may be loaded to construct a single disturbing image frame.

If the initial image is loaded on the memory, the disturbing image is temporally updated at step 2109. For temporal update methods, an image capable of occupying an entire monitor frame is loaded on the memory and updated, one or more disturbing image parts or image blocks constituting a monitor frame are temporally moved and rearranged, a new image block file is loaded on the memory and updates a part of an image, an image is moved by randomly changing the start address of the memory that is a flipping address during flipping, or a real-time generation program selected by the system updates an image through calculation. The temporal frequency of an image generated when the image is temporally updated is set according to the disturbing image generation policy, and the image is updated according to a temporal variable algorithm based on the disturbing image generation policy. To set up the temporal frequency, brightness contrast, color contrast and cognitive content characteristics of a disturbing image used in the disturbing image generation method, human visual characteristics are taken into consideration.

Figure 22A:
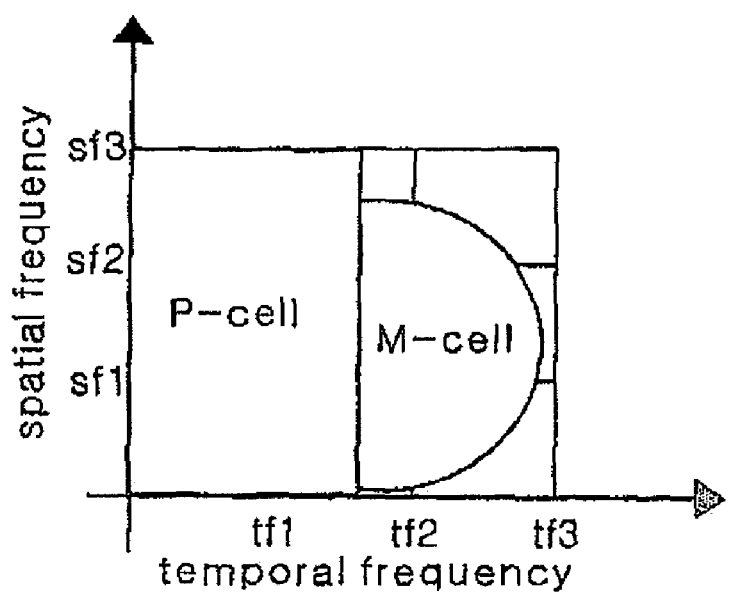
FIGS. 22a to 22c are diagrams showing the spatial and temporal frequency characteristics of a human visual perception neuron, human visual perception and typical image data, respectively.
Figure 22B:
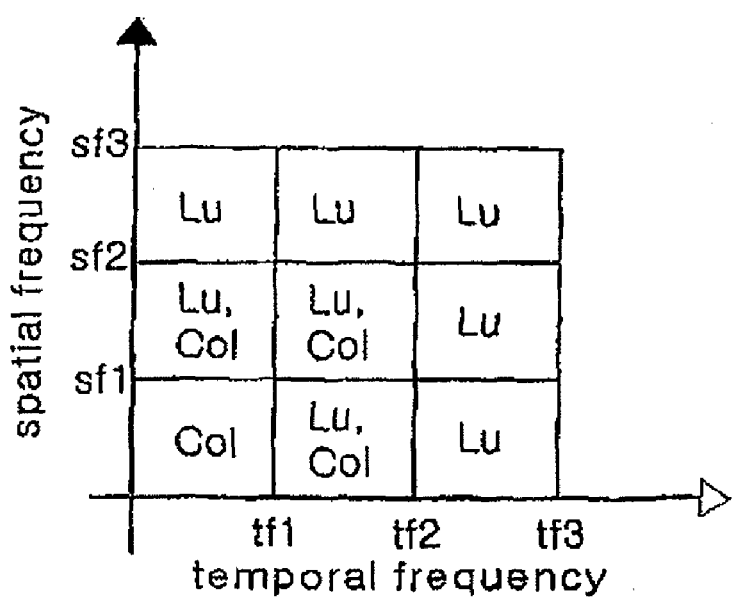

FIG. 22 is diagrams illustrating the spatial and temporal frequency characteristics of human visual perception and typical image data. In these drawings, tf1, tf2, tf3, sf2 and sf3 are frequencies that differentiate a low frequency, a intermediate frequency, a high frequency and a threshold high frequency, and are 5 Hz, 30 Hz, 70 Hz, 0.3 cycles/deg, 15 cycles/deg and 40 cycles/deg, respectively. FIG. 22a illustrates the response frequency domains of P and M cells that are representative visual nerve neurons, which is the physiological evidence of human visual characteristics. FIG. 22b illustrates visual perception characteristics obtained by integrating SCSF of FIG. 12a and TCSF of 12b. The high frequency component of an image exceeding temporal threshold high frequency tf3 or spatial threshold high frequency sf3 cannot be perceived by human visual perception. As shown in the drawings, in a low spatial frequency and low temporal frequency domain, visual perception is sensitive to both luminance and color, particularly to color. In a low spatial frequency and intermediate temporal frequency domain, an intermediate spatial frequency and low temporal frequency domain, and an intermediate spatial frequency and intermediate temporal frequency domain, visual perception is sensitive to both luminance and color. In an other high spatial frequency or high temporal frequency domain, visual perception is sensitive to luminance but insensitive to color.

Figure 22C:
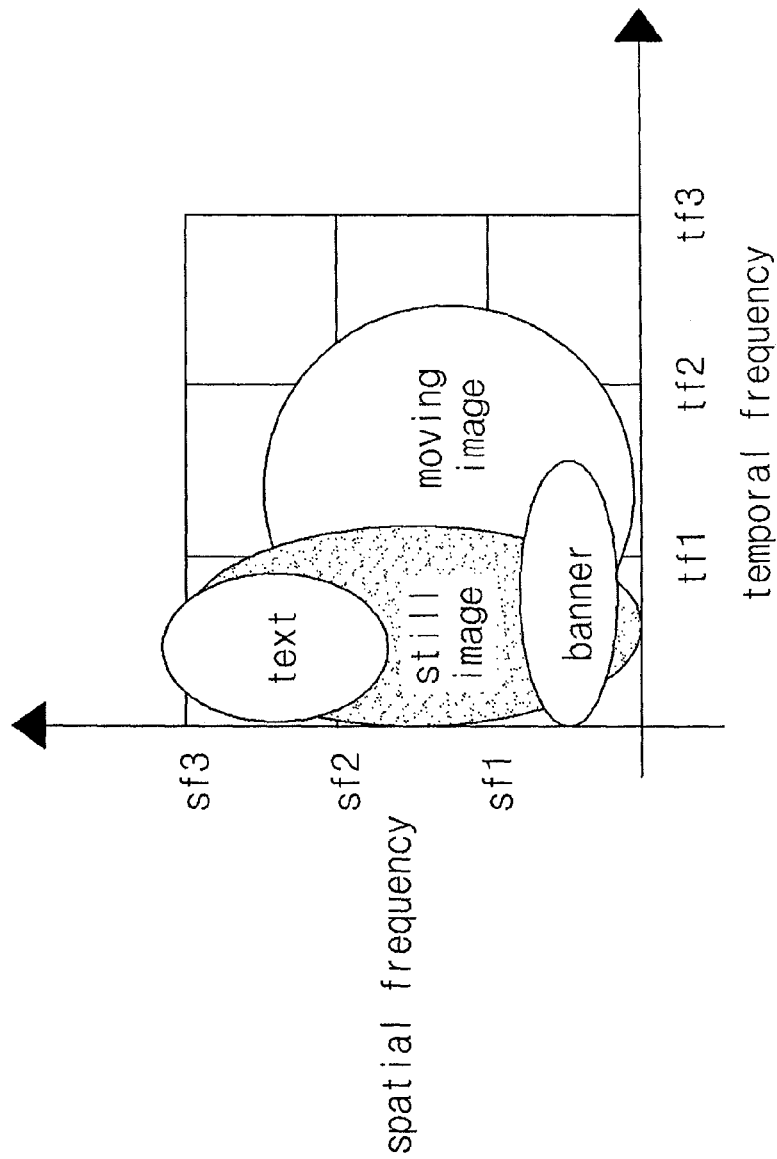

FIG. 22c illustrates the spatial and temporal frequency characteristics of image data. In the present invention, images are divided into text images and non-text images according to the cognitive contents or meanings of images. The text images include characters and symbols, and the non-text images include photographed images, pictures and graphic images except for text. The photographed images are images obtained by photographing means, such as a camera, and include photographs, movies, TV broadcast images. In the present invention, a still image and a moving image are defined based on the temporal frequency characteristic of images. The still image is defined as an image in which a text or non-text image is temporally stopped or almost stopped. The moving image is defined as an image in which a text or non-text image is moving. Text, which is temporally moving, as well as a computer graphic moving images, movies and TV broadcast images are defined as moving images. A photographed moving imager a graphic moving image and a text moving image may have different temporal frequency characteristics. FIG. 22c illustrates the frequency characteristics of a text image and a moving image in a general sense. The text image generally occupies an intermediate spatial frequency, high spatial frequency and low temporal frequency domain. The still image, such as a picture or a photograph, occupy a low to high spatial frequency and low temporal frequency domain. The moving image occupies the widest frequency domain.

In the present invention, a disturbing image is produced at the disturbing image production step with the temporal frequency taken into consideration, and the disturbing image is generated and updated at the disturbing image generation and update step also with the temporal frequency taken into consideration. Preferably, a disturbing masking image is generated to include the temporal and spatial frequencies of the luminance and color of a private image to be masked. In another embodiment, a disturbing image is generated to have all frequency components to which visual perception is sensitive. In another embodiment, there is produced a disturbing image into which more image components of frequencies, to which visual perception is sensitive, are inserted. Since private images have considerably various frequency components according to the contents of images, a disturbing image does not expect private images when the disturbing image is produced separately from the private images. Accordingly, there may easily occur cases where some images are sufficiently masked while some images are not sufficiently masked. In an embodiment, at step 2105, the temporal frequency of a private image is examined and learned. If the characteristics of the private image have been learned, a disturbing image is preferably produced to include the principal temporal and spatial frequencies of the private image and the more image components of frequencies to which visual perception is sensitive. For example, if the private image is a typical text image, a disturbing image is produced to include an intermediate to high spatial frequency and low temporal frequency domain. Compared to a private image, a disturbing image is produced to include the image components of frequencies to which visual perception is sensitive. Using the above-described points, the frequency condition of the disturbing image production policy suitable for the characteristics of a private image are set up. For another embodiment, if the temporal frequency of a private image has not been learned, a frequency condition, which covers the image components of a frequency band, to which visual perception is sensitive, as many as possible, is set up to produce a disturbing image effective on the average.

Figure 23:
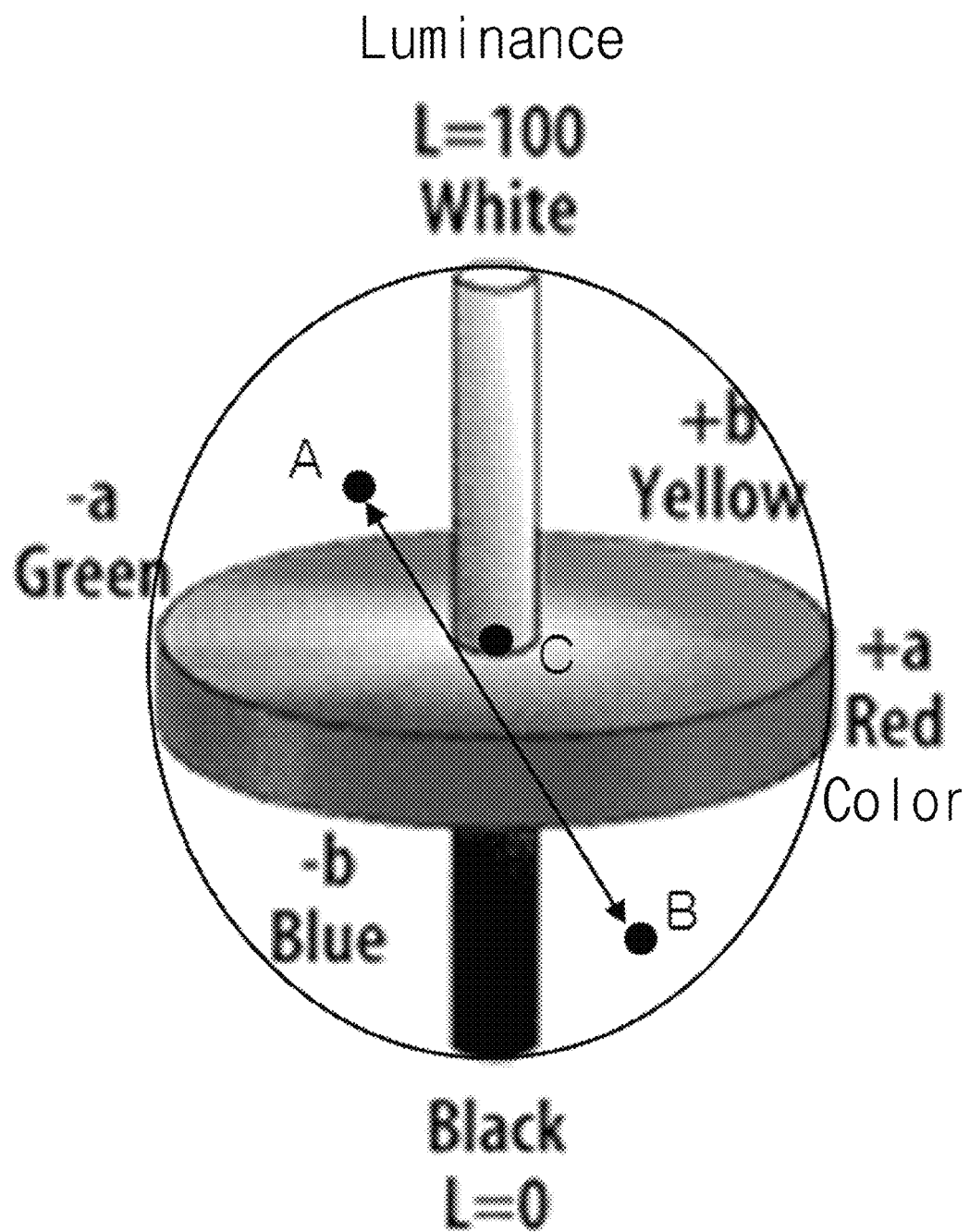
FIG. 23 is a diagram showing a CIE Lab color space.

The disturbing image should be clearer than the private image to be better seen. For this, luminance and color contrast sensitivity next to the temporal sensitivity of visual perception plays an important role. In an embodiment, the image components of a disturbing image are made to have luminance and color contrast sensitivity. If an image of high luminance and color contrast to which human visual perception is sensitive is systematically produced, the image should be produced in a system that is quantified so that the contrast of an image is proportional to visual perception sensitivity. In the present invention, a color space that is constructed using luminance and color axes is used as the quantified system. As well known, a variety of color spaces, such as RGB, CMY and Yuv, exist. However, many color spaces does not take a human visual perception into consideration, and is not constructed to be proportional to visual perception sensitivity. For a color space proportional to human visual perception, there is CIE L*a*b* (simply, CIE Lab) color space that was standardized by Commission Internationale de l'Eclairage (CIE). FIG. 23 illustrates CIE Lab color space. The color space is constructed by arranging the visual perceptions of a luminance cell, a red-green cell and a yellow-blue cell, which are the three independent visual perception cells of the human visual perception system, in perpendicular axes. In the present invention, the difference between two image values A and B in CIE Lab color space is defined as a luminance and color difference. As the luminance color difference becomes the larger, the contrast of two image values becomes the higher. The vertical component of the luminance color difference is a luminance difference, and the horizontal component is a color difference. The luminance difference is defined as luminance contrast, and the color difference is defined as color contrast.

The image value point C of FIG. 23 is a central point corresponding to the central value of a color space. If a monitor does not sufficiently represent the luminance and color of the color space or the range of image values represented on a monitor is restricted through the compression of the image values, such as a color table changing method, the central point can be moved. In the present invention, the contrast of a disturbing image is preferably determined and generated based on a visual perception-proportional color space, such as CIE Lab color space. For an embodiment, a disturbing image is generated to have the outer extreme image value of the color space on the average compared to a private image. A certain condition about luminance and color contrast is set up, and a disturbing image is produced and generated based on the condition. For an example, a condition that allows the mean luminance difference or mean color difference between a reference value, such as the central value of the color spacer and the image value of a disturbing image component to be larger than a certain value is set up. The image fulfilling the above-described condition has the outer image value of the color space on the average. Since in this case, an image of low contrast may be generated because disturbing image values are offset to one extreme, the condition that allows the color difference between the mean image value of a disturbing image component and the reference value to be equal to or smaller than the predetermined value. When an image is actually produced or generated, an image is produced or generated while it is evaluated through calculation whether the image is an image of high contrast fulfilling the condition in an embodiment, or an image is produced or generated while it is evaluated whether the image schematically and quantitatively fulfills the above-described condition. In an example of the qualitative evaluation of the fulfillment of the condition, the area ration of a pair of image components, such as object/background, which form image contrast, is taken into consideration. If the area difference between an object and a background is relatively large, the location of a mean image value is moved into one having a larger area, so that mean contrast is reduced. In this case, the color difference between the mean image value and the reference value exceeds the certain value, so that the above-described condition is not fulfilled. A disturbing image is generated while qualitative evaluation is performed to prevent the area ratio of a pair of image components from being large.

For an embodiment of the method of the present invention that produces and generates a disturbing image based on a visual perception-proportional color space, such as CIE Lab color space, the image value of a disturbing image component is selected using the visual perception-proportional color space and the image value is converted into the color space image value of a computer domain, such as a RGB space. The conversion can be accurately performed through calculation, and schematic and qualitative conversion may be performed. That is, even if a corresponding RGB color space image value is schematically generated with reference to CIE Lab color space, an intended contrast image can be obtained.

In the present invention, a disturbing image having high contrast between the object and background of the image or between the luminance and color of the image pattern is generated. Preferably, a disturbing image having high contrast in various luminance and color is generated. For an embodiment, when the characteristics of a private image can be learned, a disturbing image having contrast higher than that of a private image is generated. For an example, when a private image is general text, color contrast is higher than luminance contrast, so that a disturbing image having high luminance contrast is generated. Preferably, a disturbing image provided with an image component having high luminance contrast and one or more image components having high color contrast is generated.

Figure 24:
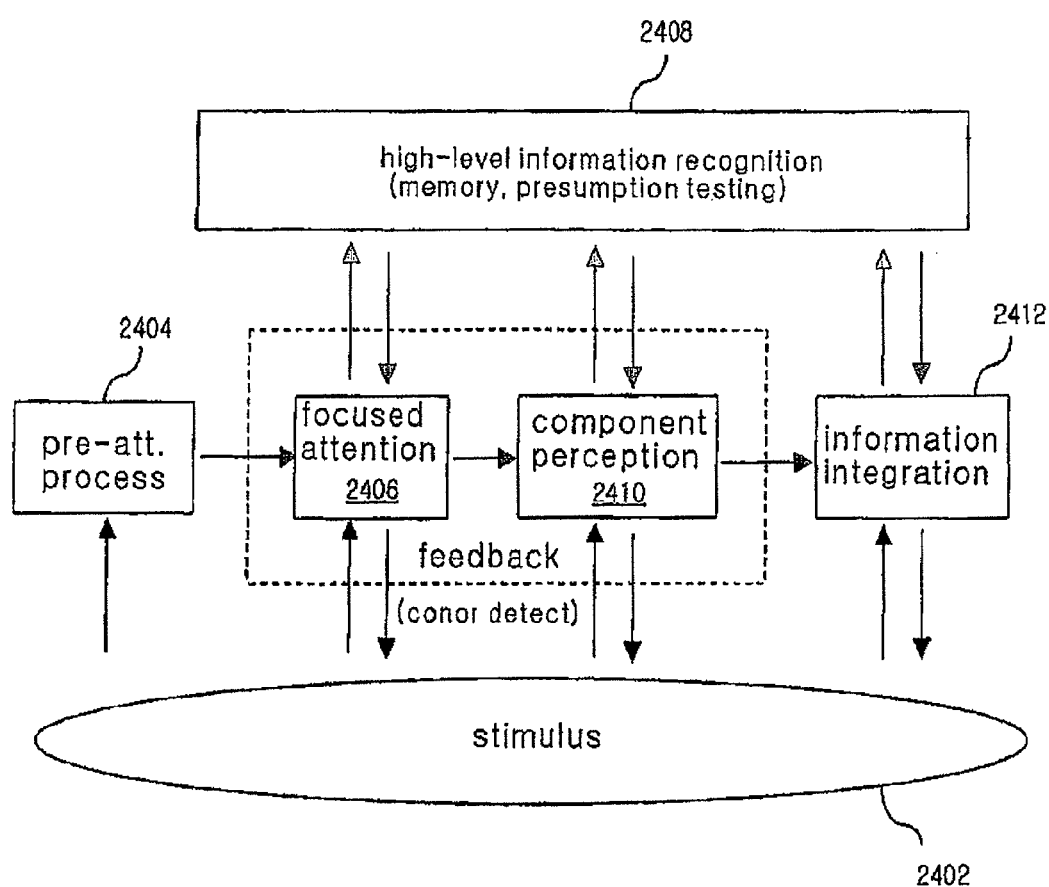
FIG. 24 is a diagram showing a human visual perception process.

FIG. 24 is a view showing a visual perception process. An image having a cognitive meaning is perceived better than an image having no cognitive meaning perceptually grouped. When a stimulus 2302 excites the retina, a pre-attentive process 2404, which is a high-speed visually perceptual process without feedback, perceives the stimulus. At this time, the perception or cognition of a shape does not occur, and the existence of a stimulus, a variation or movement is perceived. Thereafter, a human intentionally or unintentionally focuses and perceives the shape and characteristics of a part currently focused. At this time, feedback is received from a high-level information recognition, such as memorizing or reasoning, and is used in the perception process, and a stimulus is continuously collected from a stimulus source. Thereafter, perceived components 2412 are integrally perceived by being integrated through the focused attention 2406. The focused intention 2414 chiefly perceives an image having a cognitive meaning perceptually grouped.

In terms of relation with the high-level perception process, perceptual grouping is an important matter. According to the law of organization of psychophysics, the perceptual grouping is performed based on simplicity, similarity, continuation, proximity, common movement and meaning. Furthermore, the perceptual grouping is performed based on temporal and spatial phase coherence. When a phase change occurs in any part of a pattern having a signal spatial frequency, the part can be better viewed. This is due to grouping based on the spatial phase coherence. A pattern having a single temporal frequency undergoes a phase change at a certain time and a corresponding part can be better viewed. This is due to grouping based on the temporal phase coherence. The image has been modulated to a frame sequence. When a phase change (non-repetitive sequence) in the frame sequence occurs while the image is presented to the user in a repetitive alternation sequence, an image at the time can be better viewed, and thus minute shimmering is sensed. Since a human does not sense a phase change within a temporal integral interval, grouping based on temporal phase coherence is closely related to the temporal integral interval of visual perception. A perceptually grouped image component forms a single cognitive meaning, so that the perceptually grouped image component is easily perceived as a whole even though a part of the image component is concealed or disturbed. Private images are generally grouped well. Accordingly, a masking image releases the grouping of the private images, so that a public image (the sum image of a private image and a masking image) should be made to be seen as an image having no cognitive meaning or a different meaning. The masking image preferably performs both the function of releasing the grouping of the private image and the function of allowing masking images, to be clearly grouped so as to cause a public image to be seen as an image having a meaning different from that of a private image.

For an embodiment, disturbing images are constructed to have different temporal and spatial phase coherences to release the temporal and spatial phase coherences of the private images. Original image-derived images including dynamic inverse images have the characteristics of being mixed with private images and hindering the grouping of private images.

In order to mask the text of a private image when the text image region of the private image is larger than a certain level, the disturbing image of the present invention is made to have a text image component in at least one region. In order to mask the non-text of a private image when the non-text image region of the private image is larger than a certain level, the disturbing image of the present invention is made to have a non-text image component in at least one region.

When the edges of an image having cognitive contents are clear, visual perception more sensitively react upon the image, so that a disturbing image component having clear edges is generated. In the case where a disturbing image including a photographed image component is produced, a general photographed image, component has no high image contrast and no clear edges, so that the step of artificially clarifying the edges is further included as an embodiment. The disturbing image is processed using an image processing technique, such as a histogram equalization technique, contrast enhancement or homomorphic filtering, and then stored. In another embodiment, a disturbing image includes a component having a three dimensional effect. In still another embodiment, a disturbing image includes an image component that causes dizziness, in which a high contrast pattern is repeatedly rotated, and illusion.

In the present invention, in order to obtain a disturbing image better viewed, it is determined which type of image components are better seen while two types of images are alternately displayed. The disturbing image is formed of image components that are determined to be better seen as a result of the determination. A disturbing image is produced by combining images having such sensitive frequency, contrast and cognitive content characteristics. Preferably, a disturbing image is produced to include high luminance and color contrast, a frequency to which visual perception is sensitive, and contents having a cognitive meaning. For example, a disturbing image is produced to include image components of high luminance contrast having an intermediate temporal frequency and an intermediate spatial frequency and image components of high color contrast having a low spatial frequency rather than other frequency components. To mask a pattern having a low spatial frequency in a private image, high color contrast is utilized and high luminance contrast is added. To mask typical text and a high spatial frequency image, high luminance contrast is chiefly utilized, and a color contrast image is added because a color assimilation phenomenon occurs.

In an embodiment, at disturbing image generation setup step 2106, different conditions may be set for the respective regions of a monitor frame. A disturbing image, in which visual perception is more sensitive to a specific region of a monitor than other regions, is made to be generated. For an example, a disturbing image, in which visual perception is more sensitive to the central portion of a monitor than the upper and lower regions of the monitor, is generated. At this time, a single disturbing image file may be loaded and a monitor frame may be formed of the loaded disturbing image file, or two or more disturbing image blocks may be loaded and a monitor frame may be formed of the loaded disturbing image blocks.

Since an afterimage relatively frequently occurs in the lower region of a monitor, the disturbing image of this region is formed of an image to which visual perception is less sensitive than that for the central region of the monitor. Since the response of a shutter is late in the upper region of the monitor, the user can perceive some of the masking image, so that a disturbing image to which visual perception is less sensitive is generated for this region in an embodiment.

In another embodiment of the present invention, a disturbing image is produced and generated by mixing image components having two or more different cognitive content, temporal frequency and contrast characteristics. For an embodiment in which the mixing is spatially performed, spatial distribution arrangement and spatial overlapping arrangement are utilized. In the spatial distribution arrangement, image components having different characteristics are arranged for the regions of the monitor frame of a distribution image. For an example, an image is produced by mixing a text image in a region with a non-text image in another region according to different cognitive contents. For another example, an image is produced by mixing an image of high luminance contrast in a region with an image of high specific-color contrast in another region. If a wide disturbing image region is formed of a single disturbing image having an image characteristic, a situation, in which masking is insufficient, occurs. For example, if a wide disturbing image region formed of text having white-black luminance contrast exists and a private image, such as a color photograph, is displayed in the region, masking is insufficiently performed.

Figure 25A:
FIGS. 25a to 25c are diagrams showing a process of generating a disturbing image through the mixing of image components in accordance with the present invention.
Figure 25B:
Figure 25C:

FIG. 25*a* illustrates an embodiment in which a disturbing image is produced and generated based on the spatial distribution arrangement. In the above-described embodiment, a text image and a photograph or picture image having luminance or color contrast are arranged while being spatially distributed. In the spatial overlapping arrangement, image components having different characteristics are arranged in a single region while overlapping each other. FIG. 25*b* illustrates an embodiment in which a disturbing image is constructed using the spatial overlapping arrangement. FIG. 25c illustrates an embodiment in which a disturbing image is constructed using the spatial distribution arrangement and the spatial overlapping arrangement. During actual operation, the components or parts of the disturbing image are updated by moving or deforming them with the lapse of time or loading new image components.

In the present invention, a disturbing image preferably includes image components having characteristics similar to those of a private image. In an embodiment, a disturbing image includes image components having characteristics similar to those of a private image and image components having characteristics different from those of the private image. In general, the image components having similar characteristics play a chief role in releasing the cognitive grouping of a private image and the image components having different characteristics play a chief role in generating cognitive grouping different from that of the private image. If the private image is a text image, the disturbing image includes at least a text image component. If the private image is a photograph image, the disturbing image includes at least a non-text image component.

In another embodiment, masking images are more frequently displayed with the frame ratio of a disturbing masking image being made higher than the frame ratio of a private image. In still another embodiment, a method of compressing the image values (Ga value) of a computer domain is utilized. In this method, the range of the Ga values (RGB values) of an original image (private image) is compressed. For example, the range of a masking image is made greater than the range of a private image as, when the masking image has a range of $0 \leq Ga \leq 255$, an original image is made to have a range of $0 \leq Ga \leq 255$. In this Ga value compression method is effective in equivalently making the frame ratio of a disturbing masking image higher than the frame ratio of a private image. Preferably, the compression of Ga values is implemented by color table compression.

In an embodiment of the present invention, an entire private display management server transmits an advertisement image to a private display user computer through a network, and the transmitted advertisement image is used as a disturbing image that is one of masking images.

[P/M Image Sequence and Shutter Opening/Closing Sequence Generating Process]

Figure 26:
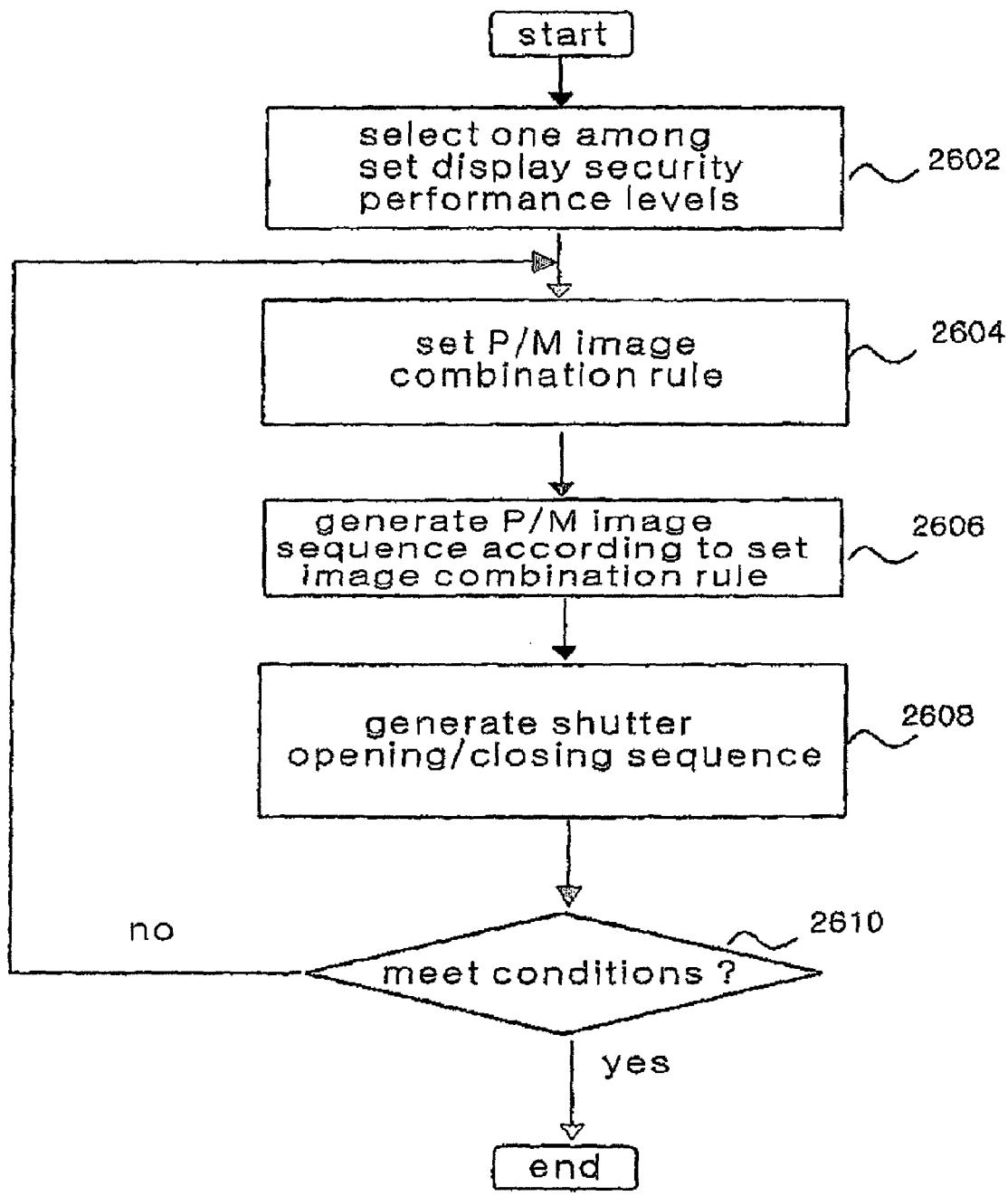
FIG. 26 is a flowchart illustrating a process of generating a sequence of private images and masking images and a shutter opening/closing sequence in accordance with the present invention.

After the user has undergone user authentication and selected a security performance level, a P/M image sequence and a shutter opening/closing sequence are generated according to the user authentication level and the display security performance level. A process of generating the P/M image sequence and the shutter opening/closing sequence is illustrated in FIG. 26. After the user authentication, the user selects one of preset display security performance levels at step 2602. Thereafter, a P/M image mixing ratio and a P/M image mixing rule fulfilling the display security performance level and user visual perception performance are selected at step 2604. Thereafter, the P/M image sequence is generated according to the mixing rule at step 2606. Thereafter, the shutter opening/closing sequence fulfilling the selected security performance level and the user visual perception and corresponding to the P/M image sequence is generated at step 2608. Thereafter, the step 2610 of determining whether a desired shutter opening/closing sequence has been generated is performed. If the desired shutter opening/closing sequence has been generated, the process ends; otherwise the process proceeds to step 2612. At step 2612, it is determined whether the mixing rule will be re-selected. If it is determined that the mixing rule will not be re-selected, the process proceeds to step 2606 in which the P/M image sequence is generated and the following steps are performed. If it is determined that the mixing rule will be re-selected, the process proceeds to step 2604 in which the P/M image mixing ratio and the mixing rule are re-selected and the following steps are performed.

[Mixing Ratio and Mixing Rule]

The security levels of step 2602 may be variously defined. For an example, at a first level, an unauthorized person cannot perceive the approximate type of user private images even though the unauthorized person views a monitor for a period longer than a certain period. The first security level is the strictest private information protection level. For example, at this level, the unauthorized person cannot learn whether the user performs word processing or views moving images. At a second level, if the unauthorized person views a monitor for a period longer than a certain period, the user perceives the approximate type of user images. However, the unauthorized person cannot learn even a part of the contents of user image information. For example, the unauthorized person can learn that the user is viewing moving images, but cannot learn that the moving images are a movie or image chatting. At a third level, if an unauthorized person views a monitor for a period longer than a certain period, the unauthorized person can approximately learn a part of the contents of user image information. However, the unauthorized person can learn most of the contents of user image information. For example, the authorized person cannot learn the contents being word-processed. The unauthorized person can learn that the user is viewing the moving images of a movie, but cannot learn the contents of the moving images. At a fourth level, if an authorized person views a monitor for a period longer than a certain period, the unauthorized person can accurately learn a part of the contents of user image information. However, it cannot be learned that most of the contents of user image information. For example, some of the contents word-processed can be learned. At a fifth level, an unauthorized person can learn a considerable part of the contents of user image information. However, the unauthorized person senses inconvenience to visually perceive an image. For another embodiment, the extent to which a user private image and an intentional disturbing image are perceived by an unauthorized person may be added to such a performance level as an additional performance index.

At step 2604, the P/M image mixing ratio and the mixing rule are selected. At the P/M image mixing rule selection step 2604, the selection of the type of masking images M to be mixed, the selection of the mean mixing ration of P/M images, and the selection of P/M image sequence generation methodology to insert aperiodicity while maintaining the mean mixing ratio are executed. For the image sequence generation methodology, there are a maximum repetition period sequence method and a maximum identical characteristic continuous image sequence method that will be described later. In the conventional method, the P/M image mixing rule selection step and the P/M image sequence generation step are not divided from each other. Since in the conventional method, security performance and visual perception performance are insufficiently taken into consideration, an image sequence is generated in a 1:m repetition sequence or random sequence in a simple fashion. At the time of selecting the P/M image mixing rule, the current refresh rate of a monitor, the response time of a monitor pixel, and the optical response characteristics of a shutter are all taken into consideration. Furthermore, attention should be paid to the characteristics (inverse image or disturbing image) of P/M images. The P/M image sequence method is ineffective in terms of various performance aspects because the above-described four points are not taken into consideration at the time of generating a sequence. Furthermore, at the time of generating the P/M image sequence, the shutter opening/closing sequence should be taken into consideration, and even at the time of generating the shutter, the P/M image sequence should be taken into consideration.

In the conventional image mixing, private images are mixed with masking images having the same characteristics. That is, masking images having the same characteristics, such as masking images composed of inverse images or random images, are mixed with private images. A P/M image sequence is generated under the mixing rule. In the P/M image mixing ratio and mixing rule of the present invention, images having different characteristics can be mixed with each other.

For an embodiment, masking images in which original image-derived images are mixed with disturbing images are mixed with private images. For methods of mixing original image-derived images with disturbing images, there are a method of mixing image components having different characteristics, such as an original image-derived image and a disturbing image, with each other in a single masking image frame, and a method of generating a masking frame $M^i$ chiefly composed of original image-derived images and a masking frame $M^d$ in which disturbing images are added or dominant and mixing the masking frames with private images on a frame level. In this case, the masking frame $M^i$ represents a pure original image-derived image or a sum image in which original image-derived images are dominant compared to disturbing images, and the masking frame $M^d$ represents disturbing images or the sum image of an original image-derived image and a disturbing image in which the portion of the disturbing image is larger than a certain value. The mean mixing ratio may be determined in various fashions, such as P:M=5:5, P:M=4:6, and P:$M^i$:$M^d$=4:4:2. When images are mixed with each other at a ratio of P:$M^i$:$M^d$, $M^i$ is made a mixed image in which a random image having a certain amplitude is added to an inverse image and $M^d$ is made an image frame having the characteristics of a disturbing image in an embodiment. For another embodiment, images are mixed with each other at a ratio, such as P:$M^i$:$M^b$ or P:$M^b$:$M^d$. For an example, images may be mixed with each other at a ratio of P:$M^i$:$M^d$:$M^b$=4:4:1.5:0.5 (in this case, a type of P:M=4:6. For another embodiment, private images may be mixed with two types of disturbing images as private images are mixed with disturbing images hindering the grouping of the private images and disturbing images grouped with each other.

For an embodiment of the present invention, a real-time original image-derived image is generated by randomly changing a color table according to a conversion rule using the color table (see 402 in FIG. 4), which is included in a video control device, such as a video card, as an image value converter. In another embodiment of the present invention, real-time image value conversion is implemented using an inverter or differentiating or integrating circuit.

Using the color table changing method, it is convenient to generate a masking image, in which an original image-derived image is mixed with a disturbing image, in real time. In the method of mixing an original image-derived image with a disturbing image in a single masking image frame, the mixed image of an original image-derived image and a disturbing image can be generated using the color table changing method in an embodiment. For another embodiment, a mixed image can be generated by generating an original image-derived image using the color table changing method and adding a disturbing image, which is obtained through the calculation of pixel image values for some pixels. For another embodiment, the sum image of a private image and a disturbing image is generated by copying the private image to a masking memory space and adding a disturbing image to the copied private image. If the color table changing method is used at the time of transmitting a sum image to a monitor, a sum image-derived converted image is transmitted, so that the sum image of an original image-derived image and a disturbing image is generated and transmitted to a monitor. In a method in which masking frames $M^i$ and $M^d$ are generated and mixed with private images on a frame level, when the color table changing method is used, it is convenient to generate a masking image in real time.

For an embodiment, in the case where images are mixed at a ratio of P:$M^i$:$M^d$, if $M^i$ is generated from a private image in real time using the color table changing method and $M^d$ is relatively slowly updated through the calculation of pixel image values, a real-time mixed masking image can be provided as a whole. For another embodiment, in the case where images are mixed at a ratio of P:$M^i$:$M^d$, $M^i$ is quickly generated in real time using the color table changing method, and $M^d$ is generated by relatively slowly copying private images several times per second to a masking image memory space and adding disturbing images to the private images. When $M^d$ is transmitted to a monitor, the color table changing method can be used as for $M^i$. In this case, $M^d$ can effectively mask rapidly changing private images and $M^i$ can effectively mask slowly changing private images, so that the ration of $M^i$:$M^d$ is differently adjusted according to the characteristics of private images in an embodiment. For an example, when many still images exist in private images as in text work, the portion of $M^d$ is increased. Furthermore, when many moving images exist in private images, the portion of $M^i$ is increased. The adjustment of the ratio can be executed in such a way that private display software learns the characteristics of a current private image and automatically adjusts the ratio to be suitable for the learned characteristics, or the user adjusts the ratio. Furthermore, the range of the adjustment of the ratio is determined by restricting display frequencies per second for $M^i$ and $M^d$ in view of the current refresh rate of a monitor and the sensitive frequency characteristics of human visual perception.

In general, a masking image is made to be seen better than a private image, so that a mixing rule, which reduces the contrast of a private image compared to the contrast of a masking image, may be selected. The contrast of an image may be reduced through the calculation of respective pixel image values that consume excessive time in calculation. The reduction of the contrast of an image using conversion is termed a color space dynamic range reduction method. In this case, the term dynamic range is the concept similar to the maximum contrast of a color space (difference between the maximum value and the minimum value), the range of the brightness of a monitor or the range of voltage output to a monitor. An embodiment is a HW type, in which the range of voltage of a monitor can be reduced in a hardware fashion only when a private image is output. Another embodiment is a HW type, in which the voltage of a monitor is output without change when a private image is output, and the voltage of the monitor can be amplified when a masking image is output. In an SW type, for an embodiment, there is the reduction of a color space dynamic range using the color table changing method. For example, an input RGB range [0, 255] is reduced to an output RGB range [56, 255].

In a public display, since the user views only a private image that is a part of a monitor image, the user may view a screen in a situation darker than a general mode, so that a need for increasing brightness overall occurs. For this purpose, voltage applied to a monitor may be amplified or a color table changing value may be made to upwardly transit to a brighter side. A method of improving the relative brightness of a monitor using the privacy filter or brightness enhancement film is utilized. In this process, the user's adjustment using the brightness adjusting button and contrast adjusting button of a monitor should be considered.

When a dynamic inverse image is generated and alternated with a private image, an almost uniform gray screen is seen by the naked eye. However, time integration is not complete, so that a problem arises in that a uniform gray screen is displayed as a background even though a minute color or spatial pattern remains, and the uniform gray screen is seen. In particular, this phenomenon is conspicuous at intermediate to high temporal frequencies (tf1~tf3) and intermediate to high spatial frequencies (sf1~sf3). In an embodiment to solve the above-described problem, a colored dynamic inverse image is provided. The colored dynamic inverse image is the inverse image, which is obtained by increasing or reducing the Ga value of a specific color in a dynamic inverse image so that the colored dynamic inverse image is tinged with somewhat colored gray when being alternated with a private image. In an embodiment, if the color of a colored dynamic inverse image is changed many times for a single monitor frame period, for which a masking image is displayed, using the color table changing method, many pieces of differently colored inverse images can be generated in a single masking image monitor frame. Such a colored dynamic inverse image is effective in blocking a minute color, space pattern due to incomplete time integration. In a more general embodiment, a masking image can be generated as an image which is a dynamic inverse image in terms of luminance and the color of which is randomly changed.

In another embodiment of the present invention, the following private image separation method can be used at a specific sequence position to perform smooth shutter opening/closing. For example, in the case where a private image P1 having a pixel image value of (R1, G1, B1) and private image P2 having a pixel image value of (R2, G2, B2) are continuously displayed, private image P3 having a pixel image value of (R3, G3, B3) and private image P4 having a pixel image value of (R4, G4, B4) are continuously displayed instead. In this case, the dynamic mean pixel image value of the private image P1 having a pixel image value of (R1, G1, B1) and the private image P2 having a pixel image value of (R2, G2, B2) is made to be identical with the dynamic mean pixel image value of the private image P3 having a pixel image value of (R3, G3, B3) and the private image P4 having a pixel image value of (R4, G4, B4).

When private display is simultaneously provided to two or more authorized users using a single monitor, a corresponding mixing rule is followed. The private image frame of user a, the masking image frame of user a, the private image frame of user b, and the masking image frame of user b are defined as P_a, M_a, P_b, and M_b, respectively. In this case, P_b and M_b as well as M_a function as masking images for the user a. When private display is simultaneously provided to two or more authorized users using a single monitor, images can be mixed with each other in such a way that P_a, P_b, M_a and M_b are used as image components and the above-described mixing rules are simply modified and applied.

The P/M image sequence generation step 2606 based on the mixing rules is described in detail below. After the mixing rule of image frames is determined, a P/M image sequence is generated according to the mixing rule.

In Sun Microsystems' scheme, a 1:m (m=1, 2, ...) repetitive alternation sequence method is a convenient and efficient method if a peeper does not exist, but is weak to a peeper because a sequence has a repetitive period. In contrast, although the IBM's scheme is an asynchronous type scheme, an image frame repeatedly alternates between P and M images, so that the IBM's scheme has an 'anti-peeper security performance' better than that of Sun Microsystems' scheme, but is still inefficient. In MERL (Mishubishi Electric Research Lab.) scheme, a P/M image frame sequence is randomly generated and provided to improve 'anti-peeper security performance.' When the P/M image frame sequence is randomly generated, 'anti-peeper security performance' is improved and the difference between the duration of shutter opening and the duration of shutter closing becomes irregular, so that it is considerably inconvenient and fatigued in terms of visual perception for an authorized user to view images.

In the present invention, a maximum repetitive period sequence method is proposed to overcome problems attributable to the regular repetitive periodicity of the Sun Microsystems' scheme and the IBM's scheme and problems attributable to the random irregularity of the MERL's scheme. Whether a P/M image sequence is repetitive is determined depending on whether a specific region of a monitor is sequentially repetitive on the basis of a monitor frame. Accordingly, whether a P/M image sequence is repetitive may vary with the regions of a monitor. Although the P/M image sequence method of the IBM's scheme is an asynchronous type method, a P image is displayed in the k-th frame, and a P image is displayed up to a specific region of the upper end of the (k+1)th frame and an M image is displayed in the remaining region of the (k+1)th frame, so that P images are repetitively displayed in the kth monitor frame, the (k+2)th monitor frame, the (k+4)th monitor frame, . . . . That is, an image temporally alternates between a P image and an M image on the basis of a monitor frame, so that the characteristic of a repetitive sequence is exhibited and 'anti-peeper security performance' is reduced.

Figure 27:
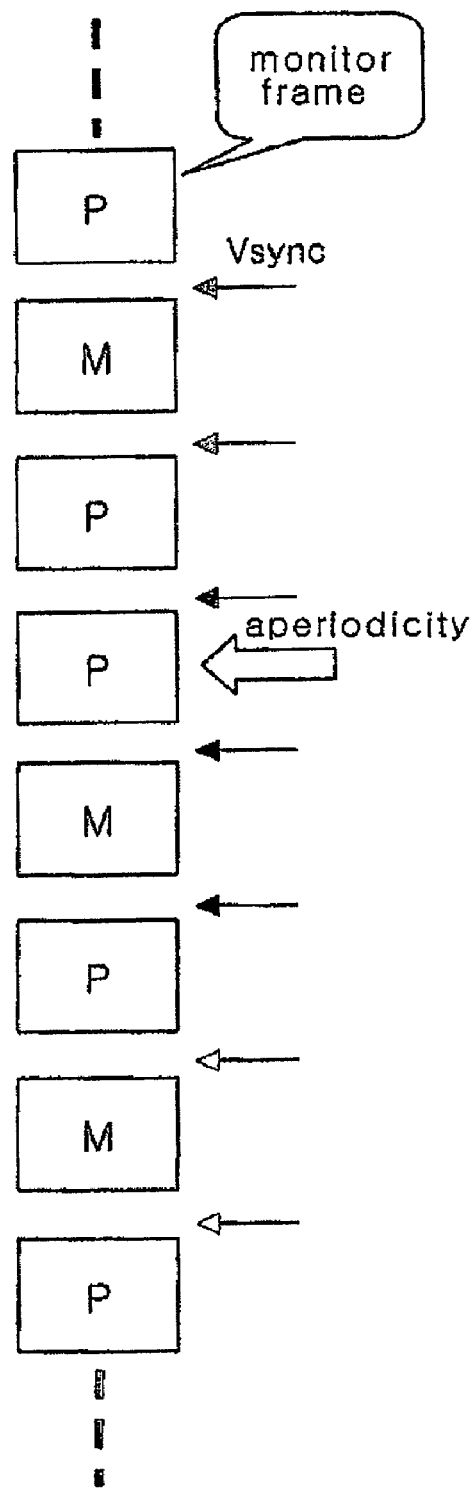
FIGS. 27 and 28 are diagrams showing an aperiodicity insertion sequence method according to the present invention.

The maximum repetitive period sequence method is the method in which the maximum allowable number of sequence repetitive periods is limited so that there is generated the sequence in which aperiodicity, such as a phase change, is inserted into a regularly repetitive period sequence. The sequence method regularly inserts aperiodicity, such as a phase change, into repetitive period sequences to fulfill 'anti-peeper security performance,' 'user visual perception performance' and 'naked eye security performance.' In general, a peeper easily interpret an image sequence having a repetitive period, particularly a P/M image sequence in which a private image has a regular repetitive period. In the present invention, when the maximum allowable number of sequence repetitive periods is m, all image sequences are each generated to have m or less repetitive periods. In an embodiment of the maximum repetitive period sequence method applied to a vertical sync type in which P/M images are alternated in accordance with the vertical sync of a monitor, aperiodicity is inserted at a certain moment while a repetitive sequence progresses as shown in FIG. 27. For an embodiment, when a monitor frame has a PM repetitive period as in . . . PMPMPMPMPM . . . , a sequence having the maximum number of repetitive periods, m=4, does not allow five-consecutive repetitive periods as in . . . PMPMPMPMPM . . . , so that aperiodicity, such as a sequence phase change, is inserted as in . . . PMPMPMPM-MPMP . . . or . . . PMPMPMPMMMPM . . . . Furthermore, the sequence method of the present invention is the sequence generation method in which repetitive periods, the number of which is equal to or less than the maximum allowable number of repetitive periods, are arranged in random order. For an embodiment, when a PM repetitive period exists and m=4, there is generated a sequence in which a four-consecutive repetitive period unit, phase change aperiodicity, a three-consecutive repetitive period unit, and a two-consecutive repetitive period unit are arranged in random order or randomly. For example, the image sequence in which a monitor frame is generated as in . . . PMPMPMPMMMPMPMPMMP-MPMP . . . is the sequence that is arranged in the order of a four-consecutive repetitive period unit, phase change aperiodicity, a three-consecutive repetitive period unit, phase change aperiodicity and a three-consecutive repetitive period unit to have a unit component of . . . (PMPMPMPM) (MPMP-MP)M(MPMPMP).

The repetitive period of a monitor frame may has various forms, such as PMM, PPM, PPMM and PMPMM, besides a PM repetitive period. For an embodiment, when a PMM repetitive period exists as in . . . PMMPMMPMM . . . and m=3, phase change aperiodicity is inserted after three-consecutive repetitive periods as in . . . (PMMPMMPMM) (PMPMM) . . . or . . . (PMMPMMPMM) (MPMM) . . . .

In another embodiment of the present invention, a P/M image sequence, in which the maximum number of repetitive periods varies with time, is generated. That is, the maximum number of repetitive periods varies with time in such a way that the maximum number of repetitive periods is m1 for a specific time period and the maximum number of repetitive periods is m2 for a next specific time period. When the maximum number of repetitive periods is mi for a specific time period, a sequence is generated for the specific time period according to the maximum repetitive period sequence method with mi being used as the maximum number of repetitive periods. A P/M image sequence, in which the form of a unit repetitive period varies with time by optionally or randomly varying the maximum number of repetitive periods with time or optionally or randomly varying the width of time having the same maximum number of repetitive periods, is generated.

In another embodiment of the present invention, an M image sequence, in which the maximum number of repetitive periods and the form of a unit repetitive period vary with time. In another embodiment of the maximum repetitive period sequence method, a sequence, in which one or more optional or random sequences are added to or inserted into a sequence generated by the maximum repetitive period sequence method, is generated.

Figure 28:
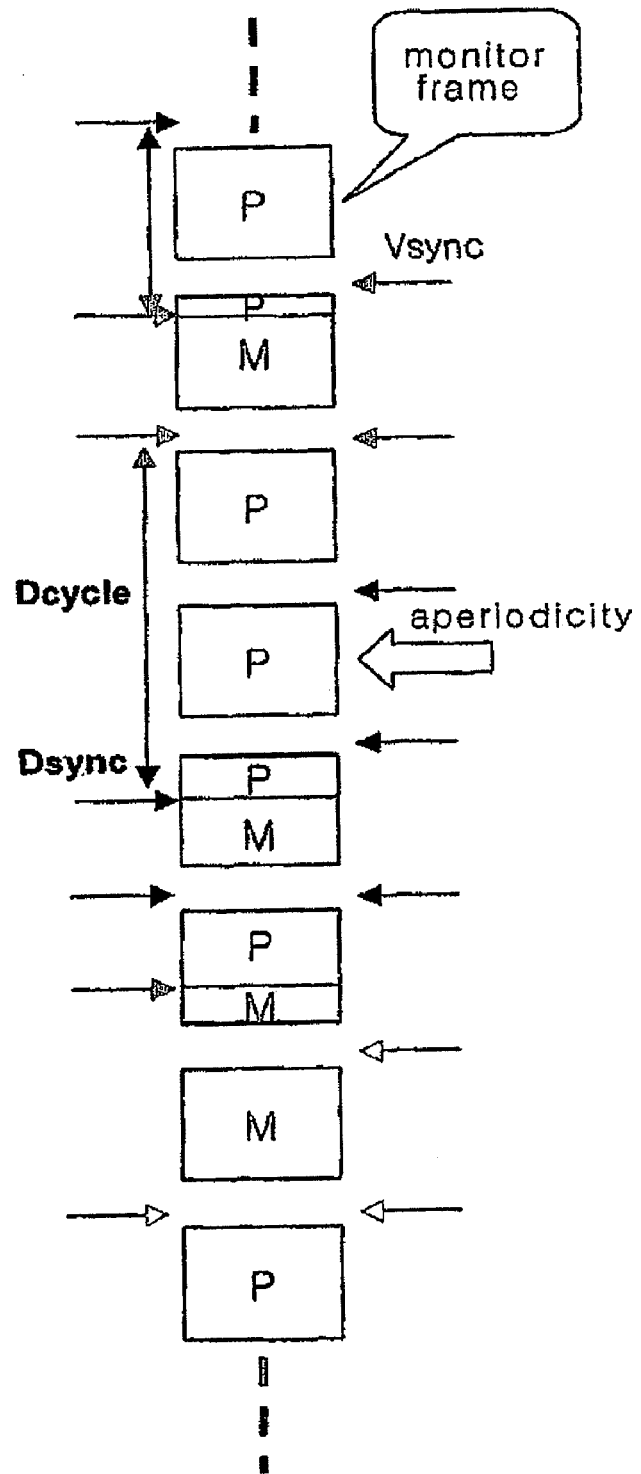

In an embodiment of the maximum repetitive period sequence method applied to an asynchronous type, aperiodicity is inserted at a certain moment while a repetitive sequence progresses as shown in FIG. 28. When the maximum repetitive period sequence method is applied to an asynchronous type, an image data cycle time should be selected depending on the refresh cycle time of a monitor frame. If the image data cycle time is not appropriately selected, a specific region of the upper or lower end of a monitor is periodically exposed and the probability that a sequence will be interpreted by a peeper is increased even though aperiodicity is inserted.

When a P/M image sequence is generated by inserting aperiodicity, 'user visual perception performance' should be considered. Human visual perception is sensitive to a brightness variation within a temporal frequency range of about 10~30 Hz. Accordingly, aperiodicity in a temporal frequency range of about 10~30 Hz is inserted, the user will have visual perception in which the aperiodicity has been inserted. The user must perceive a private image without external disturbance, so that the perception of the flow of an image sequence by user's eye interferes with the comfortable perception of the private image and may cause the eye to be strained. In order to reduce the discomfort of visual perception, a P/M image sequence, in which phase change aperiodicity is inserted 15 or less times per second, is generated in an embodiment of the present invention. In another embodiment, a P/M image sequence, in which phase change aperiodicity is inserted 25 or less times per second, is generated.

In an embodiment of the present invention, 'anti-peeper security performance' can be further improved by operating a monitor at various refresh rates in addition to the maximum repetitive period sequence method. That is, even though not supported in a VESA standard monitor, a monitor can be operated at refresh rates, such as 101 Hz and 103 Hz.

Meanwhile, if images having the same characteristics, such as PPP or MMM, are consecutively displayed in the monitor frames of vertical sync type private display, a peeper can easily learn the sequence, and the displaying of the images causes excessive contrast, thus fatiguing the eye. The maximum same characteristic consecutive image sequence method of the present invention proposed to solve the above problem is the method of restricting the maximum allowable number of images having the same characteristics that can be consecutively displayed in a P/M image sequence. In an embodiment, it is determined whether the same characteristics exist in images, depending on whether the images are P or M images. In another embodiment, it is determined in detail whether the same characteristics exist in M images, depending on whether the M images have the same masking characteristics. In an embodiment, when it is determined whether the same characteristics exist in images, depending on whether the images are P or M images, the maximum same characteristic consecutive image sequence method that allows a maximum of m consecutive image frames having the same characteristics is as follows.

A method, which allows a maximum of 1 image frame having the same characteristics (prohibits two-consecutive images having the same characteristics), generates 1:1 alternation images, such as PMPMPM . . . , which has no 'anti-peeper security performance.' A method, which allows a maximum of 2-consecutive images having the same characteristics (prohibits 3-consecutive image frames having the same characteristics), generates an image sequence, such as PPMMPMMPPM . . . . The method of allowing 2-consecutive images having the same characteristics randomly generates first and second images. If the (k-1)th frame is different from the (k-2)th frame at the time of generating the kth frame, the kth frame is formed of an image having optional or random characteristics. If the (k-1)th frame is not different from the (k-2)th frame, the kth frame is formed of an image having characteristics different from those of the (k-1)th frame. For example, if (k-1)th frame is a P image, the kth frame is formed of an M image.

Furthermore, the maximum same characteristic consecutive image sequence method of the present invention generates a P/M image sequence in which a maximum allowable value varies with time. That is, the maximum allowable value varies with time in such a way that the maximum allowable number of consecutive images having the same characteristics for a specific time period is m1 and the maximum allowable number of consecutive images having the same characteristics for a next specific time period is m2 If the maximum allowable value is mi, a sequence is generated for a specific time period according to the maximum allowable number sequence method with mi being used as the maximum allowable value. A P/M image sequence, in which the maximum allowable value varies with time by optionally or randomly varying the maximum allowable number with time or optionally or randomly varying the width of time having the same maximum number, is generated.

In another embodiment of the maximum same characteristic consecutive image sequence method, a sequence, in which one or more optional or random sequences are added to or inserted into a sequence generated by the maximum same characteristic consecutive image sequence method, is generated. The maximum same characteristic consecutive image sequence method is the method that improves 'user visual perception performance' by reducing the strain of the eye. With this method, a sequence, in which P and M images are simply and repetitively alternated with each other, such as PMPMPM . . . , is generated, so that this method is not the method in which 'anti-peeper security performance' is taken into consideration. In another embodiment of the present invention, a P/M image sequence is generated under the methodology in which the maximum repetitive period sequence method and the maximum same characteristic consecutive image sequence method are integrated with each other.

In another embodiment of the present invention, the same characteristic consecutive image method is performed with it is determined whether the same characteristics exist, depending on whether the M images have the same masking characteristics. In this case, when masking images are divided into $M^i$ and $M^d$ and identified as frames having different characteristics, $P M^i M^d P M^i M^d$ is a sequence having 1-consecutive images. Even though the maximum same characteristic consecutive image sequence method is performed while determining whether the same characteristics exist in detail, this maximum same characteristic consecutive image sequence method is performed in the same process as the method in which it is determined whether the same characteristics exist in images, depending on whether the images are P or M images.

If a P/M image sequence is generated as described above, a shutter opening/closing sequence fulfilling a selected security performance level and user visual performance and corresponding to the P/M image sequence is generated. FIGS. 29 to 34 are drawings illustrating a private image and masking image sequence and a shutter opening/closing sequence in accordance with the present invention.

A conventional shutter opening/closing sequence operates a shutter in two states, including opening and closing. When a private image is displayed according to a P/M image sequence, the shutter is opened. When a masking image is displayed, the shutter is closed. Since the P/M image sequence and the shutter opening/closing sequence are operated correspondingly in the same fashion as described above, it is not necessary to take the P/M image sequence and the shutter opening/closing sequence into consideration independently.

If an optical signal having a different time phase is incident on the eye while temporally periodic optical signals are incident on the eye, visual perception sensitively reacts to the optical signal having a different time phase due to the temporal frequency sensitivity and temporal grouping of human visual characteristics. If a P/M image sequence is repetitively and periodically alternated to allow the optical signal of an image to be incident on the user's eye, and a shutter is repetitively and periodically opened and closed, it is difficult for the user to perceive the opening/closing of the shutter and the alternation of P and M images and the user consecutively perceives private images, so that it is comfortable to view the sequence and visual strain becomes low. However, when a P/M image sequence generated to include phase change aperiodicity so as to improve 'anti-peeper security performance' is viewed in a conventional shutter opening/closing fashion, visual perception sensitively reacts to a phase change aperiodicity component, so that it is inconvenient to view the sequence and strain occurs. In particular, visual perception is more sensitive to the phase change aperiodicity component of a shutter opening/closing means. In an embodiment of the present invention, the above-described problem is solved by generating a P/M image sequence, in which aperiodicity is inserted 15 or less times or 25 or less times per second, and generating a shutter opening/closing sequence to correspond to the P/M image sequence.

Meanwhile, when a P/M image sequence is generated with aperiodicity being inserted, 'user visual perception performance' depends on the contrast of the quantity of light except for a sequence frequency. The quantity of light incident on the user's eye includes ambient light except for the light of the images of a monitor. In particular, the structure of human visual perception is sensitive to the variation of brightness of ambient light rather than central light. For this reason, in the place where surroundings around a monitor are dark, the contrast of the quantity of light of shutter opening/closing is not high, so that it is difficult for the user to perceive the flow of an image sequence. In contrast, in the place where surroundings around a monitor are bright, the contrast of the quantity of light of shutter opening/closing is increased, so that it becomes easy for the user to perceive the flow of an image sequence. Accordingly, when the private display is utilized in a bright place, it is easy due to the high contrast of the quantity of light for the user to feel fatigue.

In order to solve the problem of the contrast of the quantity of light, the present invention proposes an intermediate state shutter opening/closing method. A shutter is opened and closed in multiple states in such a way that an intermediate state is set between two states of opening and closing. If, at the time of opening/closing a shutter, the relative light transmittance of a maximum opening state is normalized to 1, the relative light transmittance of a maximum closing state is normalized to 0 and the relative light transmittance of an intermediate state is set to a value between 0 and 1 according to the opening/closing light transmittance, the shutter is opened and closed in the intermediate state. If voltage corresponding to shutter opening/closing relative light transmittance between 0 and 1 is applied to a shutter, the shutter opening and closing light transmittance can be controlled, thus producing intermediate state shutter opening and closing. In most of shutters, the shutters are in a maximum opening state when voltage is not applied to the shutters, and light transmittance is further decreased as voltage is applied to the shutters more.

Figure 29:
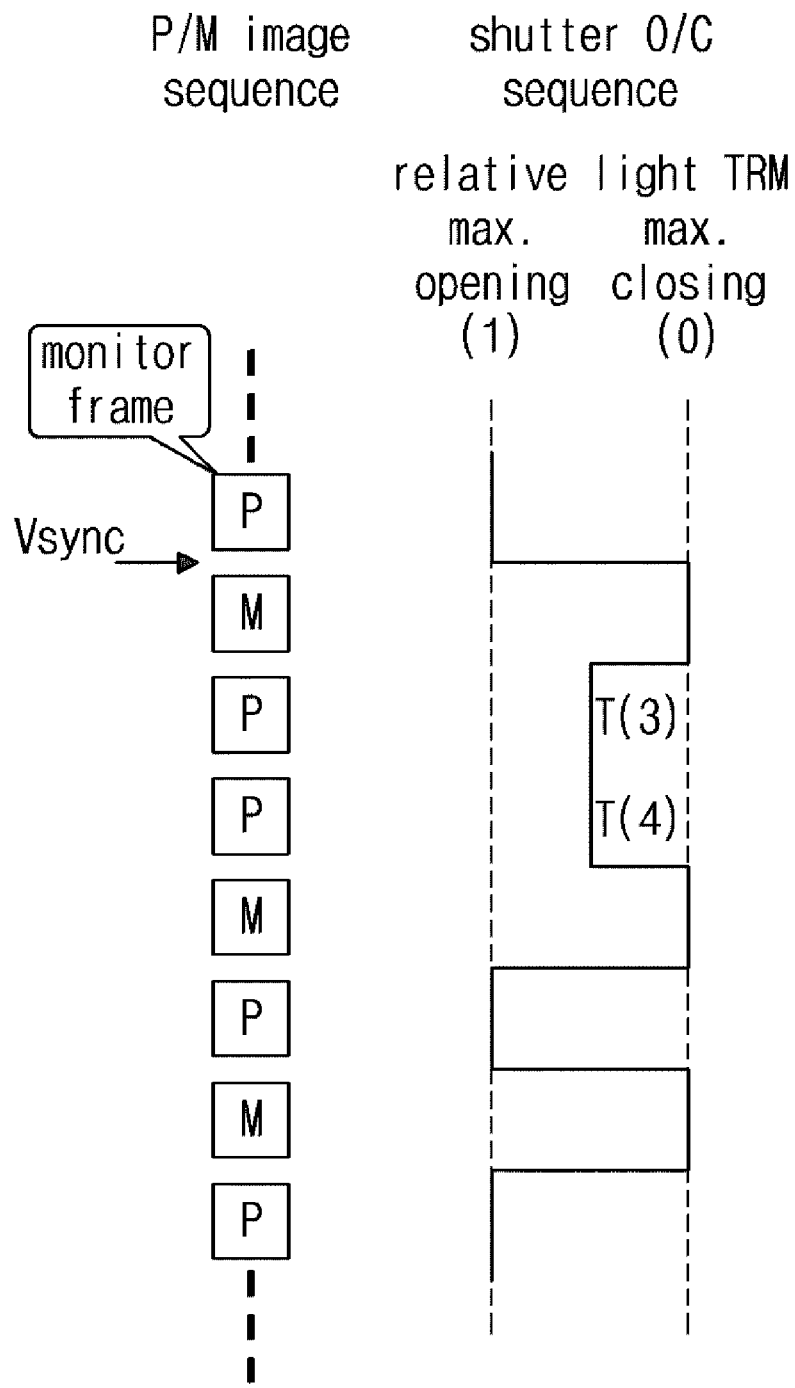
FIGS. 29 to 34 are diagrams illustrating a process of generating a sequence of private images and masking images and a shutter opening/closing sequence in accordance with the present invention.

In particular, the intermediate shutter opening/closing method is applied to the location of a P/M image sequence where phase change aperiodicity exists or the vicinity thereof. A vertical sync type embodiment of a process of generating a shutter opening/closing sequence corresponding to a P/M image sequence using the intermediate state shutter opening/closing method is illustrated in FIGS. 29 to 34. FIG. 29 illustrates an embodiment in which phase change aperiodicity is inserted at the fourth location of an image sequence, in which images are alternated to have a repetitive period of PM, and P images are generated 'at the third and fourth locations. In this case, for an example, intermediate state shutter opening/closing are performed at the third and fourth locations, as shown in FIG. 29. The relative light transmittances T of the third and fourth location are T(3) and T(4), respectively, and voltage to be input to a shutter is controlled to allow T(3) and T(4) to have values between 0 to 1. The inconvenience of visual perception due to phase change aperiodicity is influenced by the duration of the phase change aperiodicity and contrast. Intermediate shutter opening/closing is performed in view of the contrast of a shutter light transmittance sequence and the contrast of a P/M image sequence at locations where P images are arranged due to phase change aperiodicity, as indicated by T (3) and T (4). In another embodiment having such a situation, when 2-consecutive P images are displayed, the contrast of a P image can be reduced using the color space dynamic range reduction method.

Figure 30:
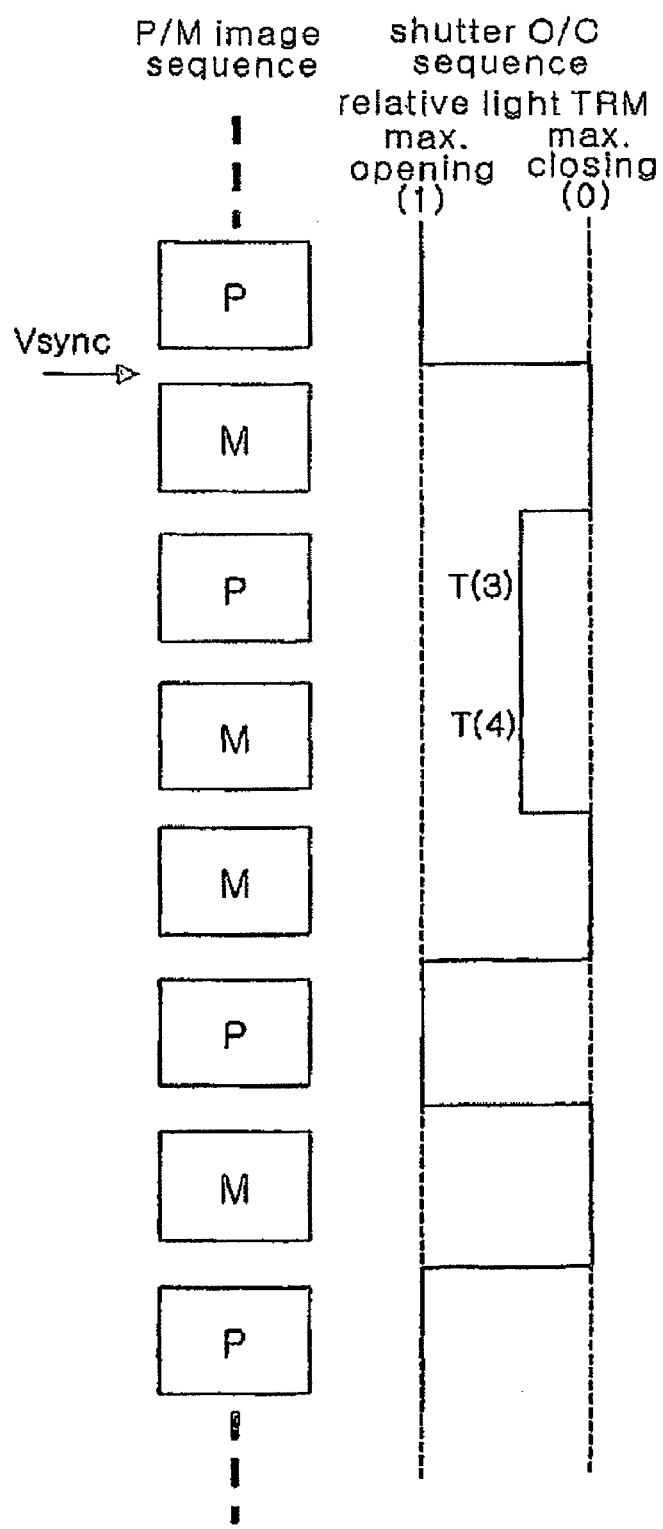

FIG. 30 illustrates an embodiment in which phase change aperiodicity is inserted at the fifth location of an image sequence, in which images are alternated using a repetitive period of PM, and M images are consecutively generated at the fourth and fifth locations. In this case, for an example, intermediate state shutter opening/closing is performed at the third and fourth locations. The Intermediate shutter opening/closing is performed in view of the contrast of a shutter light transmittance sequence and the contrast of a P/M image sequence in the vicinity of locations where two consecutive P images are arranged due to phase change aperiodicity, as indicated by T (3) and T (4). A shutter is opened in the intermediate state in response to an M image, so the user views a masking image, and thus a problem arises in that visual perception is inconvenient. Even though the M image corresponds to the intermediate state shutter opening/closing is a general original image derived image or disturbing image, there is no considerable inconvenience of visual perception. However, to eliminate the inconvenience of visual perception, the M image is generated as a connection image frame $M^b$ in an embodiment. The connecting image frame is the image frame that is inserted to perform smooth shutter opening and closing or, smooth image alternation, as which a blank image frame, uniform gray image frame or uniform colored image frame is used.

Figure 31:
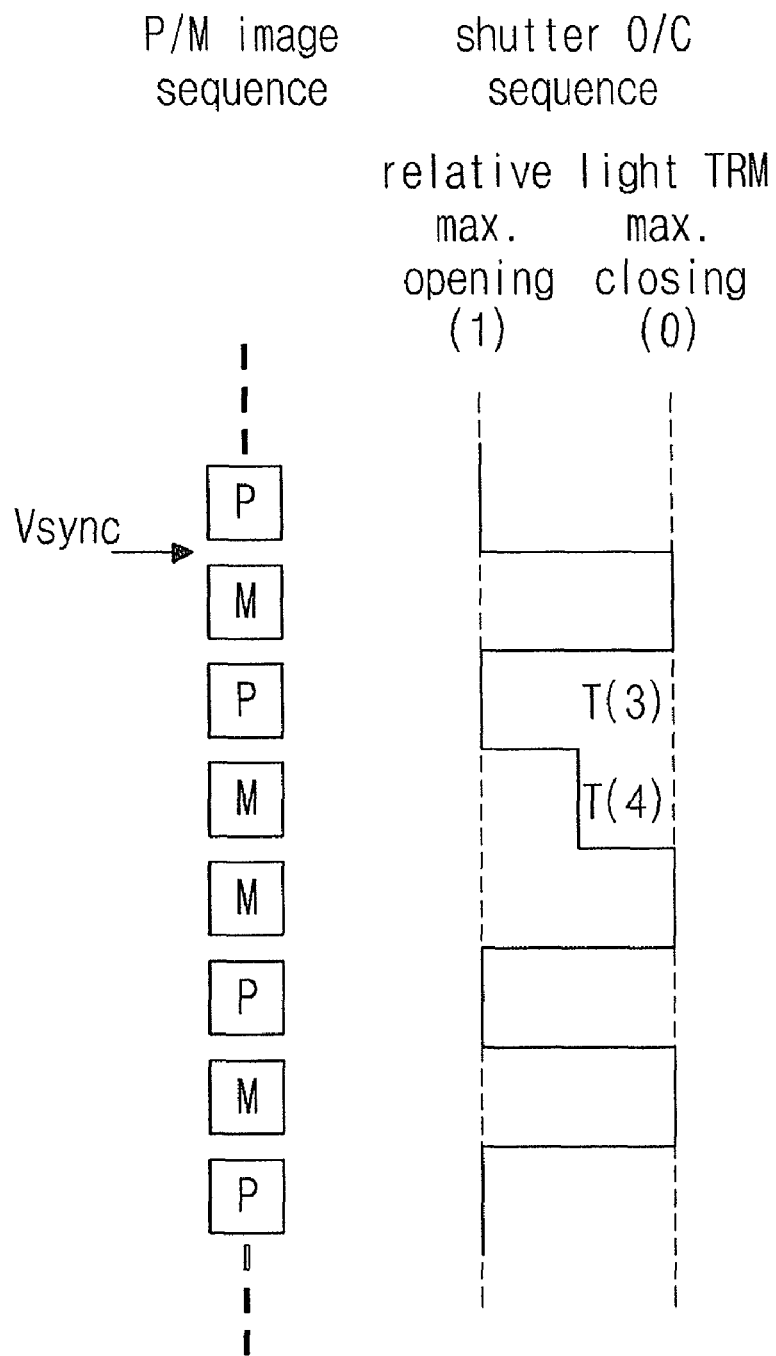
Figure 32:
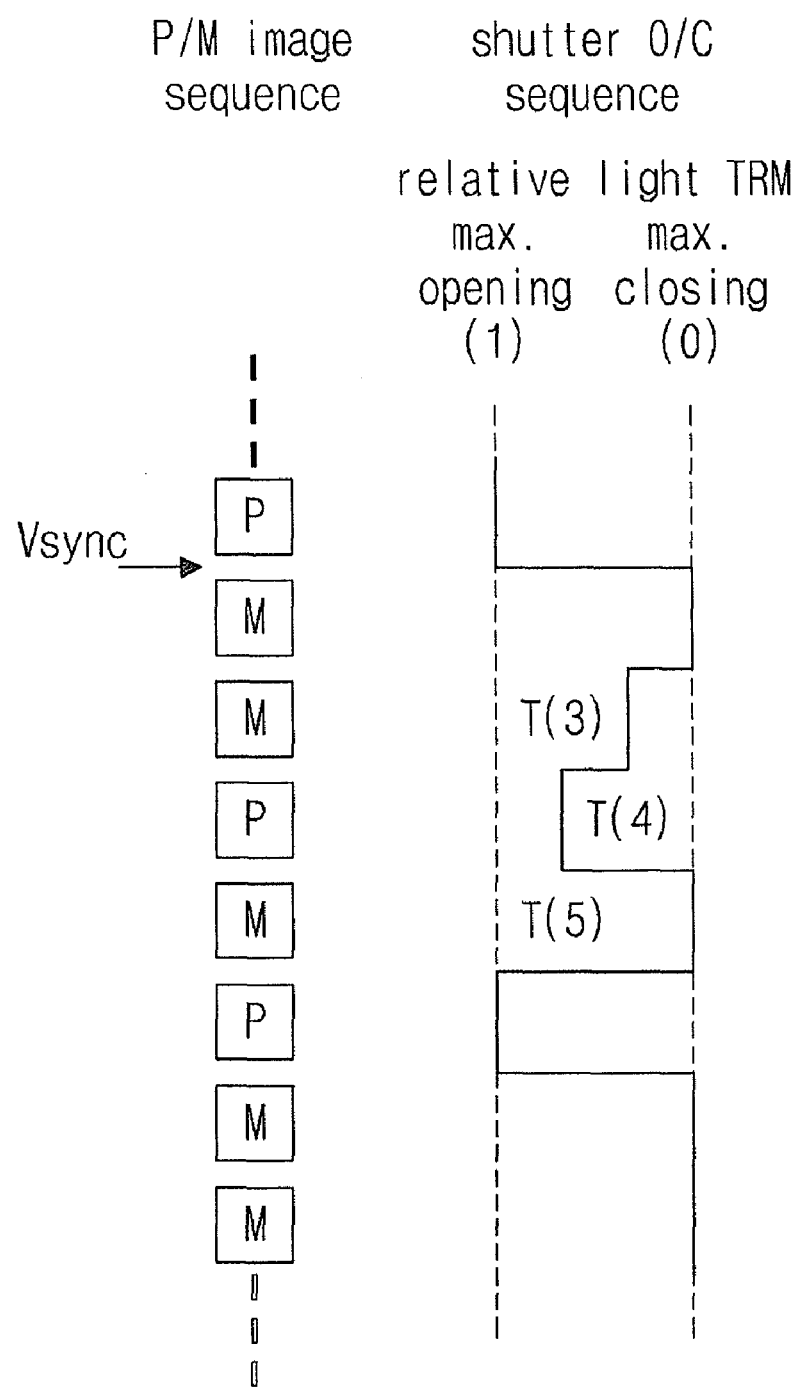
Figure 33:
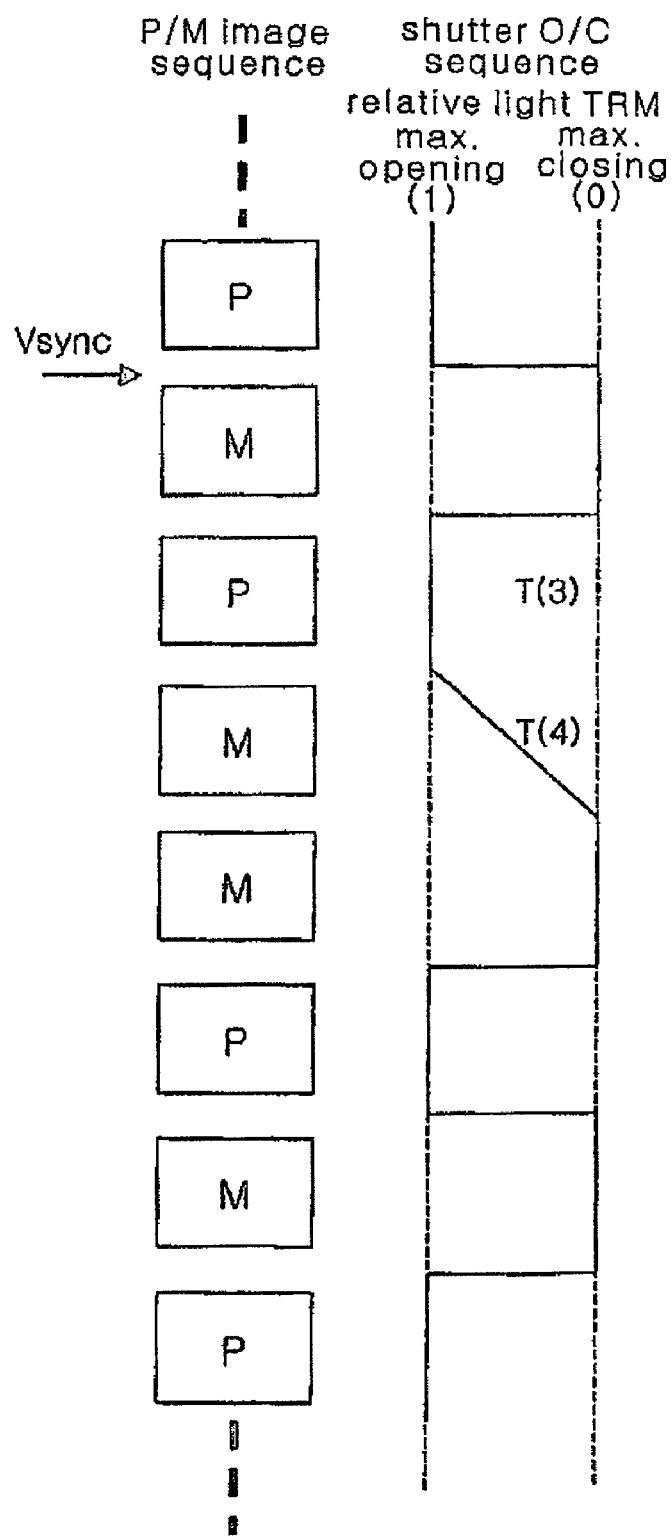
Figure 34:
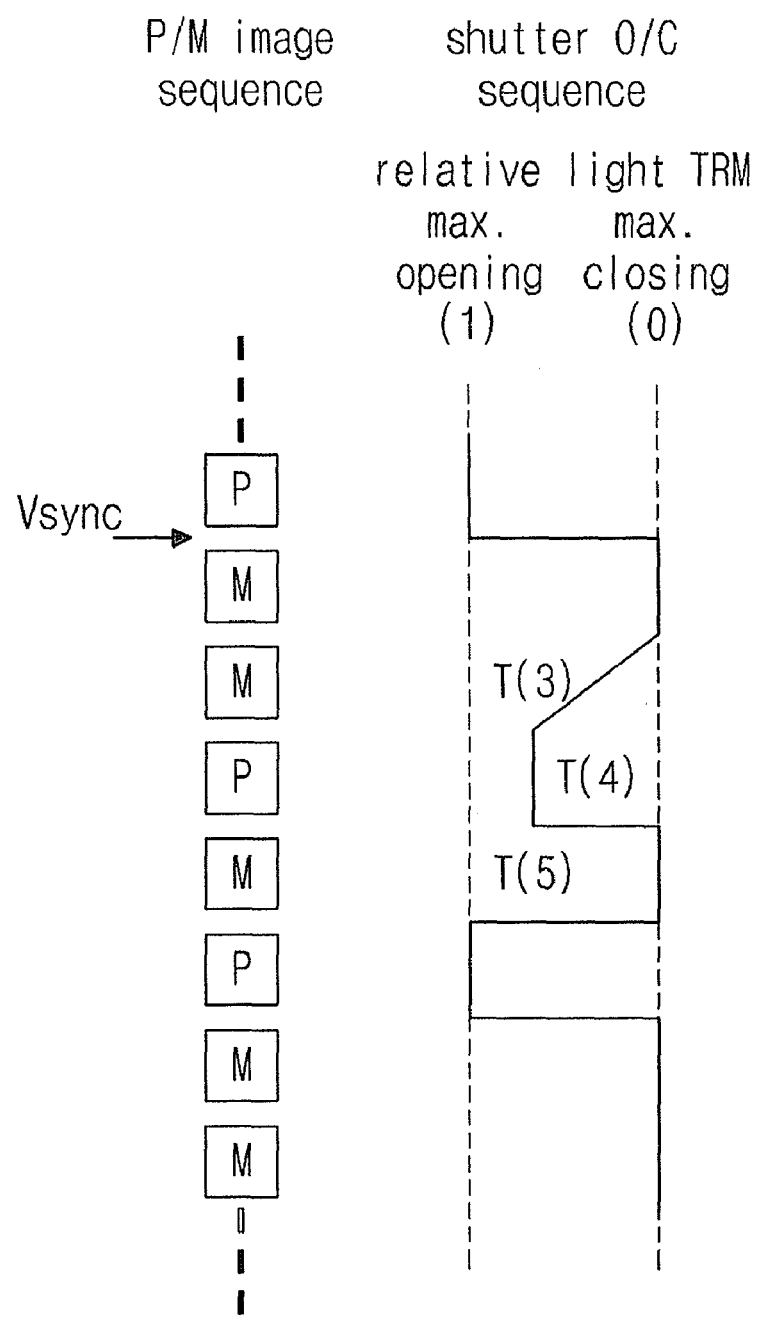

FIG. 31 illustrates an embodiment in which phase change aperiodicity is inserted at the fifth location of an image sequence, in which images are alternated using a repetitive period of PM, and M images are consecutively generated at the fourth and fifth locations. In this case, for an example, intermediate state shutter opening/closing is performed only at the fourth location. FIG. 32 illustrates an embodiment in which a PM sequence, which is phase change aperiodicity, is inserted at the fourth and fifth location of an image sequence in which images are alternated using a repetitive period of PMM. For an embodiment of the M image corresponding to the intermediate state shutter opening/closing, the M image is generated as a connecting image frame $M^b$. FIGS. 33 and 34 illustrate other embodiments that show intermediate state shutter opening/closing sequences that continuously vary the light transmittance of a shutter during a single image frame period with respect to a P/M image sequences identical with that of FIGS. 31 and 32. Shutter opening/closing sequences shown in FIGS. 29 to 34 are ideal light transmittance waveform sequences. A shutter actually implemented with liquid crystal deviates from an ideal light transmission waveform due to rising time and falling time attributable to light response time.

Figure 35:
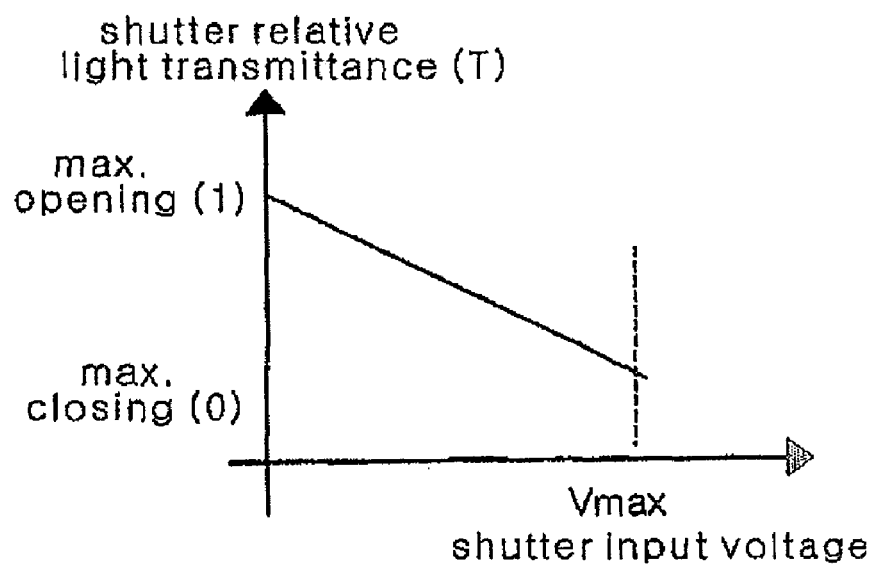
FIGS. 35 and 36 are diagrams illustrating the relation between the relative light transmittances of a shutter and corresponding shutter opening/closing sequence state values.
Figure 36:
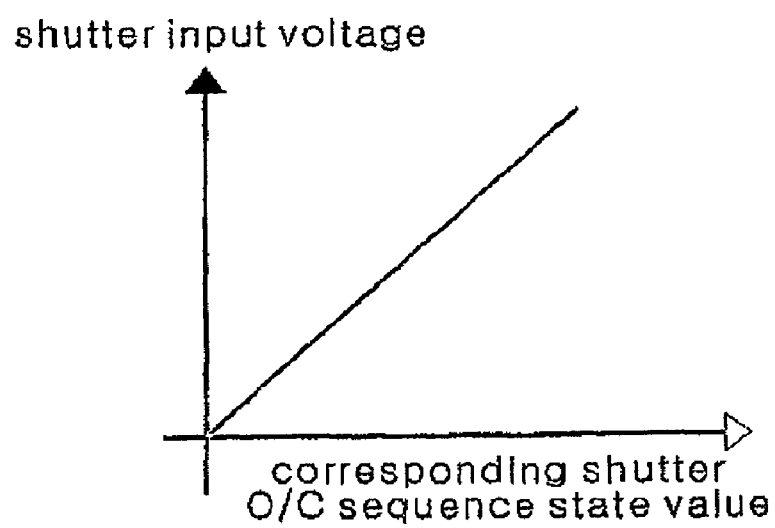

FIGS. 35 and 36 are drawings illustrating the relation between shutter relative light transmittance and shutter opening/closing sequence state values. FIG. 35 illustrates the relation between the relative light transmittance of a shutter and voltage input to the shutter. FIG. 36 illustrates the relation between voltage input to the shutter and shutter opening/closing sequence state values. FIG. 35 illustrates the case where a shutter is in a maximum opening state (1) when voltage is not applied and the shutter is in a maximum closing state (0) when maximum voltage Vmax is applied, as in a liquid crystal shutter. For an embodiment, when shutter opening/closing signals indicate two shutter states of opening and closing, the shutter opening/closing sequence state value of a maximum opening state (1) is set to "0", and the shutter opening/closing sequence state value of a maximum closing state (0) is set to "1."

In another embodiment, when shutter opening/closing signals indicate multistage shutter states, including an intermediate state, shutter opening/closing sequence state values corresponding to shutter intermediate states are appropriately calculated with the shutter opening/closing sequence state value of a maximum opening state (1) set to "0" and the shutter opening/closing state value of a maximum closing state (2) set to "Dmax." For example, intermediate state values are scaled in 8 bits, Dmax=255 and the intermediate state shutter opening/closing sequence state values have values between 0~255.

A shutter controller applying voltage to a shutter receives shutter opening/closing sequence state values corresponding to the opening/closing of a shutter and the extent of the opening/closing of the shutter, which are included in a shutter opening/closing signal, and controls the shutter. The intermediate state shutter opening/closing can be implemented by a modulation method, such as Pulse Width Modulation (PWM), or the application of Direct Current (DC) voltage in the shutter controller. For an embodiment, when the intermediate shutter opening/closing is implemented by the application of DC voltage, the shutter controller the converts received shutter opening/closing state values into analog voltages and applies the analog voltages to a shutter. For example, when a shutter is operates in a range of 0-12 V, the minimum value of a shutter opening/closing sequence state value "0" is converted into 0 V, the maximum value thereof "Dmax" is converted into 12 V and the 0 V and 12 V are applied.

In an embodiment in which the intermediate shutter opening/closing is implemented by PWM, for example, when a shutter is operated in a range of 0-12 V, the extent of the opening/closing of the shutter is determined depending on the ratio of a shutter closing interval (12 V) to a shutter opening interval (0 V). When a shutter is operated at +/−12 V and 0 V using PWM, the extent of the opening/closing of the shutter is determined depending on the ratio of a shutter closing interval (12 V) to a shutter opening interval (0 V). The above case employs the characteristics of liquid crystal in which a liquid crystal shutter is closed when 12 V or −12 V is applied to liquid crystal and the liquid crystal is in a light transmitting state when 0 V is applied to the liquid crystal. Since the mean light transmittance of a shutter becomes lower as the shutter closing interval becomes larger relative to the shutter opening interval, the shutter controller determines the ratio of a shutter closing interval to a shutter opening interval in proportion to received shutter opening/closing sequence state values and operates the shutter using PWM. Many ripples occur in the light transmission waveform of a shutter intermediate state using PWM. If a monitor is viewed in this state, the non-uniformity of an image may be caused by the ripples. Accordingly, in the shutter intermediate state implemented using PWM, the non-uniformity of an image is low when a corresponding image frame is a connecting image frame, such as a blank image, which is effective.

Figure 37A:
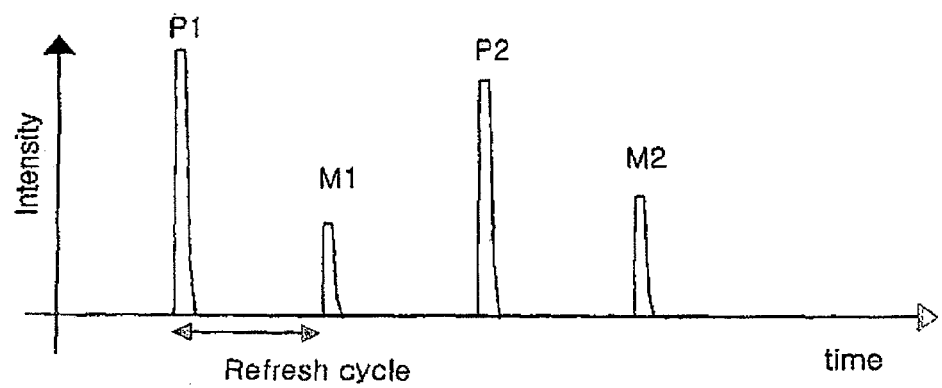
FIGS. 37a and 37b are diagrams illustrating the response time of a general monitor pixel.
Figure 37B:
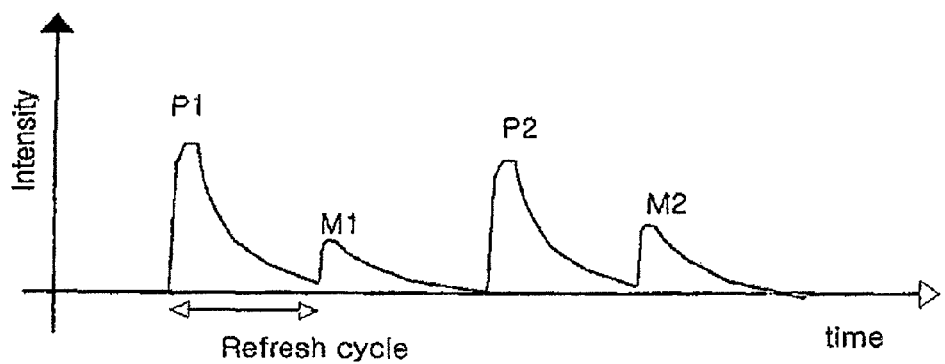

A display, such as an LCD, is problematic in that an after-image remains because the light response time of liquid crystal that is a monitor pixel. The schematic response curve of the light response characteristics of a monitor pixel is illustrated in FIGS. 37a and 37b. The shutter opening/closing sequences of the present invention compensating for the slow response time of a monitor pixel are illustrated in FIGS. 37a and 37b.

Figure 38:
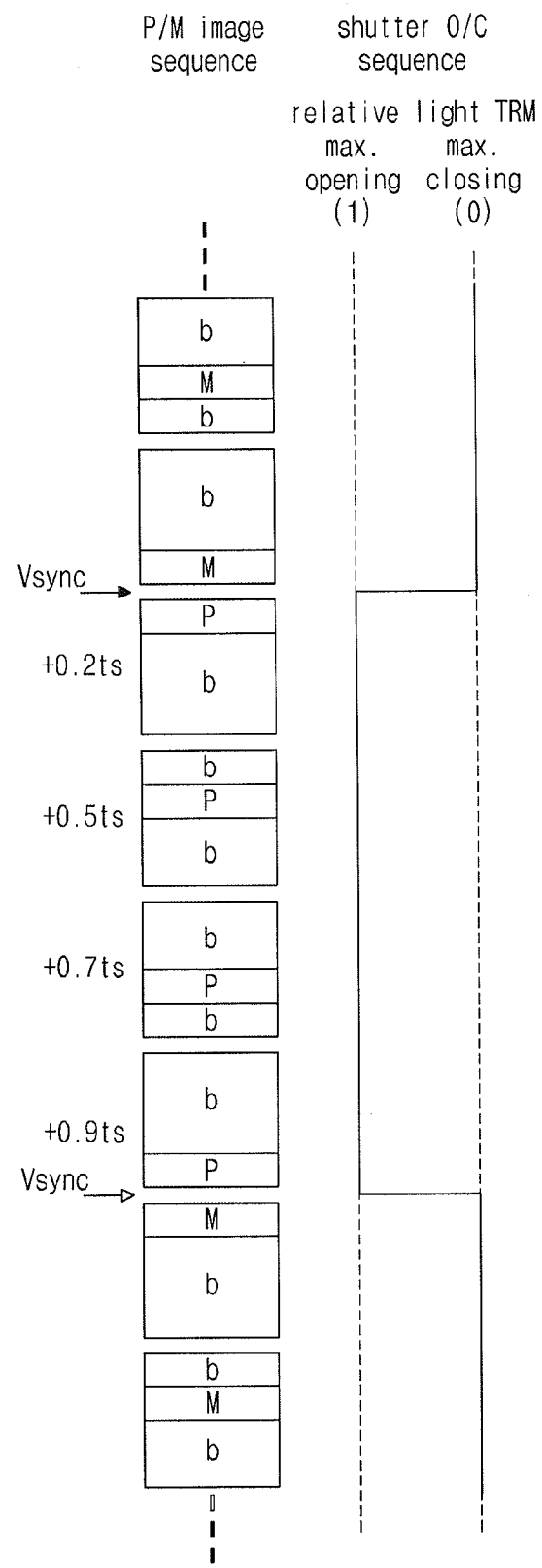
FIGS. 38 to 40 are diagrams illustrating a shutter opening/closing sequence compensating for the slow response time of the monitor pixel in accordance with the present invention.
Figure 39:
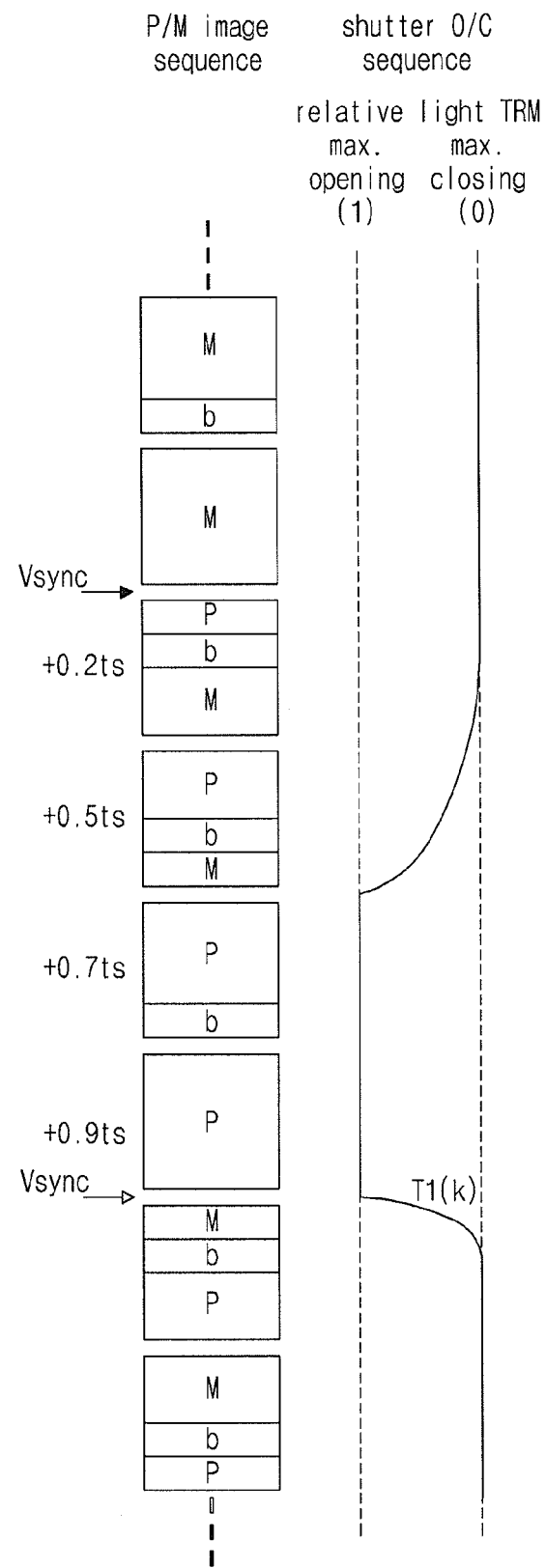
Figure 40:
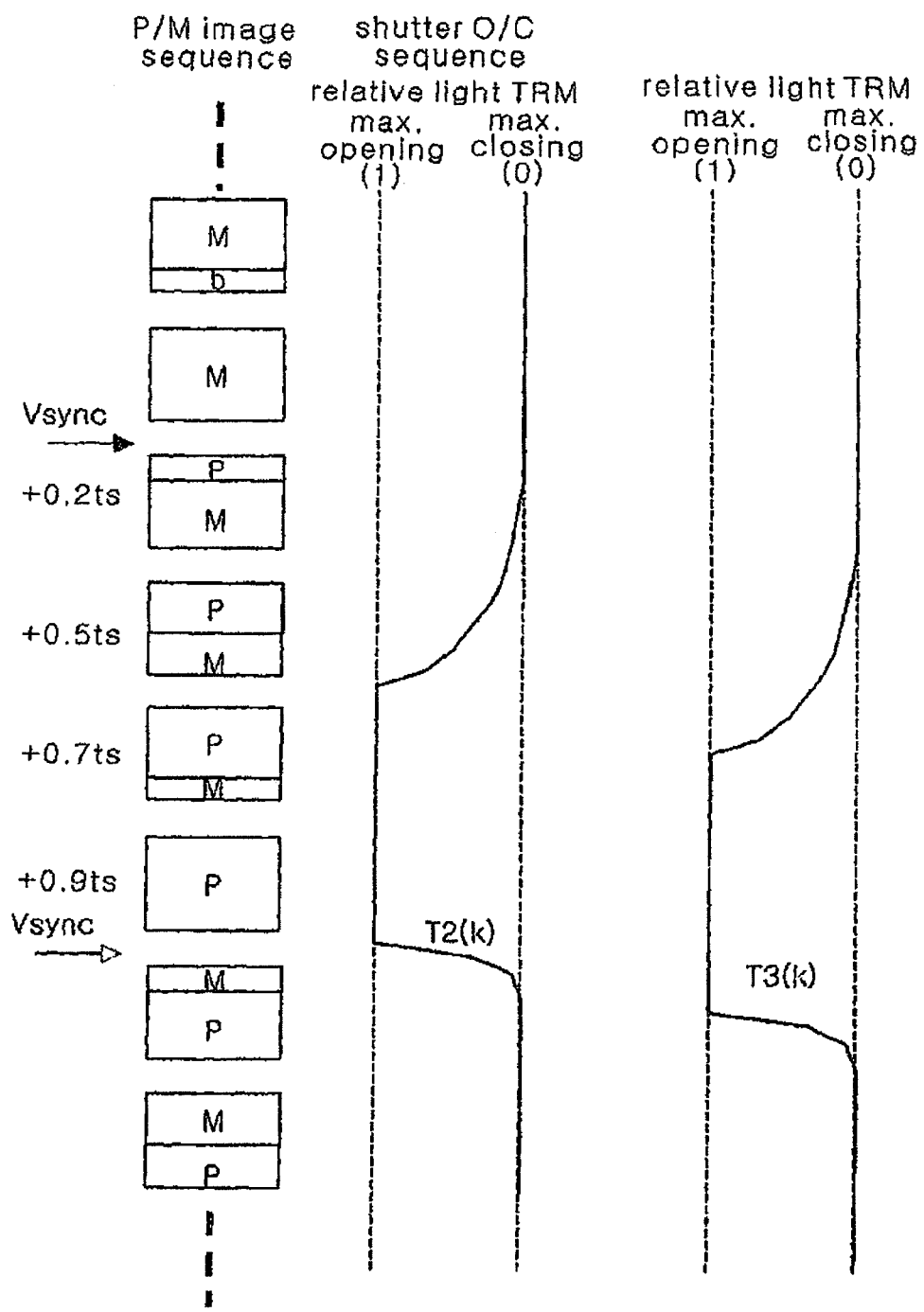

The image frame screens of FIGS. 29 to 34 each and integrally illustrate images displayed for a single monitor frame period, whereas the P/M image frame screens of each of FIGS. 38 to 40 are images captured at specific points within a single monitor frame period. When a single monitor frame period is ts, each of FIGS. 38 to 40 illustrate images captured when 0.2 ts, 0.5 ts, 0.7 ts and 0.9 ts have elapsed after the vertical sync of a monitor frame, respectively. The screens for a monitor in which the light response time of a monitor pixel, such as a CRT, are as shown in FIG. 38. In the case where a P image is displayed after an M image has been displayed, as shown in the third screen of FIG. 38, a P image starts to be displayed on the upper portion of a monitor at 0.2 ts after the start vertical sync of P image display, and the remaining portion of the screen "b" is blank. At 0.5 ts after the vertical sync, a P image starts to be displayed on the center portion of the monitor, and the P image displayed on the upper portion disappears and is changed to a blank image b. For such a monitor having such a quick response time, a simple shutter opening/closing sequence switching a maximum opening state and a maximum closing state in accordance with vertical sync, as shown in the drawing, is effective.

In contrast, screens for a monitor having the somewhat slow light response time of a monitor pixel, such as a LCD monitor, are illustrated in FIG. 39. This is the embodiment in which it is assumed that the duration of an afterimage is shorter than a single monitor frame period. In the case where a P image is displayed after an M image has been displayed, as shown in the third screen, at 0.2 ts after the start vertical sync of P image display, a P image starts to be displayed on the upper portion of a monitor, the center portion thereof is black "b" and the afterimage of a previous M image remains in the lower portion thereof. At 0.6 ts after the vertical sync, a P image starts to be displayed on the center portion of the monitor, the P image displayed on the upper portion remains, and a blank image b and the afterimage of the M image remain in the lower portion. At 0.7 ts after the vertical sync, a P image starts to be displayed on the lower center portion of the monitor, the P image displayed on the upper portion remains and the afterimage of the M image completely disappears and is changed to a blank image "b." At 0.9 ts after the vertical sync, a P image starts to be displayed on the lower portion of the monitor, and most of the screen of the monitor is filled with the P image. In the monitor having a somewhat slow response time, compensation is performed by applying a random point intermediate state shutter opening/closing sequence, as shown in FIG. 39. As described above, a shutter opening/closing sequence is generated using the random point intermediate state shutter opening/closing sequence in view of the light response time of the monitor pixel. The embodiment as shown in FIG. 39 is particularly effective for the private image of the center portion of a monitor.

The screens for a monitor having the slow light response time of a monitor pixel are as shown in FIG. 40. This is the embodiment in which it is assumed that the duration of an afterimage is equal to or longer than a single monitor frame period. In the case where a P image is displayed after an M image has been displayed, as shown in the third screen of the drawing, at 0.2 ts after the start vertical sync of P image display, a P image starts to be displayed on the center portion of a monitor, and the afterimage of a previous M image remains on the lower center portion of the monitor. At 0.7 ts after the vertical sync, a P image starts to be displayed on the low center portion of the monitor, the P image displayed on the upper portion remains, and the afterimage of the M image remains in the lower portion thereof. At 0.9 ts after the vertical sync, a P image starts to be displayed on the lower portion of the monitor, and most of the screen of the monitor is filled with the P image. In such a monitor having a slow response time, compensation is performed using the random point intermediate state shutter opening/closing sequence, as shown in FIG. 40. For an embodiment, a shutter opening/closing sequence, such as T2 (k) or T3 (k) of FIG. 40, may be applied. In the present invention, the P/M image sequence may not be synchronized with the shutter opening/closing sequence, like the above embodiment. In an embodiment of the present invention, a sequence method, in which the P/M image sequence is not synchronized with the shutter opening/closing sequence at an optional point, may be utilized without regard to intermediate state shutter opening/closing, shutter opening/closing in two states of opening/closing or a sequence method.

In monitors having a slow response time, as shown in FIGS. 39 and 40, since it may be difficult to display image values if the difference between the pixel image value of a current frame and the image value of a previous frame is large, a color space dynamic range reduction method is utilized to reduce the contrast of an image in an embodiment. As shown in FIGS. 39 and 40, in an embodiment of the present invention, a masking image division method is used as a method effective for the monitor having a slow response time. In general, since the scanning of a monitor is performed from top to bottom, the M images of the upper and lower ends are easily viewed by the user in the monitor having a slow response time when the shutter is opened, as shown in FIGS. 39 and 40. In the masking image division method of the present invention, a masking image having high masking power is generated in a region completely blocked by a shutter (chiefly, center portion), and a masking image having low masking power is generated in a region incompletely blocked by the shutter. For the masking image having low masking power, there are a connecting image, an unclear image and an image not including a frequency to which human visual perception is not sensitive. The masking image division method is the method in which a partial region has low 'naked eye security performance' but improved 'user visual perception performance.'

Since there are many cases in which, in a monitor having a slow response time, 'naked security performance' may vary with display regions, a corresponding shutter opening/closing sequence is generated when the user moves a display region having high 'naked security performance' using mouse scroll in a user interface. In another embodiment, to allow a private display region to be sequentially scrolled and viewed, and thus allow an entire screen to be viewed to the user, a shutter opening/closing sequence is sequentially changed at a predetermined rate. At this time, if the masking image division method is employed, a heavily masked region moves accordingly. In another embodiment, a LCD driver chip may be programmed so that display is not performed from the top, but a central region is first displayed.

[Region Division Image Arrangement Sequence]

In an embodiment of the present invention, the private display using a region division image arrangement sequence method, in which two or more different image frames are displayed for a single monitor frame period, is proposed. If a plurality of different image frames are displayed for a single monitor frame period and shutter opening/closing is effectively performed, it can be made extremely difficult that a peeper interprets a private image.

However, due to the slow light response of a shutter, difficulty in generating a masking image and the problem of the difference in the density of light intensity, the conventional private display has limitations in displaying two or more different frames for a single monitor frame period and privately viewing the frames. As a result, in the case of a synchronous private display, only a single kind of image frames are displayed. In the IBM's scheme, only a single kind of images are displayed or two kinds of image frames are restrictively displayed, which is disadvantageous in that the slow light response of a shutter is compensated for and the difference in the density of light intensity varies with the regions of a monitor. In particular, the probability that a P frame is displayed on a specific region of a monitor (upper end) is increased, so that the specific region has the density of light intensity higher than other regions.

If two or more different image frames are displayed for a single monitor frame and the opening/closing of a shutter are smoothly performed correspondingly, more improved private display can be achieved.

Figure 41:
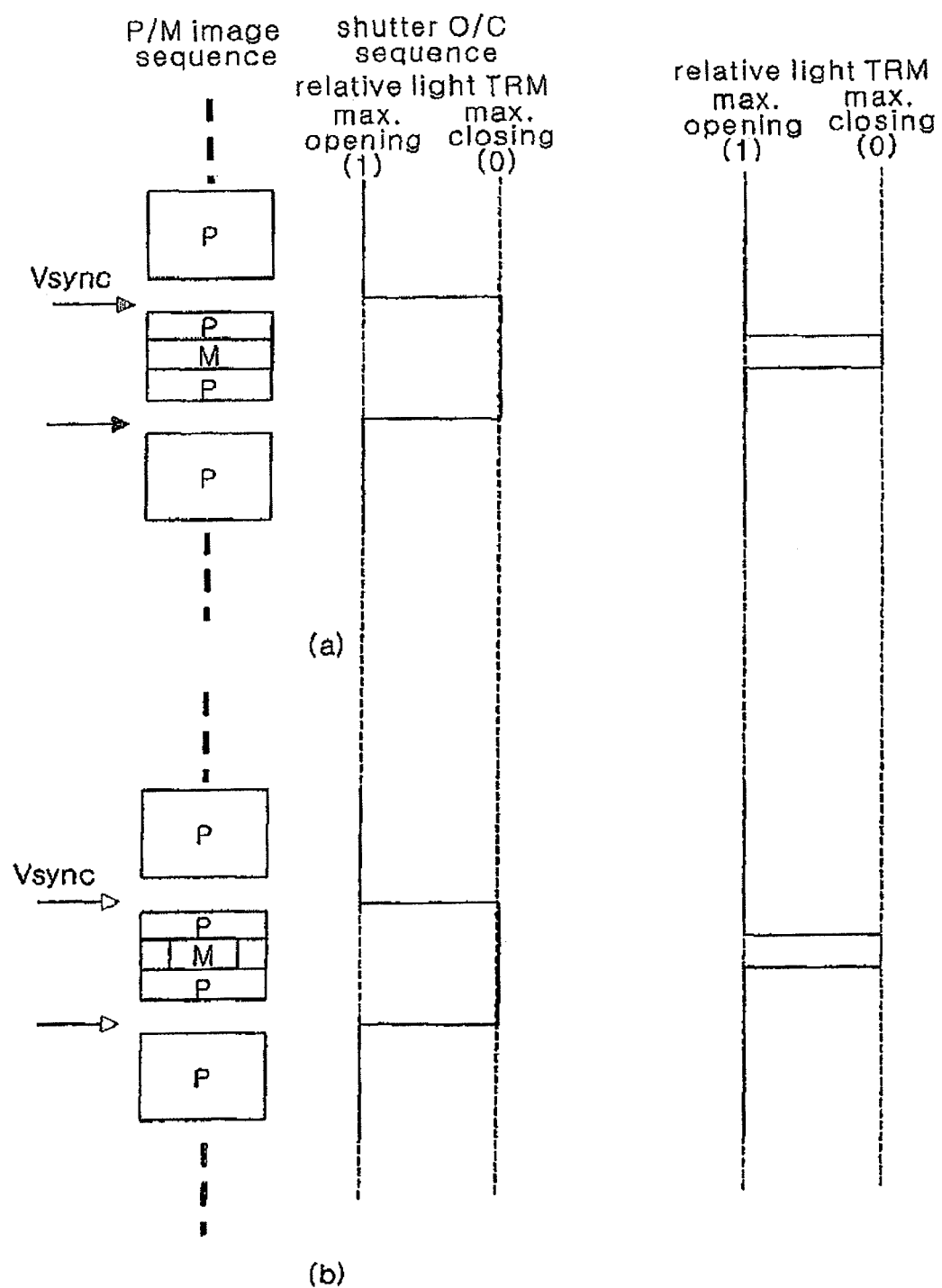
FIG. 41 is a diagram illustrating partial screen private display in accordance with the present invention.

FIG. 41 is a view illustrating partial screen private display according to the present invention. One of the monitor frame region division image arrangement sequence methods is the partial screen private display method. In order to solve the slow response of a monitor pixel and the slow response of a shutter opening/closing and reduce the calculation time of a masking image, it may be advantageous that only a part of a monitor screen is made a private display. For an example, images are displayed using a P/M image sequence, as shown in FIG. 41a. The second screen thereof illustrates that a PMP image frame is displayed for a single monitor frame period. The PMP image frame may be displayed in synchronization with a specific monitor horizontal sync Hsync, or may be displayed in synchronization with not a monitor but only a data sync. At this time, a shutter opening/closing sequence can be generated in two forms, as shown in FIG. 41a. In a left shutter opening/closing sequence, the opening and closing of a shutter are performed in synchronization with a monitor vertical sync. In a right shutter opening/closing sequence, the opening and closing of the shutter are performed in synchronization with alternation in a P/M image sequence. However, when the shutter is opened and closed using the right shutter opening/closing sequence, a problem arises in that the density of light intensity of the upper and lower portions of a monitor is larger than that of the center portion of the monitor.

In another embodiment; the masking image division method is employed. In the masking image division method, a masking image Ms having low masking power is generated on a region (chiefly, center region) completely blocked by a shutter and a masking image Mw having low masking power is generated on a region incompletely blocked by the shutter. For masking images having low masking power, there are a connecting image, an unclear image and an image not including a frequency to which human visual perception is sensitive. In this case, an image frame MwMsMw is displayed for a single monitor frame period.

In the case where 'naked eye security performance' varies with display regions, a corresponding P/M image sequence and a corresponding shutter opening/closing sequence are generated when the user moves a private display region having high 'naked eye security performance' using mouse scroll in a user interface. In another embodiment, to allow a private display region to be sequentially scrolled and viewed, and thus allow an entire screen to be viewed to the user, a P/M image sequence and a shutter opening/closing sequence are made to be sequentially changed at a predetermined rate.

Figure 1A:
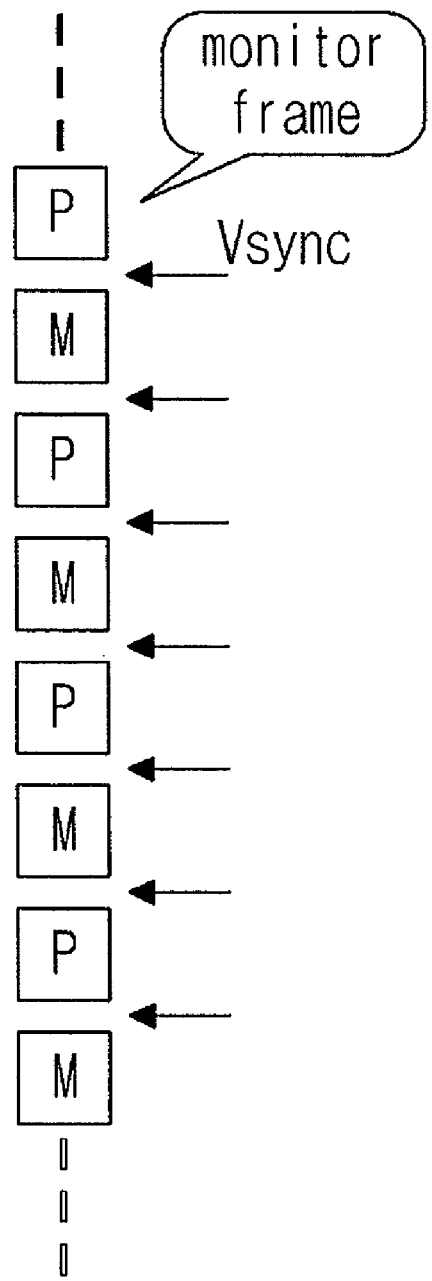
FIGS. 1a to 1c are drawings illustrating the conventional sequences of private images and masking images.
Figure 1B:
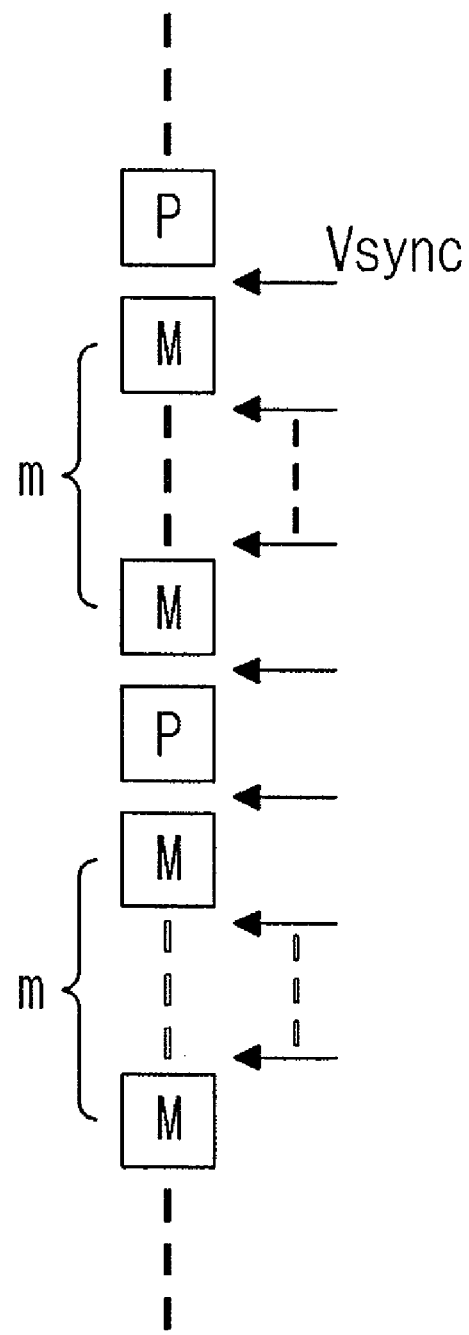
Figure 1C:
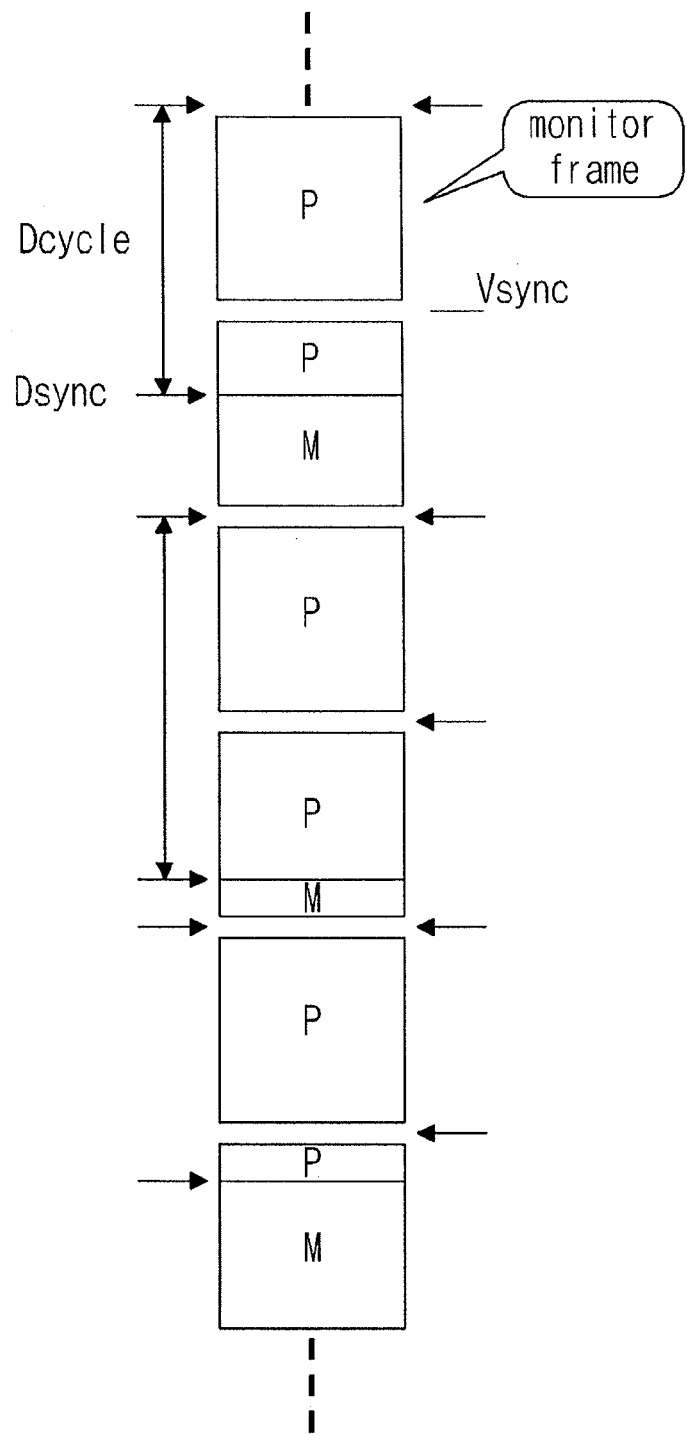

For another embodiment, images are displayed using a P/M image sequence, as shown in FIG. 4 1b. The second screen thereof illustrates that a PMP image frame is displayed for a single monitor frame period. The PMP image frame may be displayed in synchronization with a specific monitor horizontal sync Hsync, or may be displayed in synchronization with not a monitor but only a data sync. At this time, on the center region thereof on which an M image is displayed, a P image is displayed after a monitor horizontal sync Hsync, an M image is displayed after a predetermined period, and a P image is displayed again after a predetermined period. In this case, a shutter opening/closing sequence can be generated in two forms, as shown in FIG. 41b. In a left shutter opening/closing sequence, the opening and closing of a shutter are performed in synchronization with a monitor vertical sync. In a right shutter opening/closing sequence, the opening and closing of the shutter are performed in synchronization with alternation in a P/M image sequence. However, when the shutter is opened and closed using the right shutter opening/closing sequence, a problem arises in that the density of light intensity of the right and left portions of a monitor is larger than that of the center portion of the monitor. This partial screen private display can be implemented in a software (SW) or hardware (HW) fashion.

Figure 42:
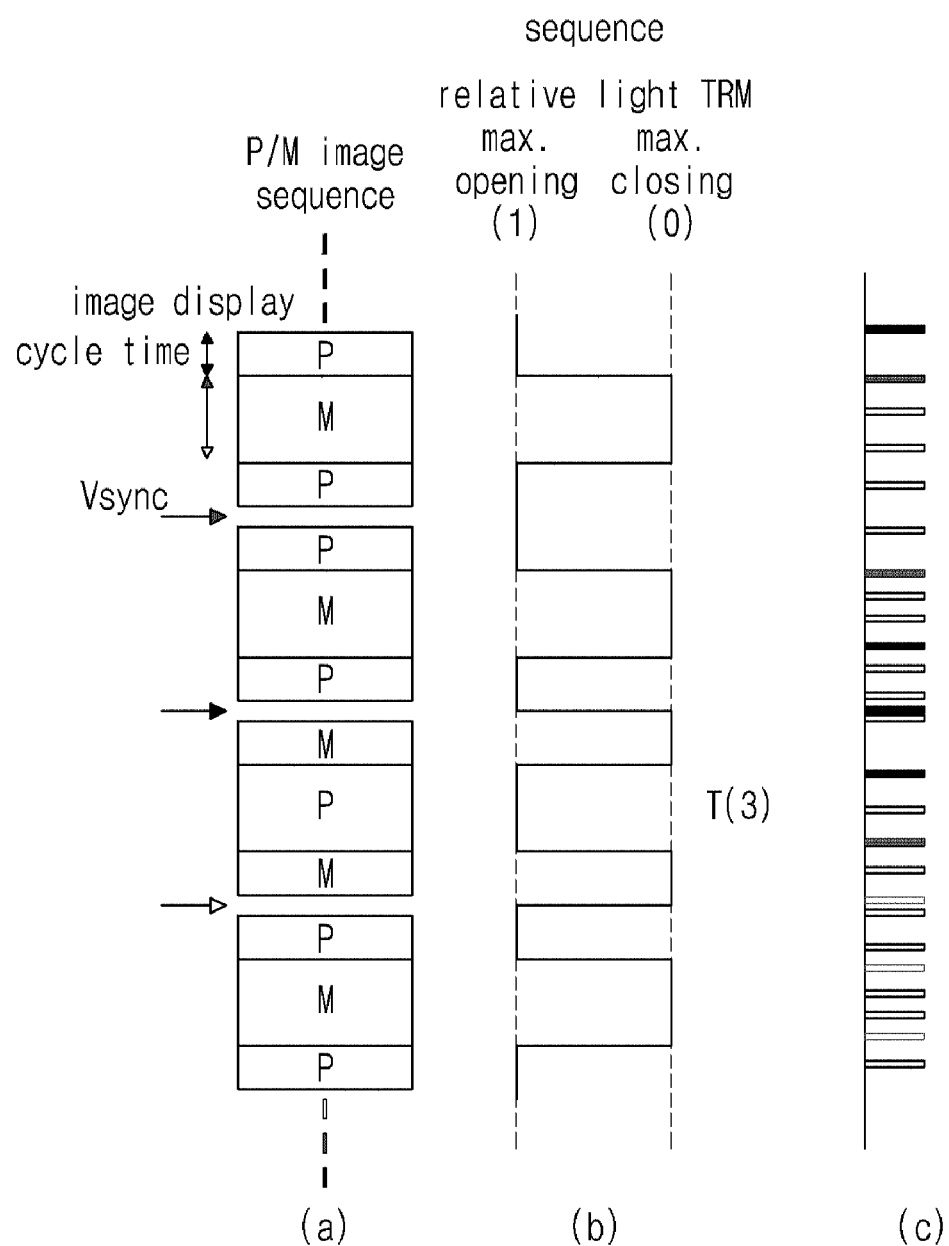
FIG. 42 is a diagram illustrating a region division image arrangement sequence method in accordance with the present invention.

An embodiment of the private display method, in which two or more different image frames are displayed for a single monitor frame period, is as shown in FIG. 42. The region division image arrangement sequence may be displayed in synchronization with a monitor horizontal sync Hsync, or may be displayed in synchronization with not a monitor but a data sync. The embodiment of FIG. 42 is an example of the sequence in which image frames are arranged with each of the frames divided into three regions. In the embodiment, a P/M image sequence is displayed in the order of (PMP), (PMP), (MPM) and (PMP). In the embodiment, a shutter opening/closing sequence is composed of two states, including opening and closing states. In a shutter opening/closing signal transmission pulse string, a shutter opening/closing signal is transmitted when the shutter state of the shutter opening/closing sequence is changed, and a shutter opening/closing signal is additionally transmitted at a random moment when the shutter state is not changed, as shown in FIG. 42c. In FIG. 42c, the shutter opening/closing signal transmitted when the shutter state is changed is represented by gray, and current shutter state maintaining shutter opening/closing signal transmitted at a moment when the shutter state is not changed is represented by white. The current shutter state maintaining shutter opening/closing signal is the signal used to prevent a peeper from interpreting the shutter opening/closing signal. In another embodiment, a shutter opening/closing signal is transmitted only when the shutter state of the shutter opening/closing sequence is changed. In another embodiment of the present invention, a shutter opening/closing sequence is composed of multistage states including an intermediate shutter state. In FIG. 42a, a P image display cycle time and an M image display cycle time are fixed in an embodiment, and vary in another embodiment. By varying the P image display cycle time and the M image display cycle time, 'anti-peeper security performance' can be improved.

In the region division image arrangement sequence method of the present invention, a plurality of different image frames are displayed for a single monitor frame period, so that further various masking image provision methods can be employed compared to the prior art. In the present invention, a masking image is provided using an original image-derived image method, a disturbing image method and an original image-derived image and disturbing image mixing method. In an embodiment, masking images having different characteristics may be provided to the divided regions of a monitor screen, respectively. For example, in the case of a sequence (PMP), (PMP), (MPM) and (PMP), as shown in FIG. 42, the M image of a center region can be generated using the original image-derived image and disturbing image mixing method and the M images of the upper and lower regions can be generated using the original image-derived image method. For an embodiment, to effectively generate a masking image in real time, the M image of a specific region, such as a center region, can be quickly updated and provided, and the M image of another region can be slowly updated and provided. In an embodiment of the present invention, an original image-derived image, such as a dynamic inverse image, and a disturbing image are generated in real time using the real-time color table changing method and provided to respective regions.

Figure 43:
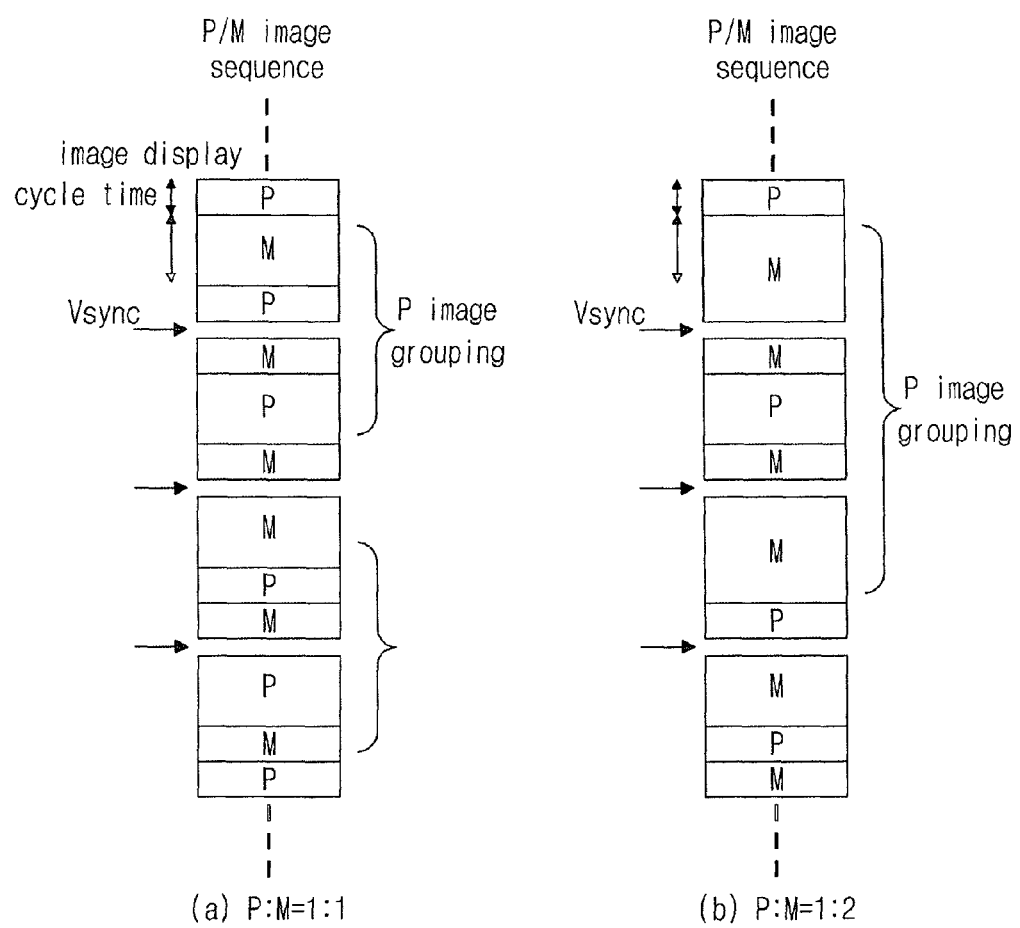
FIG. 43 is a diagram illustrating the private image grouping method of a region division image arrangement sequence.

FIG. 43 is a view illustrating the private image grouping method of the region division image arrangement sequence according to the present invention. By varying a P/M image display cycle time to improve 'anti-peeper security performance,' the cases where the frequency of the display of private images is high in a specific portion of a monitor compared to other regions. When the user views a monitor, the density of light intensity of the specific portion is higher than that of other regions, so that the user may feel inconvenience. In order to solve the problem of the difference in the density of light intensity, the present invention proposes the private image grouping method. The private image grouping method is the method in which m complete private image screens are made to be displayed in groups for n monitor frames. In an embodiment, as shown in FIG. 43a, P/M images are mixed with each other in a ratio of P:M=1:1 and one complete private image screen is displayed in a group for two monitor frames. When (PMP) and (MPM) screens are displayed in a group, a completely combined private image screen is formed and viewed to the user. At this time, the boundaries of the (PMP) screen are made to coincide with the boundaries of the (MPM) screen. In an embodiment, as shown in FIG. 43b, P/M images are mixed with each other at a ratio of P:M=1:2 on the average and one completely private image screen is displayed in a group for three monitor frames. If (PMM)=(PM), (MPM), (MMP)=(MP) screens are displayed in a group, one completely combined private image screen is viewed to the user. At this time, the region dividing image change boundaries of respective screens are made to coincide with each other, respectively. For another embodiment, m complete private image screens are displayed in groups for n monitor frames as two complete private image screens are displayed in groups for 5 monitor frames. In another embodiment, at the time of private image grouping, m private image screens are not completely grouped for n monitor frames but are grouped with specific regions excluded therefrom. Unless the grouping is performed with the same region continuously excluded therefrom, there is no inconvenience of user visual perception.

Figure 44:
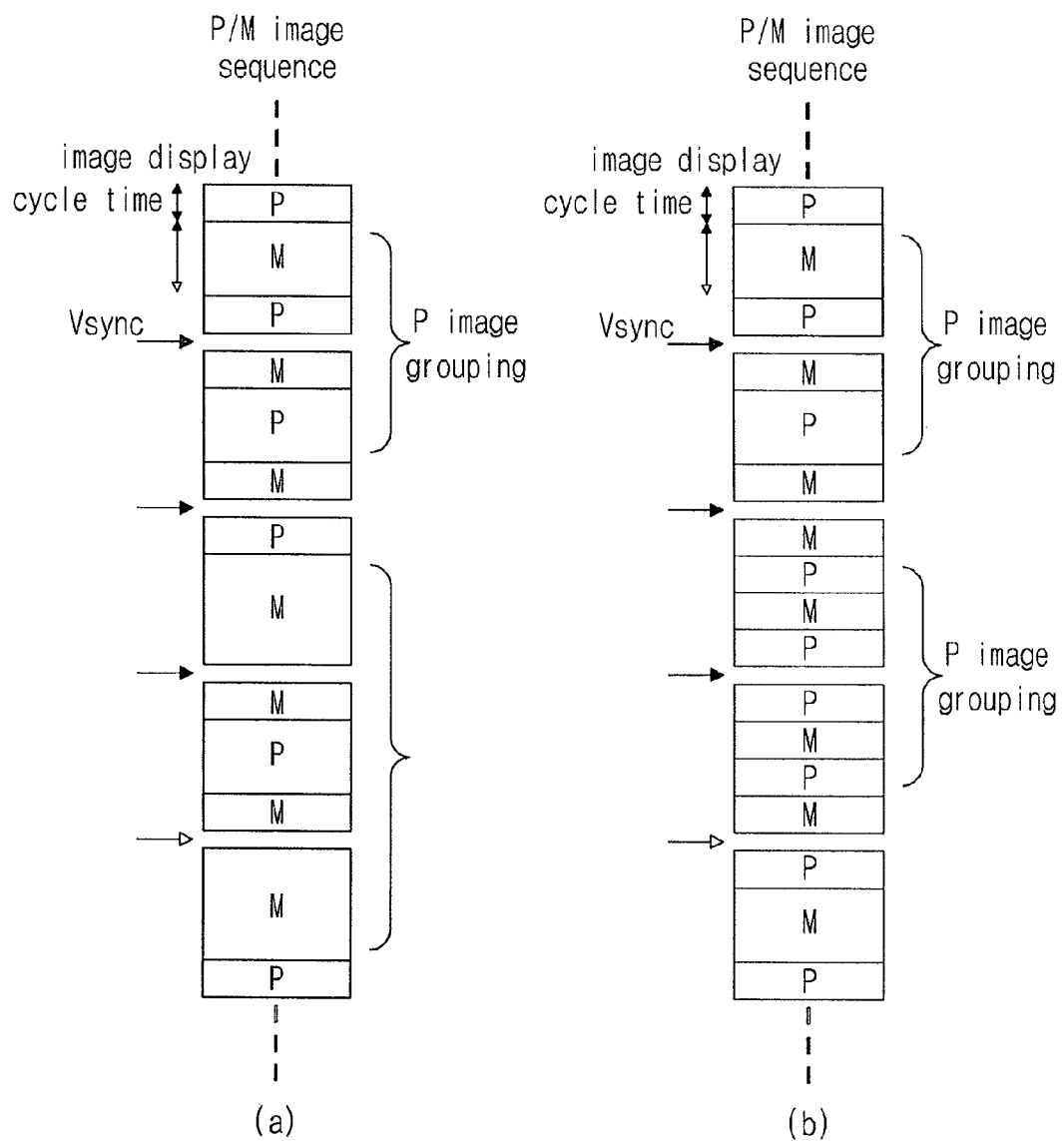
FIG. 44 is a diagram illustrating the variation of private image grouping in accordance with the present invention.

FIG. 44 is a view illustrating the variation of private image grouping according to the present invention. In an embodiment of the present invention, the private image grouping is varied to improve 'anti-peeper security performance.' Embodiments of the variation of private image grouping are illustrated in FIGS. 44a to 44b. In an embodiment, as shown in FIG. 44b, a grouping unit is varied in such a way that a grouping method of allowing 1 complete private image screen to be displayed for 2 monitor frames is varied to a grouping method of allowing 1 complete private image screen to be displayed for 3 monitor frames. In an embodiment, as shown in FIG. 44b, grouping is varied in such a way that the number of divided screen regions is varied from 3 to 4 while a grouping unit is fixed so that 1 complete private image screen is grouped for two monitor frames.

Figure 45:
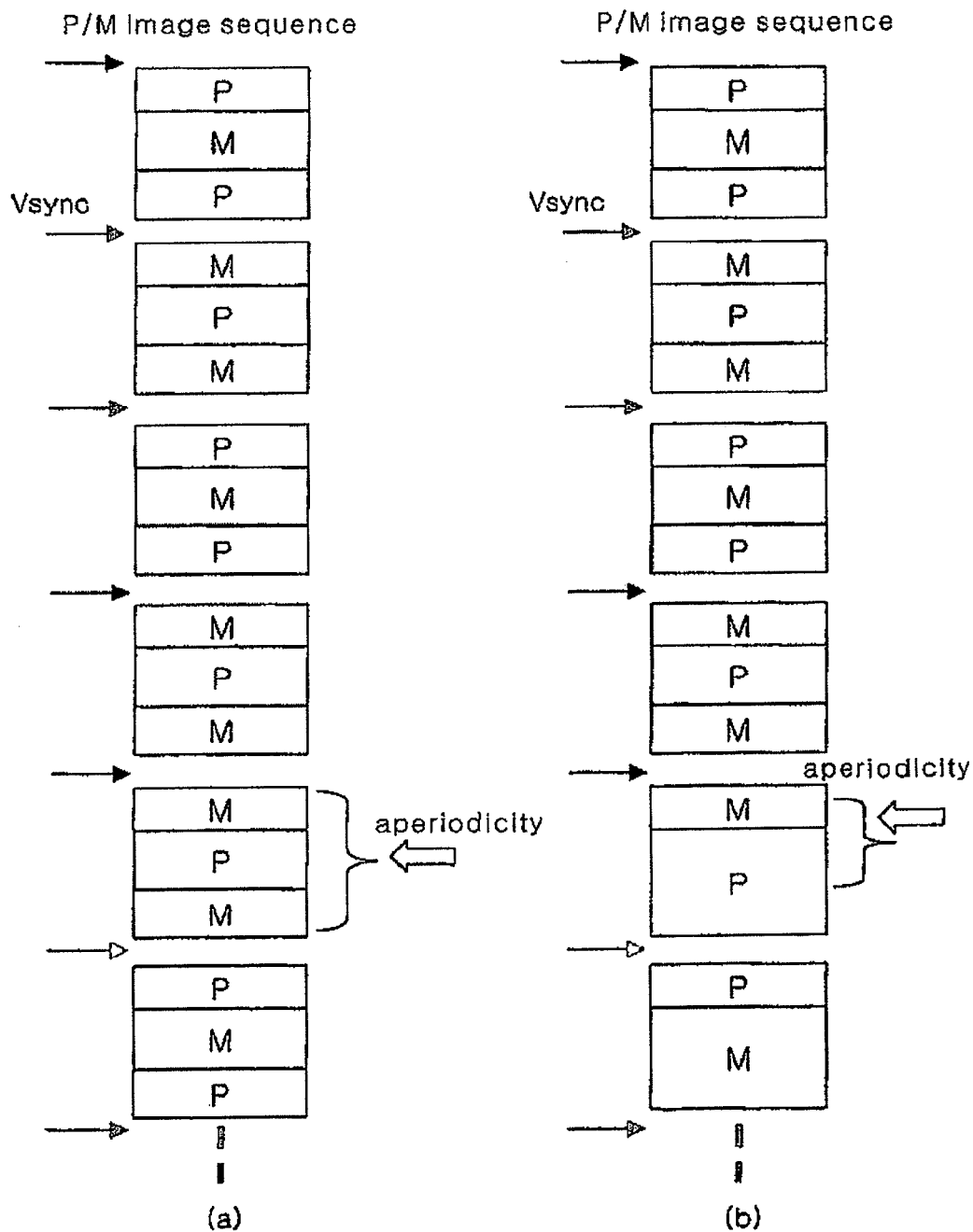
FIG. 45 is a diagram illustrating the maximum repetitive period sequence method of the region division image arrangement sequence.

FIG. 45 is a view illustrating a maximum repetitive period sequence method for a region division image arrangement sequence. In order to improve 'anti-peeper security performance,' an embodiment of the present invention employs the maximum repetitive period sequence method in which aperiodicity is inserted into the region division image arrangement sequence. It is determined whether a P/M image sequence is repeated, depending on whether the respective regions of a monitor are temporally repetitive on the basis of a monitor frame. For an embodiment, FIG. 45a illustrates an embodiment in which aperiodicity is inserted at the same point over all the regions of a monitor. Aperiodicity is inserted in a fifth frame, as in (PMP), (MPM), (PMP), (MPM), (MPM), (PMP), (MPM) . . . . PMPMMPM sequence is displayed on the upper and lower regions of a monitor, and MPMPPMP sequence is displayed on the center region thereof. In another embodiment, as shown in FIG. 45b, aperiodicity may be inserted at different points for the respective regions of a monitor. In this case, images are displayed, as in (PMP), (MPM), (PMP), (MPM), (MPP), (PMM), (MPM) . . . PMPMMPM sequence is displayed on the upper portion of a monitor, MPMPPMP sequence is displayed and aperiodicity is inserted in a fifth frame on the center portion thereof, and PMPMPMM sequence is displayed and aperiodicity is inserted in a seventh frame on the lower portion thereof. In an embodiment of the present invention, a shutter opening/closing sequence may be generated using intermediate shutter opening/closing.

Figure 46:
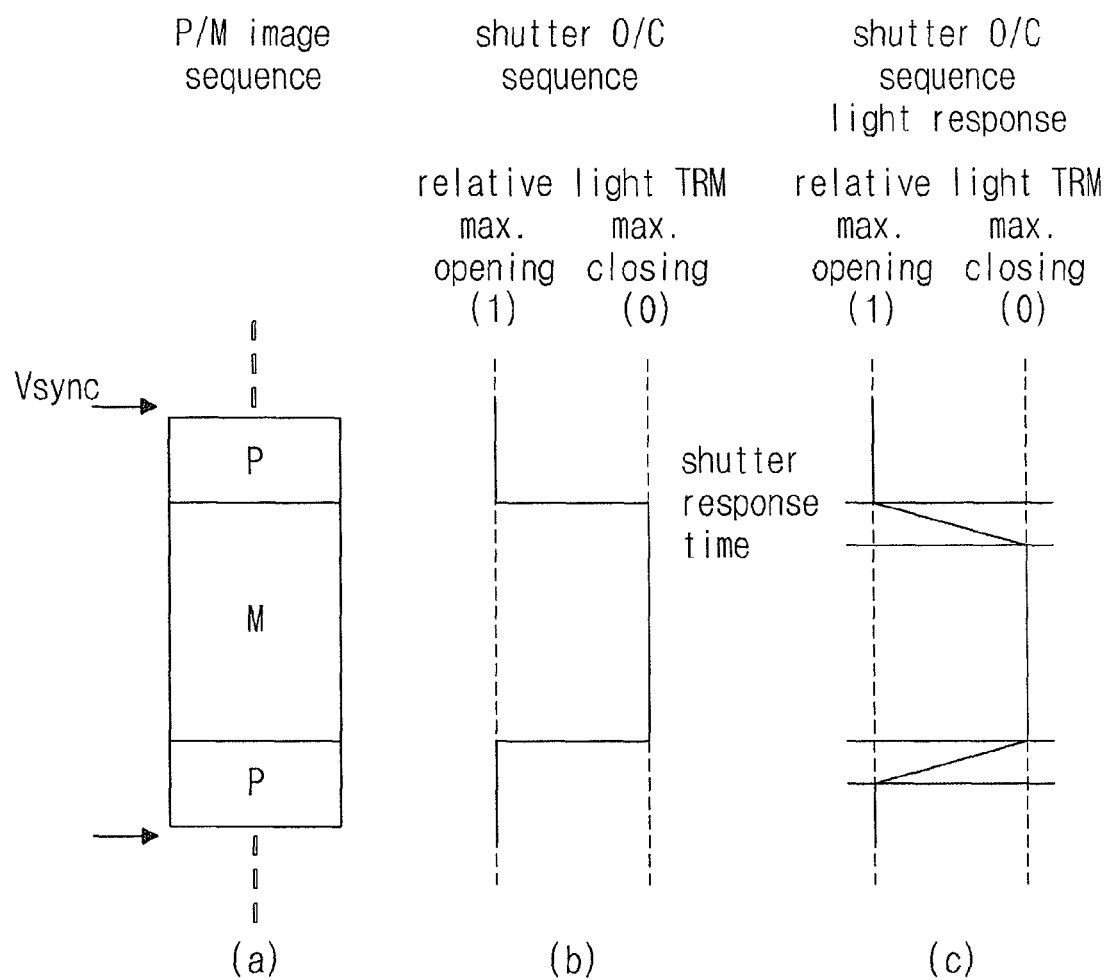
FIG. 46 is a diagram illustrating a sequence of private images and masking images, a shutter opening/closing sequence and a shutter opening/closing sequence light response.

FIG. 46 is a view illustrating the sequences, shutter opening/closing sequences, and shutter opening/closing sequence light response of a private image and a masking image. In a private display of the present invention, in which two or more different image frames are displayed for a single monitor frame period, the problem of the difference in the density of light intensity must be solved. To this end, the present invention proposes a method of processing the boundary region of an image frame. FIG. 46 illustrates shutter opening/closing sequence and shutter opening/closing sequence light response according to a P/M image sequence. An ideally fast shutter opening/closing means must follow the shutter opening/closing sequence of FIG. 46b at an unlimited rate, but exhibits relative light transmittance characteristics due to the limited light response characteristics thereof, as shown in FIG. 46c. Due to the limited light response of the shutter opening/closing means, in a boundary region where P and M images are alternated with each other, the user views a masking image that must have been blocked, or a dark private image that must be viewed. Since it is seriously problematic for the user to view a masking image, the viewing of the masking image must be avoided.

Figure 47:
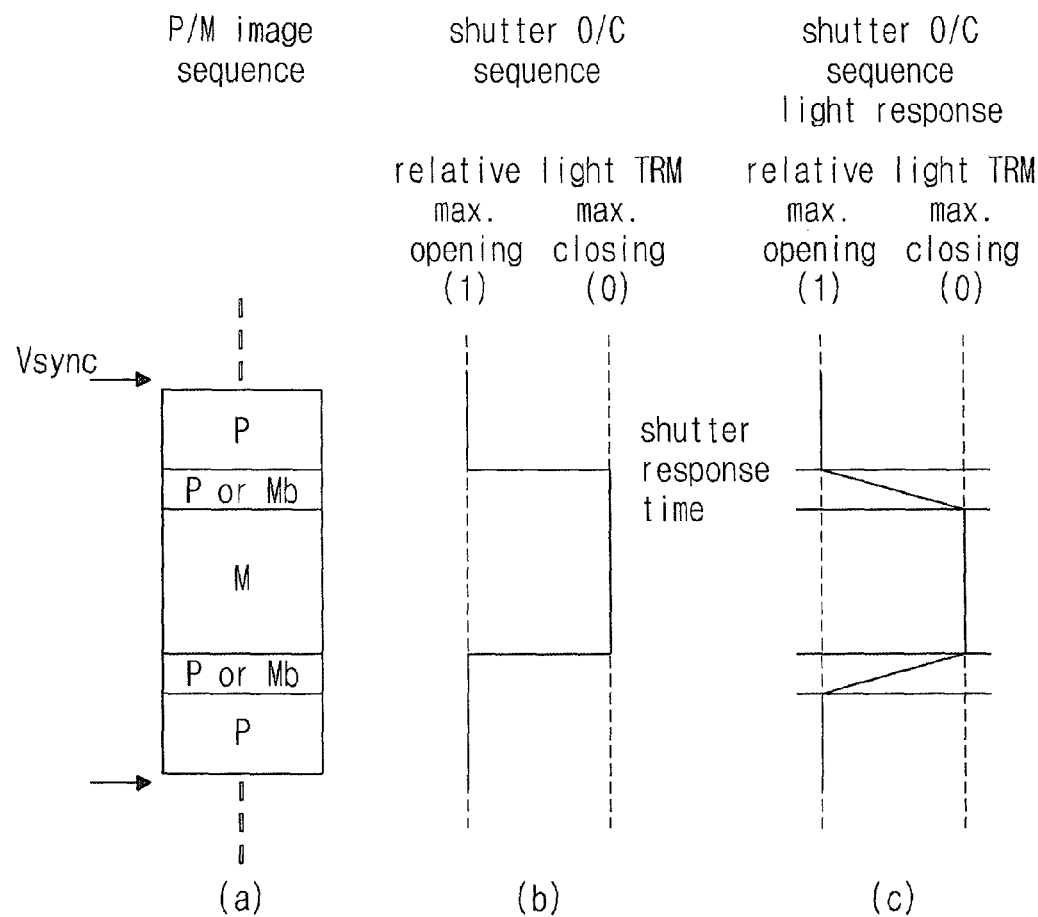
FIG. 47 is a diagram illustrating the processing of the boundary region of a private image and a masking image on the basis of a shutter opening/closing sequence light response in accordance with the present invention.

In the present invention, as shown in FIG. 47, a shutter response time for shutter opening/closing sequence is calculated, and the user is made to view a P image or a connecting image Mb, such as a blank image, for the shutter response time. As shown in FIG. 47a, in a boundary region where P and M images are alternated, a private image P or connecting image Mb is provided and displayed for the shutter response time. With this operation, a user is prevented from viewing a masking image that must have been blocked.

Figure 48:
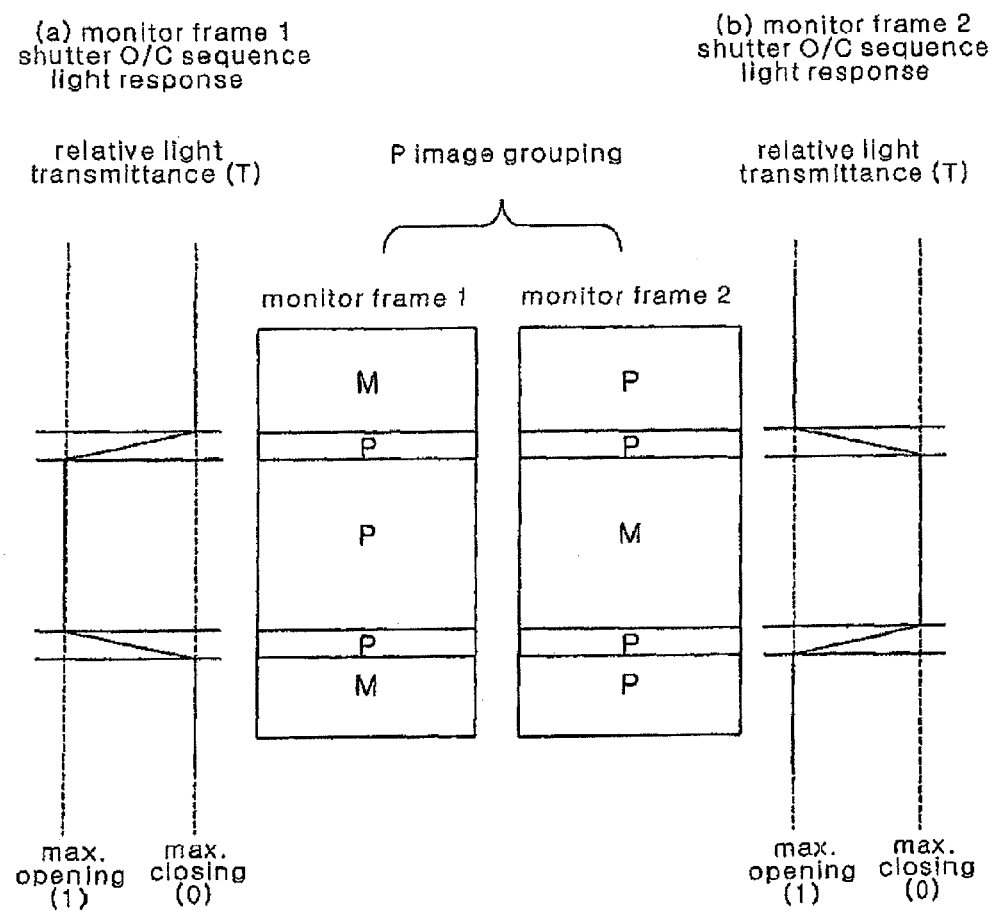
FIG. 48 is a diagram illustrating an example of the processing of the boundary region of a private image and a masking image to compensate for the difference in the density of light intensity in accordance with the present invention.

Additionally, in order to solve the problem of the difference in the density of light intensity due to a limited shutter response time, the present invention applies a combination of a P image grouping method and a boundary region processing method. For an embodiment, FIG. 48 illustrates shutter opening/closing sequence light responses and a boundary region processing method according to region division image arrangement with respect to monitor frames 1 and 2 that are private image grouping units. In the above case, all boundary regions are filled with P images. The user views a boundary region in the upper portion of a monitor while a shutter is being opened in the monitor frame 1, or while the shutter is being closed in the monitor frame 2, so that approximately one private image is viewed through a maximally opened shutter on the average. With this method, the problem of the difference in the density of light intensity is overcome. The boundary region in the lower portion of the monitor is compensated for in the same manner.

Figure 49:
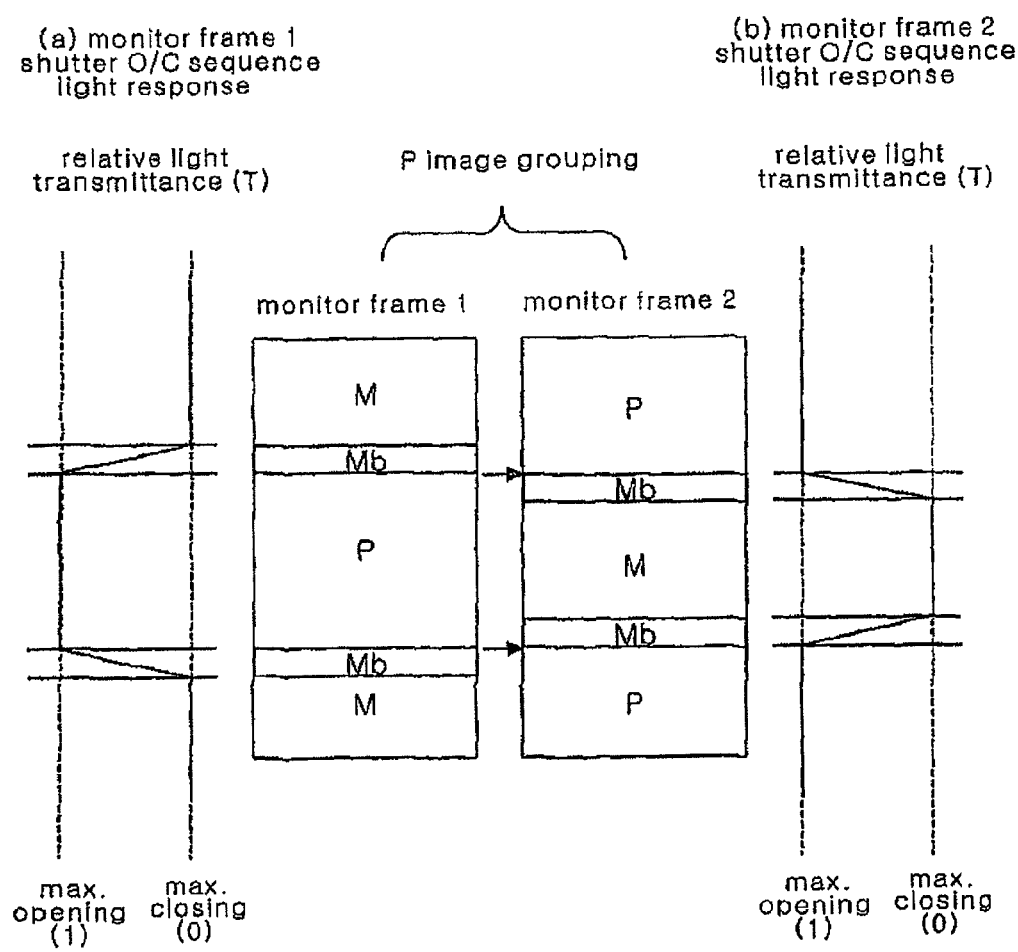
FIG. 49 is a diagram illustrating another example of the processing of the boundary region of a private image and a masking image to compensate for the difference in the density of light intensity in accordance with the present invention.

For another embodiment, FIG. 49 illustrates shutter opening/closing sequence light responses and a boundary region processing method according to region division image arrangement with respect to monitor frames 1 and 2 that are private image grouping units. In the above case, all boundary regions are filled with connecting images Mb. As indicated by arrows in the drawing, the start and end positions of a P image in a frame 1 are made to accurately coincide with the end and start positions of a P image in a frame 2, respectively. With this method, the problem of the difference in the density of light intensity is overcome. This method is superior in 'user visual perception performance,' but is inferior in security in the region where the connecting image Mb is displayed. Accordingly, in another monitor frame, a masking image should be sufficiently provided for this region. When a method using the connecting image Mb is employed, a region division image arrangement sequence, in which a boundary region is continuously varied, is generated and displayed in an embodiment.

The above described embodiments are disclosed only to allow those skilled in the art to easily understand and work the present invention, but are not disclosed to limit the scope of the present invention. Accordingly, those skilled in the art should note that various modifications and alterations are possible without departing from the scope of the invention. The scope of the present invention is principally defined by the claims that will be described later.

INDUSTRIAL APPLICABILITY

In accordance with the present invention described above, an effective masking image can be generated with human visual perception characteristics taken into consideration. Furthermore, an original image-derived image, such as a dynamic inverse image, and a disturbing image can be generated in real time.

Furthermore, in accordance with the private image and masking image mixing method of the present invention, user visual perception performance and security performance can be simultaneously improved in a private image output apparatus.

Furthermore, in accordance with the present invention, user visual perception performance is not only fulfilled, but also anti-peeper security performance can be further improved.

What is claimed is:

1. An apparatus for outputting a private image using a public display, comprising:
   means for receiving at least one private image from an external server or generating a private image by itself;
   means for receiving at least one first masking image from an external server, wherein the at least one first masking image includes a disturbing image;
   means for generating an image sequence including the at least one private image, the at least one first masking image and at least one second masking image, wherein the at least one second masking image includes an original image-derived image; and
   means for outputting the image sequence to the display.

2. The apparatus as set forth in claim 1, further comprising:
   means for generating another masking image by adding an original image-derived image and a disturbing image.

3. The apparatus as set forth in claim 2, wherein the original image-derived image is an inverse image of the private image.

4. The apparatus as set forth in claim 1, wherein the disturbing image is an advertisement image.

5. An apparatus for outputting a private image using a public display, comprising:
   means for receiving at least one private image from an outside of the apparatus;
   means for generating a plurality of masking images that masks the private image;
   means for generating an image sequence of the private image and the plurality of masking images, wherein the plurality of masking images include an original image-derived image and a disturbing image; and
   means for outputting the private image and the plurality of masking images to the display according to the image sequence.

6. The apparatus as set forth in claim 5, wherein the image outputting means compresses a range of image values of the private image relative to that of the masking image.

7. The apparatus as set forth in claim 5, wherein the masking image generating means generates a dynamic inverse image of the private image as the masking image according to a refresh rate of the display and the image sequence.

8. The apparatus as set forth in claim 7, wherein the masking image generating means is composed of an inverter configured to invert the private image.

9. The apparatus as set forth in claim 5, wherein the masking image generating means generates a disturbing image based on human visual perception characteristics as the masking image.

10. An apparatus for outputting a private image using a public display, comprising:
    means for receiving at least one private image from an outside of the apparatus;
    means for generating a plurality of masking images that masks the private image;
    means for receiving an image sequence of the private image and the masking images, wherein the masking images include an original image-derived image and a disturbing image; and
    means for outputting the private image and the masking images to the display according to the image sequence.

11. The apparatus as set forth in claim 10, wherein the image outputting means compresses image values of the private image relative to those of the masking image.

* * * * *